United States Patent
Hayashi et al.

(10) Patent No.: US 9,899,907 B2
(45) Date of Patent: Feb. 20, 2018

(54) SWITCHING POWER SUPPLY CIRCUIT AND CONTROL METHOD THEREFOR

(71) Applicant: Mitsubishi Electric Corporation, Tokyo (JP)

(72) Inventors: Yoshitomo Hayashi, Tokyo (JP); Yoji Tsutsumishita, Tokyo (JP); Tomokazu Ogawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 191 days.

(21) Appl. No.: 14/770,178

(22) PCT Filed: Mar. 4, 2014

(86) PCT No.: PCT/JP2014/055493
§ 371 (c)(1),
(2) Date: Aug. 25, 2015

(87) PCT Pub. No.: WO2014/171204
PCT Pub. Date: Oct. 23, 2014

(65) Prior Publication Data
US 2016/0006344 A1     Jan. 7, 2016

(30) Foreign Application Priority Data

Apr. 17, 2013  (WO) .................. PCT/JP2013/061421

(51) Int. Cl.
*H02M 1/36*      (2007.01)
*H02M 3/335*     (2006.01)
(Continued)

(52) U.S. Cl.
CPC .............. *H02M 1/36* (2013.01); *G05F 1/577* (2013.01); *H02M 1/08* (2013.01); *H02M 3/335* (2013.01); *H02M 3/33561* (2013.01)

(58) Field of Classification Search
CPC ........... H02M 1/36; H02M 1/08; H02M 3/335
(Continued)

(56) References Cited

U.S. PATENT DOCUMENTS 6,119,238 A    9/2000  Jennings et al.
9,030,117 B2   5/2015  De Anna et al.
(Continued)

FOREIGN PATENT DOCUMENTS

CN    202282743 U    6/2012
JP    61-189171 A    8/1986
(Continued)

OTHER PUBLICATIONS

Taiwanese Examination Report for TW 103108605 which corresponds to PCT/JP2014/055493 dated Apr. 20, 2015.
(Continued)

*Primary Examiner* — John Poos
(74) *Attorney, Agent, or Firm* — Sughrue Mion, PLLC; Richard C. Turner

(57) ABSTRACT

A switching power supply circuit includes a switching element connected to a primary winding wire of a transformer in series, capacitors connected to secondary winding wires of the transformer via diodes, and an IC for power supply control that controls ON/OFF operation of the switching element on the basis of a charged voltage of the capacitors. Commanded voltages are charged in the capacitors after electric power is supplied to a main power supply, and further, after the elapse of a delay time set in advance, a control circuit, which controls the entire apparatus, controls a main circuit and a peripheral apparatus circuit to start operations.

25 Claims, 25 Drawing Sheets

(51) Int. Cl.
*G05F 1/577* (2006.01)
*H02M 1/08* (2006.01)

(58) Field of Classification Search
USPC .............. 307/31; 363/21.16, 52; 323/282
See application file for complete search history.

(56) References Cited

U.S. PATENT DOCUMENTS

| | | | |
|---|---|---|---|
| 9,030,846 | B2 | 5/2015 | Bai et al. |
| 2002/0125867 | A1 | 9/2002 | Choo et al. |
| 2007/0086223 | A1* | 4/2007 | Uchida ............... H02M 1/32 363/52 |
| 2010/0124081 | A1 | 5/2010 | Morota et al. |
| 2012/0106212 | A1 | 5/2012 | Momose et al. |
| 2013/0015777 | A1 | 1/2013 | De Anna et al. |
| 2013/0083564 | A1 | 4/2013 | Bai et al. |

FOREIGN PATENT DOCUMENTS

| | | |
|---|---|---|
| JP | 02-026267 A | 1/1990 |
| JP | 2002-325440 A | 11/2002 |
| JP | 2002-354791 A | 12/2002 |
| JP | 2003-299351 A | 10/2003 |
| JP | 2007-116789 A | 5/2007 |
| JP | 2009-085487 A | 4/2009 |
| JP | 2010-124572 A | 6/2010 |
| JP | 2010-206382 A | 9/2010 |
| JP | 2012-095511 A | 5/2012 |

OTHER PUBLICATIONS

International Search Report for PCT/JP2014/055493 dated May 27, 2014.

Communication dated Jul. 13, 2016, issued by the German Patent Office in counterpart German Application No. 112014001778.7.

Communication dated Jan. 26, 2017, from the State Intellectual Property Office of People's Republic of China in counterpart Application No. 201480021525.1.

Communication dated Sep. 15, 2017 from the State Intellectual Property Office of the P.R.C. in counterpart application No. 201480021525.1.

* cited by examiner t00: TIME WHEN ELECTRIC POWER IS SUPPLIED TO MAIN POWER SUPPLY
t00 TO t01: DURING START
t01: TIME WHEN SWITCHING POWER SUPPLY CIRCUIT CHANGES TO STEADY STATE
AFTER t01: STEADY STATE ID ENLARGED VIEW IN t00 TO t01 PERIOD

SWITCHING POWER SUPPLY CIRCUIT AND CONTROL METHOD THEREFOR

CROSS REFERENCE TO RELATED APPLICATIONS

This application is a National Stage of International Application No. PCT/JP2014/055493 filed Mar. 4, 2014, claiming priority based on International Application No. PCT/JP2013/061421, filed Apr. 17, 2013, the contents of all of which are incorporated herein by reference in their entirety.

FIELD

The present invention relates to a switching power supply circuit and a control method therefor.

BACKGROUND

In general, various electronic apparatuses such as home electronics, industrial apparatuses, and vehicle-mounted apparatuses are configured by a plurality of circuits. For example, a power conversion apparatus represented by an inverter apparatus that variably controls the speed of a motor is configured by a main circuit including a power module that supplies alternating-current power to the motor, a peripheral apparatus circuit that drives a cooling fan to cool the heated power module and operates apparatuses not directly related to control and operation of the motor, a control circuit that is mounted with an arithmetic processing device such as a microcomputer, a CPU, an ASIC, or an FPGA and transmits a motor driving signal to the main circuit, which drives the motor, and controls the overall control of the power conversion apparatus such as the operation of the peripheral apparatus circuit, a power supply circuit that supplies electric power serving as a power source for these circuits, and the like.

In general, as the power supply circuit, a switching power supply circuit with high conversion efficiency is used. In the case of the power conversion apparatus explained above, to eliminate the influence of noise transmitted from a main power supply serving as the power source for the power supply circuit or for a reason such as electric shock prevention, a switching power supply circuit including an insulated transformer is used.

The switching power supply circuit is configured by components such as a switching element, an insulated transformer including a primary winding wire and one or a plurality of secondary winding wires, a main power supply being connected to the primary winding wire via the switching element, a diode connected to the secondary winding wire(s) of the insulated transformer, a capacitor connected to the secondary winding wire(s) of the insulated transformer via the diode, and an IC for control power supply control that controls ON/OFF of the switching element. The IC for power supply control controls ON/OFF of the switching element on the basis of a voltage value of the capacitor. Basically, the switching power supply circuit controls a flow of electric power according to this ON/OFF operation.

When the insulated transformer includes one secondary winding wire, the IC for power supply control performs the control of ON/OFF of the switching element on the basis of the voltage value of the capacitor connected to the secondary winding wire via the diode. On the other hand, when the insulted transformer includes a plurality of secondary winding wires, in general, the IC for power supply control performs the ON/OFF control of the switching element on the basis of the voltage value of the capacitor connected to a certain one secondary winding wire via the diode.

In general, the IC for power supply control has a function of performing the ON/OFF control of the switching element on the basis of the voltage of the capacitor connected to the secondary winding wire(s) via the diode and a function of monitoring an electric current flowing to the primary winding wire and the switching element and, when an excessively large electric current flows, performing overcurrent protection for forcibly turning off the switching element.

The switching power supply circuit has a state in which, when a power supply is turned on, there is no voltage of the capacitor connected to the secondary winding wire(s) of the insulated transformer via the diode (hereinafter referred to as "start time or during start") and a state in which electric power generated by the secondary winding wire(s) of the insulated transformer is stably supplied and the voltage of the capacitor reaches a desired voltage set in advance (hereinafter referred to as "commanded voltage") (hereinafter referred to as "steady time or steady state").

At the start time, because power energy accumulated in the primary winding wire of the insulated transformer increases, an excessively large electric current flows to the primary winding wire and the switching element. Therefore, the overcurrent protection operation of the IC for power supply control works and the switching element is forcibly turned off. Thereafter, the overcurrent protection operation is released and the switching element is turned on again. However, the switching element is turned off by the overcurrent protection operation performed again. This operation is repeated, a voltage is charged in the capacitor connected to the secondary winding wire(s) via the diode, and the switching power supply circuit changes to the steady state.

On the other hand, in the steady state, the voltage of the capacitor connected to the secondary winding wire(s) via the diode is charged to the commanded voltage, an excessively large electric current does not flow to the primary winding wire and the switching element. However, when there is some abnormality in the switching power supply circuit, the circuit connected to the secondary winding wire(s), or the like and an excessively large electric current flows to the primary winding wire and the switching element, the overcurrent protection operation of the IC for power supply control works.

The overcurrent protection operation of the IC for power supply control is for preventing thermal destruction of the switching element and the diode, which are the components of the switching power supply circuit, magnetic saturation of the insulated transformer, and the like. If a current value for operating the overcurrent protection (hereinafter referred to as "overcurrent protection level current value IDOC") can be reduced, when some abnormality occurs in the switching power supply circuit, the circuit connected to the secondary winding wire(s), or the like and an excessively large electric current flows to the primary winding wire or the switching element, the operation of the switching element can be quickly interrupted. Therefore, as the switching element and the diode having small heat capacities can be adopted, and the magnetic saturation of the insulated transformer can be prevented, a reduction in the size of the insulated transformer can also be attained.

For example, when a load of the circuit connected to the secondary winding wire(s) via the diode increases because of some abnormality, an excessively large electric current flows to the secondary winding wire(s) and the diode and, and at the same time, an electric current flowing to the primary winding wire and the switching element also increases. If the electric current flowing to the primary winding wire and the switching element reaches the overcurrent protection level current value IDOC, the switching element is forcibly turned off and the power supply to the secondary winding wire(s) is stopped.

However, when the overcurrent protection level current value IDOC is reduced, at the start time of the switching power supply circuit, sufficient power energy cannot be accumulated in the primary winding wire and a desired voltage cannot be charged in the capacitor connected to the secondary winding wire(s) via the diode. Therefore, it is necessary to set the overcurrent protection level current value IDOC with which the commanded voltage can be charged in the capacitor.

Because of the reasons explained above, to set the overcurrent protection level current value IDOC necessary at the start time, the switching element and the diode having large heat capacities unnecessary at the steady time are made necessary. At the same time, there is also a problem in that the insulated transformer is also increased in size for magnetic saturation prevention of the insulated transformer, the switching power supply circuit is increased in size, and costs increase.

As measures against the problems, Patent Literature 1 described below discloses a technology for changing the overcurrent protection level current value IDOC of the IC for power supply control, that is, a technology for monitoring, with the IC for power supply control, a voltage value of the capacitor serving as a power source of the IC for power supply control and connected to an auxiliary winding wire by the diode and changing an overcurrent protection level current for an electric current flowing to the primary winding wire and the switching element. For example, when the voltage value of the capacitor is low, it is determined that the switching power supply circuit is at the start time or an overload, a short circuit, or the like of the circuit connected to the secondary winding wire(s) has occurred, and the IC for power supply control operates to set a small overcurrent protection level current value IDOC (hereinafter referred to as "overload time overcurrent protection level current value IDOC"). When the voltage value of the capacitor reaches the commanded voltage, it is determined that the switching power supply circuit is in the steady state. The IC for power supply control operates to set the conventional overcurrent protection level current value IDOC (hereinafter referred to as "conventional overcurrent protection level power supply value IDOC"; and is set to a value larger than the overload time overcurrent protection level current value IDOC). Only at the start time, a change of the overcurrent protection level current value IDOC is prohibited to quickly perform the start of the switching power supply circuit. According to the operation explained above, the heat capacities of the diode and the switching element can be reduced. Therefore, it is possible to reduce the size of the components of the switching power supply circuit.

CITATION LIST

Patent Literature

Patent Literature 1: Japanese Patent Application Laid-Open No. 2003-299351

SUMMARY

Technical Problem

However, the technology described in Patent Literature 1 described above is effective in a switching power supply circuit including an insulated transformer configured by a primary winding wire, one secondary winding wire, and an auxiliary winding wire that generates a power source for an IC for power supply control. However, the technology is unsuitable when an insulated transformer including a plurality of secondary winding wires is used. As explained above, the switching power supply circuit monitors, with the IC for power supply control, the voltage of the capacitor connected to a certain one secondary winding wire via the diode and performs the control of ON/OFF of the switching element. When abnormality such as an overload, a short circuit, or the like occurs in the circuit connected to the other secondary winding wires not monitored by the IC for power supply control and the voltage of the capacitor monitored by the IC for power supply control does not decrease, the current value for operating the overcurrent protection is not changed to the overload time overcurrent protection level current value IDOC and remains at the conventional overcurrent protection level current value IDOC. An excessively large electric current also continues to flow to the switching element and the diode connected to the circuit in which the overload, the short circuit, or the like has occurred. The switching element and the diode generate heat. Therefore, to prevent heat damage, components having large heat capacities have to be used.

In the case of the technology described in Patent Literature 1, as explained above, the technology is based on the premise that the voltage value generated in the auxiliary winding wire is monitored. Therefore, the technology cannot be applied to a switching power supply circuit including a low-voltage direct-current power supply such as a DC 12 V power supply or a DC 24 V power supply as a main power supply, not including an auxiliary winding wire in an insulated transformer, and including the insulated transformer not including the auxiliary winding wire in which the low-voltage direct-current power supply is directly connected to a power supply terminal of the IC for power supply control. That is, the auxiliary winding wire is always necessary. This prevents a reduction in the size of the insulated transformer.

The technology described in Patent Literature 1 complicates the operation of the IC for power supply control, leading to an increase in costs of the IC for power supply control itself.

The present invention has been devised in view of the above and it is an object of the present invention to present a switching power supply circuit in which the sizes of a switching element, a diode, and an insulted transformer, which are components of the switching power supply circuit, can be reduced and a reduction in costs can be attained and a control method for the switching power supply circuit.

Solution to Problem

In order to solve the aforementioned problems, a switching power supply circuit that performs operation for generating, on the basis of electric power of a main power supply, operation power for a control circuit that controls overall operation of an electronic apparatus, a main circuit that performs actual operation of the electronic apparatus, and another circuit unrelated to the actual operation of the electronic apparatus, the switching power supply circuit according to one aspect of the present invention is constructed to include: an insulated transformer configured by a primary winding wire and at least one secondary winding wire; a switching element that is connected to the primary winding wire of the insulated transformer in series and ON/OFF-controlled so as to perform power supply from the main power supply to the primary winding wire; a capacitor that is connected to the secondary winding wire of the insulated transformer via a diode; an IC for power supply control that controls ON/OFF operation of the switching element on the basis of a charged voltage of the capacitor; and a secondary-winding-wire-conduction-time detecting unit that detects a time element for enabling the time in which an electric current flows to the secondary winding wire and the diode to be estimated and outputs a detection result to the control circuit. A desired voltage set in advance is charged in the capacitor after electric power is supplied to the main power supply, and, after the desired voltage is charged, the control circuit controls operations of the main circuit and the another circuit on the basis of an output signal of the secondary-winding-wire-conduction-time detecting unit.

Advantageous Effects of Invention

According to the present invention, there is an effect that it is made possible to reduce the size of the switching element, the diode, and the insulted transformer, which are the components of the switching power supply circuit, and attain a reduction in costs.

DESCRIPTION OF EMBODIMENTS

Exemplary embodiments of the present invention are explained below with reference to the accompanying drawings. Note that the present invention is not limited by the embodiments explained below.

First Embodiment

Figure 1:
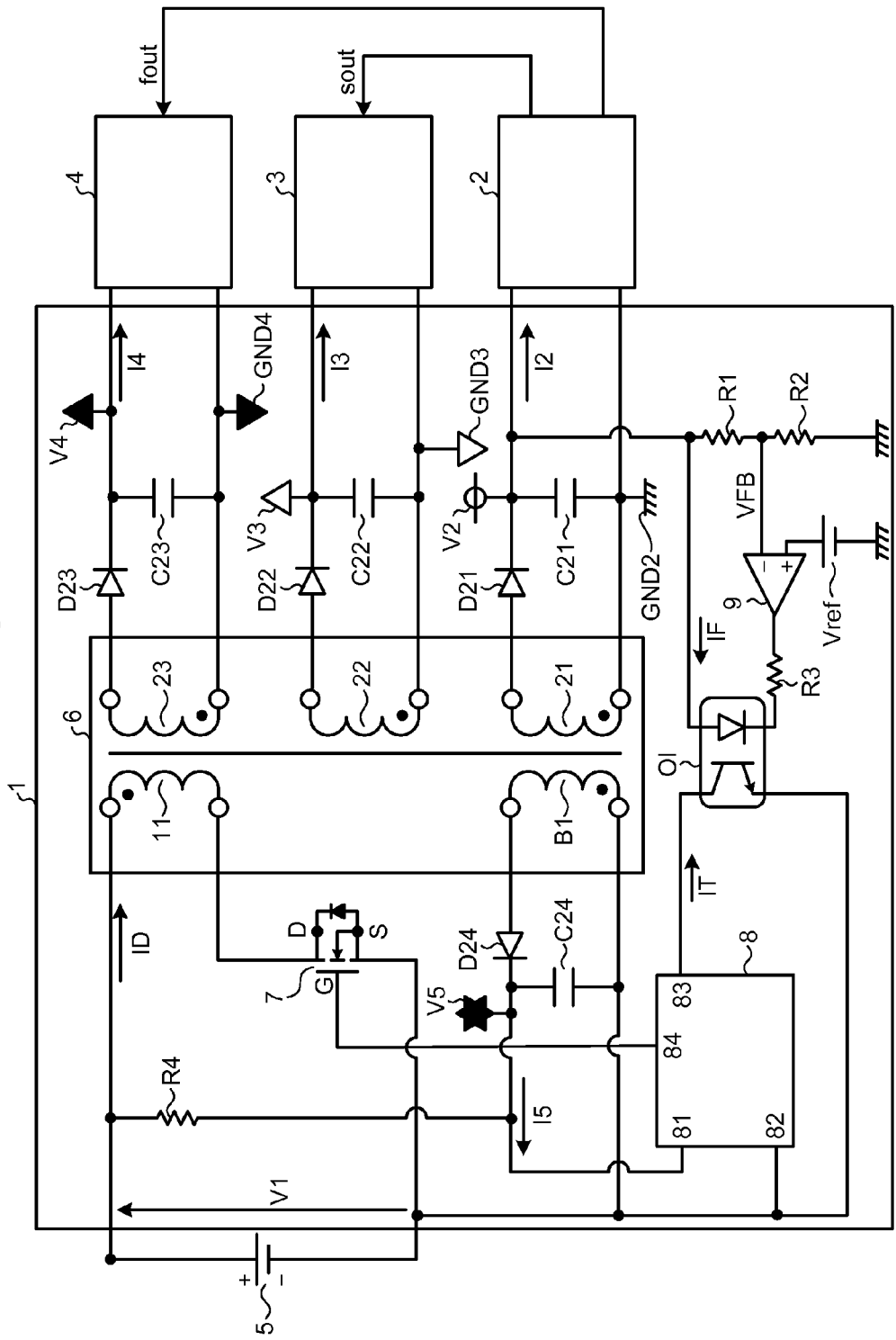
FIG. 1 is a block diagram showing a main part configuration concerning an electronic apparatus mounted with a switching power supply circuit and another circuit according to a first embodiment.

FIG. 1 is a block diagram showing a main part configuration concerning an electronic apparatus mounted with a switching power supply circuit and another circuit according to a first embodiment of the present invention. In FIG. 1, an example is shown in which the switching power supply circuit and the another circuit are mounted on an inverter apparatus. The electronic apparatus includes a switching power supply circuit 1, a control circuit 2, a main circuit 3, a peripheral apparatus circuit 4, and a main power supply 5. The control circuit 2 controls the overall operation of the electronic apparatus. The switching power supply circuit 1 generates, on the basis of electric power of the main power supply, operation power for the main circuit 3, which performs the actual operation of the electronic apparatus, and circuits other than the main circuit 3 (the another circuit) unrelated to the actual operation of the electronic apparatus.

The configuration of the switching power supply circuit 1 is explained. The switching power supply circuit 1 includes a flyback-type insulated transformer (hereinafter simply referred to as "transformer") 6 including a primary winding wire 11, three secondary winding wires 21, 22, and 23, and one auxiliary winding wire B1 and a switching element 7.

A + terminal of the main power supply 5 is connected to a winding start side of the primary winding wire 11 of the transformer 6. A drain terminal of the switching element 7 is connected to a winding end side of the primary winding wire 11 of the transformer 6. A source terminal of the switching element 7 and a – terminal of the main power supply 5 are connected. A gate terminal of the switching element 7 is connected to a signal output terminal 84 of an IC for power supply control 8.

An anode terminal of a diode D21, which rectifies an output voltage of the secondary winding wire 21, is connected to a winding end side of the secondary winding wire 21 of the transformer 6. One end of a capacitor C21, in which a voltage rectified by the diode D21 is charged, is connected to a cathode terminal of the diode D21. The other end of the capacitor C21 is connected to a winding start side of the secondary winding wire 21 of the transformer 6. Further, the winding start side of the secondary winding wire 21 is connected to a ground GND2 as well. Note that a charged voltage V2 of the capacitor C21 is applied to the control circuit 2 and used as electric power of the control circuit 2.

An anode terminal of a diode D22, which rectifies an output voltage of the secondary winding wire 22, is connected to a winding end side of the secondary winding wire 22 of the transformer 6. One end of a capacitor C22, in which a voltage rectified by the diode D22 is charged, is connected to a cathode terminal of the diode D22. The other end of the capacitor C22 is connected to a winding start side of the secondary winding wire 22 of the transformer 6. Further, the winding start side of the secondary winding wire 22 is connected to a ground GND3 as well. Note that a charged voltage V3 of the capacitor C22 is connected to the main circuit 3 to be used as electric power of the main circuit 3.

An anode terminal of a diode D23, which rectifies an output voltage of the secondary winding wire 23, is connected to a winding end side of the secondary winding wire 23 of the transformer 6. One end of a capacitor C23, in which a voltage rectified by the diode D23 is charged, is connected to a cathode terminal of the diode D23. The other end of the capacitor C23 is connected to a winding start side of the secondary winding wire 23 of the transformer 6. Further, the winding start side of the secondary winding wire 23 is connected to a ground GND4 as well. Note that a charged voltage V4 of the capacitor C23 is connected to the peripheral apparatus circuit 4 to be used as electric power of the peripheral apparatus circuit 4.

An anode terminal of a diode D24, which rectifies an output voltage of the auxiliary winding wire B1, is connected to a winding end side of the auxiliary winding wire B1 of the transformer 6. One end of a capacitor C24, in which a voltage rectified by the diode D24 is charged, is connected to a cathode terminal of the diode D24. The other end of the capacitor C24 is connected to a winding start side of the auxiliary winding wire B1 of the transformer 6. Further, the winding start side of the auxiliary winding wire B1 is connected to the – terminal of the main power supply 5 as well. Note that a charged voltage V5 of the capacitor C24 is connected to a power supply terminal 81 of the IC for power supply control 8 to be used as electric power of the IC for power supply control 8. The power supply terminal 81 of the IC for power supply control 8 is connected to the plus terminal of the main power supply 5 via a resistor R4. A ground terminal 82 of the IC for power supply control 8 is connected to the minus terminal of the main power supply 5.

Note that constants of the transformer 6 are as described below.

Numbers of wound wires: the primary winding wire: N11, the secondary winding wire 21: N21, the secondary winding wire 22: N22, the secondary winding wire 23: N23, the auxiliary winding wire: NB1

Inductances: the primary winding wire 11: L11, the secondary winding wire 21: L21, the secondary winding wire 22: L22, the secondary winding wire 23: L23, the auxiliary winding wire: LB1

Effective sectional area of a core: Ae

Constants concerning the operation of the switching power supply circuit 1 are as described below.

A switching frequency: fsw (a PWM control system with an operation frequency fixed)

Efficiency of input/output between input and output in the switching power supply circuit 1: η (η=output power/input power)

The charged voltage V2 of the capacitor C21 is divided by a resistor R1 and a resistor R2 and generated as a feedback voltage VFB. The feedback voltage VFB is input to a minus terminal of an error amplifier 9. A plus terminal of a reference power supply Vref is connected to a plus terminal of the error amplifier 9. Note that the feedback voltage VFB is divided by the resistor R1 and the resistor R2 such that the charged voltage V2 reaching the commanded voltage has a voltage value same as a voltage value of the reference power supply Vref.

A minus terminal of the reference power supply Vref is connected to the ground. A diode-side cathode terminal of a photocoupler OI is connected to an output terminal of the error amplifier 9 via a resistor R3. Note that the charged voltage V2 charged in the capacitor C21 is applied to a diode-side anode terminal of the photocoupler OI.

A transistor-side collector terminal of the photocoupler OI is connected to an input terminal 83 of the IC for power supply control 8. A transistor-side emitter terminal of the photocoupler OI is connected to the minus terminal of the main power supply 5 and the ground terminal 82 of the IC for power supply control 8.

Figure 2:
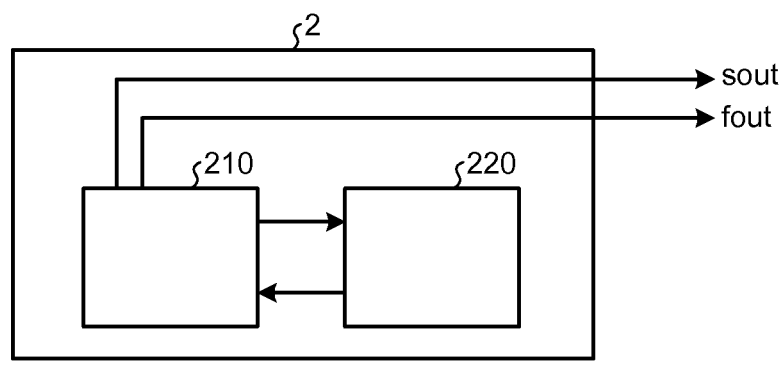
FIG. 2 is a block diagram showing a configuration example of a control circuit.

The configuration and the operation of the control circuit 2 are explained. FIG. 2 is a block diagram showing a configuration example of the control circuit 2. The control circuit 2 has a function of controlling the overall operation of the inverter apparatus shown in FIG. 1. The control circuit 2 is configured by an arithmetic processing unit 210 including a microcomputer, a CPU, an ASIC, or an FPGA and a storage unit 220 including an EEPROM or a flash ROM.

The arithmetic processing unit 210 has a function of controlling the operation of the entire inverter apparatus. The arithmetic processing unit 210 outputs a control signal sout to the main circuit 3 and outputs a control signal fout to the peripheral apparatus circuit 4. The arithmetic processing unit 210 is connected to the storage unit 220 by a signal line. The arithmetic processing unit 210 and the storage unit 220 perform transmission and reception of information each other. In the storage unit 220, information related to the switching power supply circuit 1 is stored. Examples of the information include the constants of the transformer 6, the constants of the switching power supply circuit 1, and information concerning power consumption of the circuits connected to the secondary winding wires 21, 22, and 23 via the diodes D21, D22, and D23. These kinds of information are transmitted to the arithmetic processing unit 210 as appropriate.

The main circuit 3 is explained. In general, the main circuit 3 includes a power module (not shown in the figure) that can supply alternating-current power to a motor to variably control the speed of the motor and a driving circuit (not shown in the figure) for driving the power module. The driving circuit operates on the basis of the electric power of the capacitor C22 and the control signal sout output from the control circuit 2, drives the power module, supplies alternating-current power to the motor, and rotates the motor.

The configuration and the operation of the peripheral apparatus circuit 4 are explained. The peripheral apparatus circuit 4 is a circuit that drives apparatuses (e.g., a cooling fan) not directly related to the driving of the motor. The peripheral apparatus circuit 4 operates on the basis of the control signal fout output from the control circuit 2.

The main power supply 5 is explained. The main power supply 5 functions as a power source of the switching power supply circuit 1. As the main power supply 5, a direct-current power supply is described in the first embodiment. However, the main power supply 5 can be configured to rectify, with a diode or the like, a single-phase alternating-current power supply or a three-phase alternating-current power supply and then charge the single-phase alternating-current power supply or the three-phase alternating-current power supply in a smoothing capacitor and use the smoothing capacitor as the power source. The main power supply 5 can be configured to charge electric power of a direct-current power supply in the smoothing capacitor and use the smoothing capacitor as the power source.

The switching element 7 is explained. The switching element 7 controls, using the main power supply 5 as the power source, a flow of electric power according to ON/OFF of switching and performs operation on the basis of ON/OFF signals output from the IC for power supply control 8. In the first embodiment, the switching element 7 is indicated by MOSFET. However, other switching elements can be used.

The operation of the switching power supply circuit 1 is explained. The switching power supply circuit 1 controls electric power supplied from the main power supply 5 according to the ON/OFF operation of the switching element 7 to cause the three secondary winding wires 21, 22, and 23 and the auxiliary winding wire B1 of the transformer 6 to generate electric power and generates voltages of the respective capacitors C21, C22, C23, and C24 via the rectifying diodes D21, D22, D23, and D24. The IC for power supply control 8 controls the ON/OFF operation of the switching element 7. The IC for power supply control 8 controls, on the basis of the charged voltage V2 of the capacitor C21, an ON time Ton, an OFF time Toff, or a switching frequency fsw of the switching element 7.

(Operation Explanation 1 of the IC for Power Supply Control: ON/OFF Signal Output)

Figure 3:
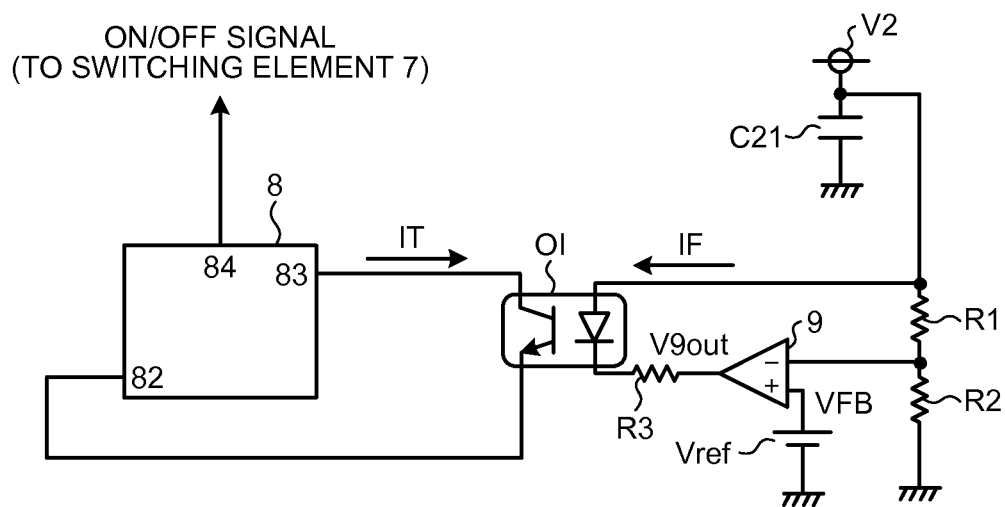
FIG. 3 is a diagram for explaining the operation of an IC for power supply control.

Details of the operation of the IC for power supply control 8 are explained. In FIG. 3, a diagram for explaining the operation of the IC for power supply control 8 is shown. The operation of the IC for power supply control 8 is determined by the operations of the error amplifier 9 and the photocoupler OI. The charged voltage V2 of the capacitor C21 is divided by the resistors R1 and R2. A divided voltage is input to the minus terminal of the error amplifier 9 as the feedback voltage VFB. The error amplifier 9 performs comparison of a voltage value of the reference power supply Vref input to the plus terminal and the feedback voltage VFB input to the minus terminal and outputs an output V9out from the output terminal to reduce a difference between the feedback voltage VFB and the reference power supply Vref. When the feedback voltage VFB is smaller than the reference power supply Vref (i.e., the charged voltage V2 is smaller than a commanded voltage V2ref), the output V9out increases. On the other hand, when the feedback voltage VFB is larger than the reference power supply Vref (when the charged voltage V2 is larger than the commanded voltage V2ref), V9out decreases.

An electric current IF flowing to a diode of the photocoupler OI can be represented by Formula (1) according to a voltage difference between the charged voltage V2 of the capacitor C21 and the output V9out and the resistance R3.

$$IF=(V2-V9out)/R3 \qquad (1)$$

When the charged voltage V2 is larger than the commanded voltage V2ref, because the output V9out of the error amplifier 9 increases, the electric current IF decreases. On the other hand, when the charged voltage V2 is smaller than the commanded voltage V2ref, because the output V9out of the error amplifier 9 decreases, the electric current IF increases.

An electric current IT flowing to a transistor of the photocoupler OI is determined by the magnitude of the electric current IF. When the electric current IF is large, that is, the difference between the charged voltage V2 and the output V9out is large, the electric current IT flowing to the transistor of the photocoupler OI increases. When the electric current IT increases, the IC for power supply control 8 controls the ON time Ton to be short, and the ON time Ton of the switching element 7 decreases. On the other hand, when the difference between the charged voltage V2 and the output V9out is small and the electric current IF is small, the electric current IT flowing to the transistor of the photocoupler OI decreases. The IC for power supply control 8 controls the ON time Ton to be long, and the ON time Ton of the switching element 7 increases.

According to the above explanation, the IC for power supply control 8 has a function of, to set the charged voltage V2 of the capacitor C21 to the commanded voltage V2ref, monitoring the charged voltage V2 of the capacitor C21 with the error amplifier 9 and the photocoupler OI and outputting an ON signal and an OFF signal of the switching element 7 to the gate terminal of the switching element 7 on the basis of a result of the monitoring.

(Operation Explanation 2 of the IC for Power Supply Control: Overcurrent Protection Operation)

Figure 4:
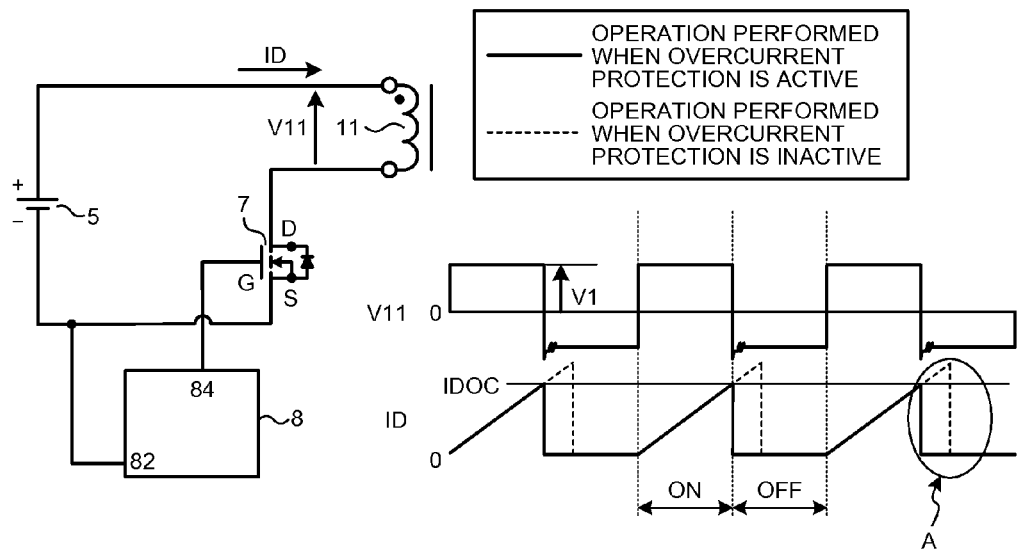
FIG. 4 is a diagram for explaining an overcurrent protection operation of the IC for power supply control.

The overcurrent protection operation of the IC for power supply control 8 is explained. In FIG. 4, a diagram for explaining the overcurrent protection operation of the IC for power supply control 8 is shown. A solid line indicates operation performed when the overcurrent protection operation by the IC for power supply control 8 is active. A broken line indicates operation performed when the overcurrent protection operation by the IC for power supply control 8 is inactive.

When an ON signal is output from the signal output terminal 84 of the IC for power supply control 8 to the gate terminal of the switching element 7, the switching element 7 is turned on. When the switching element 7 is turned on, the electric power of the main power supply 5 is supplied to the primary winding wire 11. An electric current ID flows to the primary winding wire 11 and the switching element 7. The electric current ID is monitored by the IC for power supply control 8. When the overcurrent protection level current value IDOC of the IC for power supply control 8 is IDOC, if the electric current ID reaches the electric current IDOC or exceeds this value, the ON signal output from the signal output terminal 84 is interrupted by the overcurrent protection operation. The switching element 7 is forcibly controlled to off (see a waveform of an A part shown in the figure).

According to the above explanation, the IC for power supply control 8 monitors the electric current ID flowing to the primary winding wire 11 and the switching element 7 and performs comparison with the overcurrent protection level current value IDOC. The IC for power supply control 8 has a function of forcibly turning off the switching element 7 when the electric current ID is equal to or larger than the overcurrent protection level current IDOC.

Figure 5:
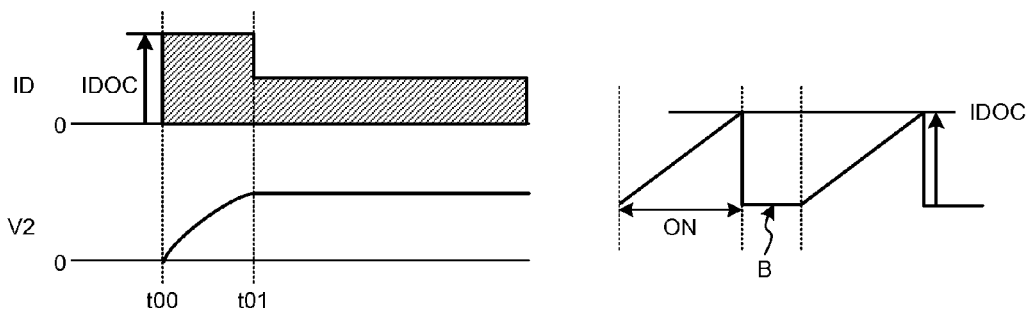
FIG. 5 is a diagram showing a change in the operation of the switching power supply when transitioning from power-on time to a steady state.

Operation performed from the time at which supply of electric power to the main power supply 5 connected to the switching power supply circuit 1 until the time at which the charged voltage V2 of the capacitor C21 reaches the commanded voltage V2ref is explained with reference to FIG. 5. FIG. 5 is a diagram showing a change in the operation of the switching power supply circuit 1 in transition from power-on time to the steady state. FIG. 5 shows operations of the electric current ID flowing through the primary winding wire 11 and the switching element 7 and the charged voltage V2 of the capacitor C21. Time t00 is the time when electric power is supplied to the main power supply 5. A period of time t00 to t01 is a period in which the voltage V2 of the capacitor C21 is not charged up to the commanded voltage V2ref (hereinafter referred to as "start time or during start"). A period after time t01 is a period in which the voltage V2 of the capacitor C21 maintains the commanded voltage V2ref (hereinafter referred to as "steady time or steady state").

Time t00 is explained. As explained above, time TOO is the time when electric power is supplied to the main power supply 5 and is the time when the switching power supply circuit 1 starts operation. At this time, a voltage is not charged in the capacitor C24 and the IC for power supply control 8 cannot operate. Therefore, at operation start time of the switching power supply circuit 1, electric power is supplied from the main power supply 5 to the IC for power supply control 8 via the resistor R4 and the IC for power supply control 8 starts operation. When the IC for power supply control 8 starts the operation, the switching element 7 starts an ON/OFF operation on the basis of the above Formula (1). When the switching element 7 is ON, the electric current ID flows to the primary winding wire 11 and the switching element 7 and electric power is accumulated in the primary winding wire 11. At this point, electric power is not accumulated in the secondary winding wires 21, 22, and 23 and the auxiliary winding wire B1. When the switching element 7 is turned off, energy accumulated in the primary winding wire 11 is sent to the secondary winding wires 21, 22, and 23 and the auxiliary winding wire B1, and an electric current flows to the capacitors C21, C22, C23, and C24 via the diodes D21, D22, D23, and D24 and charged.

Time t00 to t01 is explained. In this period, a voltage is not charged in the capacitor C21. Therefore, as it is seen from the above Formula (1), IF hardly flows. In this case, an ON time of the switching element 7 is an allowable maximum ON time of the IC for power supply control 8. When the ON time increases, the electric current ID flowing to the switching element 7 increases and reaches the overcurrent protection level current value IDOC of the IC for power supply control 8. When the electric current ID reaches the overcurrent protection level current value IDOC, as shown in a B part shown in the figure, the IC for power supply control 8 turns off the switching operation of the switching element 7 according to the overcurrent protection operation. The switching element 7 keeps the OFF state until the time for turning on the switching operation comes next. These operations are repeated until the charged voltage V2 of the capacitor C21 reaches the commanded voltage V2ref.

Operation after time t01 is explained. When the voltage V2 of the capacitor C21 is charged to the commanded voltage V2ref, the ON time of the switching element 7 is set to a proper time and an excessively large electric current does not flow. Similarly, the voltages of the other capacitors (C22 to C24) are also sufficiently charged. When the voltage of the capacitor C24 is sufficiently charged, the IC for power supply control 8 operates using the charged voltage V5 of the capacitor C24 as a power supply.

Figure 6:
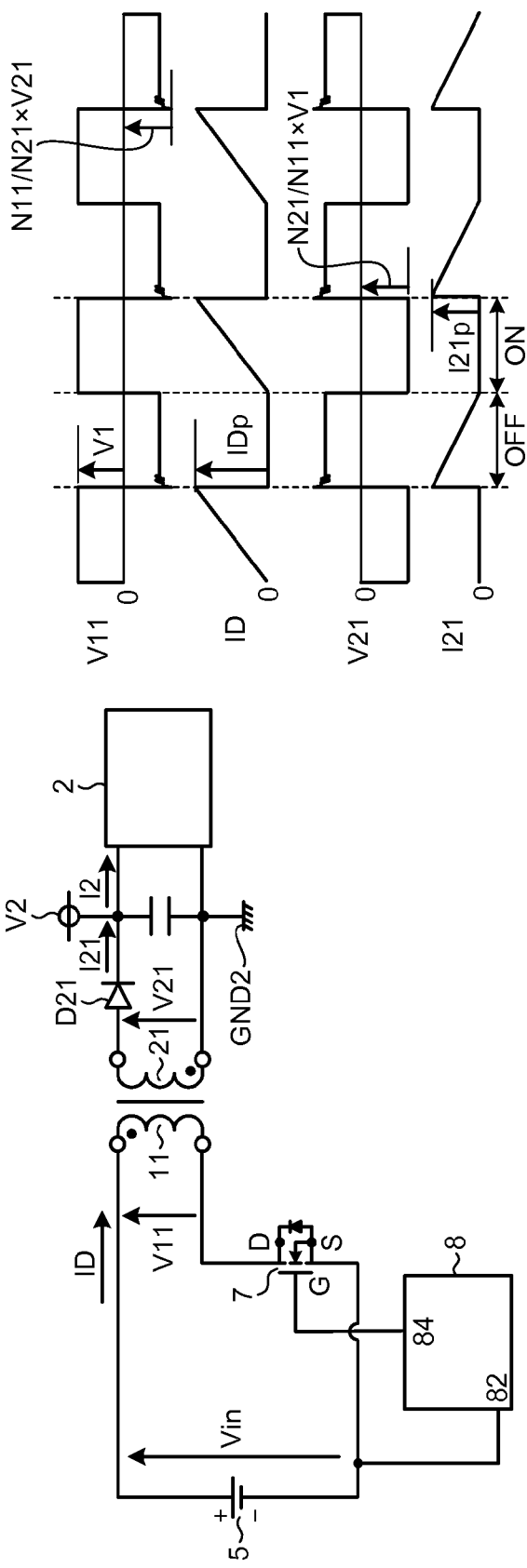
FIG. 6 is a diagram for explaining the operation of the switching power supply circuit at steady time.

The operation of the switching power supply circuit 1 in the steady state is explained. FIG. 6 is a diagram for explaining the operation of the switching power supply circuit 1 at the steady time. FIG. 6 shows operations of a voltage across terminals V11 of the primary winding wire 11, a voltage across terminals V21 of the secondary winding wire 21, the electric current ID flowing to the primary winding wire 11 and the switching element 7, and an electric current I21 flowing to the secondary winding wire 21 and the diode D21 of the transformer 6 in the steady state. Note that the operations of the diodes D22, D23, and D24 respectively connected to the secondary winding wires 22 and 23 and the auxiliary winding wire B1 are the same as the operations of the secondary winding wire 21, the diode D21, and the like shown in FIG. 6. Therefore, explanation of the operations is omitted.

(Operation Performed when the Switching Element 7 is Turned on)

When the switching element 7 is on, the voltage across terminals V11 of the primary winding wire 11 is the same as the power supply voltage V1 of the main power supply 5. The electric current ID flows to the primary winding wire 11 and the switching element 7, energy is accumulated in the primary winding wire 11, and the core of the transformer 6 is magnetized. At this point, a voltage of a winding ratio N21/N11×V11 is generated in a minus direction between terminals of the secondary winding wire 21. However, an electric current does not flow to the secondary winding wire 21 and the diode D21 because of the diode D21.

(Operation Performed when the Switching Element 7 is Turned Off)

When the switching element 7 is off, electric power is supplied to the secondary winding wires 21, 22, and 23 and the auxiliary winding wire B1. Therefore, a voltage is generated in the plus direction in the voltage across terminals V21 of the secondary winding wire 21. On the other hand, a voltage of a winding ratio N11/N21×V21 is generated in the minus direction in the voltage across terminals V11 of the primary winding wire 11. At this point, because the switching element 7 is off, an electric current does not flow to the switching element 7. On the other hand, the electric current I21 flows to the diode D21.

The relation between the power supply voltage of the main power supply 5 and the operation of the switching power supply circuit 1 is explained with reference to FIG. 7. FIG. 7 is a diagram for explaining a change in the operation of the switching power supply circuit 1 with respect to a change in the power supply voltage of the main power supply. Note that operation conditions of the switching power supply circuit 1 are as described below.

(Operation Conditions of the Switching Power Supply Circuit 1)

A switching frequency is fixed at fsw

A circuit load connected to the secondary winding wires is fixed, that is, a power load supplied by the switching power supply circuit 1 is fixed.

Only a power supply voltage of the main power supply 5 changes

Figure 7A:
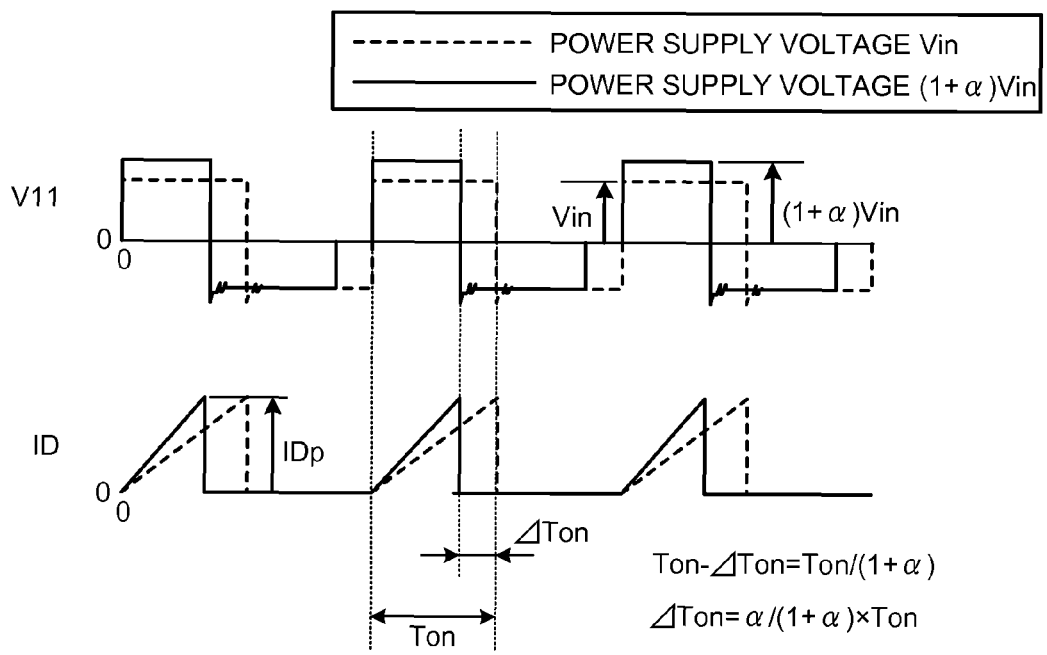
FIG. 7a is a diagram for explaining a change in the operation on a primary side of the switching power supply circuit with respect to a change in a power supply voltage of a main power supply.
Figure 7B:
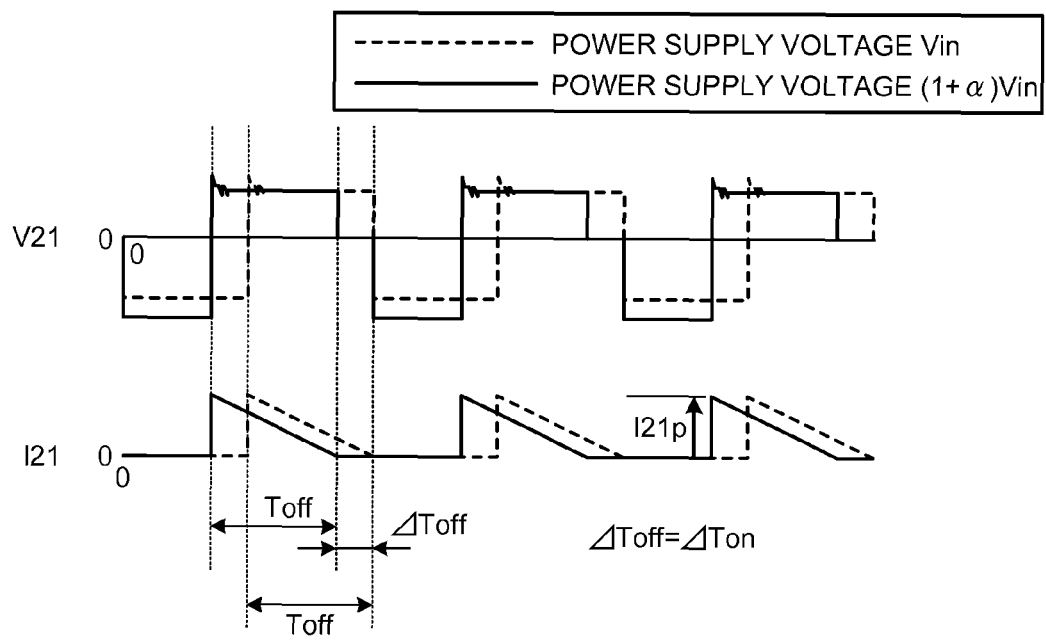
FIG. 7b is a diagram for explaining a change in the operation on a secondary side of the switching power supply circuit with respect to the change in the power supply voltage of the main power supply.

FIG. 7a shows operation waveforms of the voltage across terminals V11 of the primary winding wire 11 and the electric current ID flowing to the primary winding wire 11 and the switching element 7. FIG. 7b shows operation waveforms of the voltage across terminals V21 of the secondary winding wire 21 and the electric current I21 flowing to the secondary winding wire 21 and the diode D21. A solid broken line indicates an operation waveform of a power supply voltage Vin of the main power supply 5. A broken solid line indicates an operation waveform of a power supply voltage $(1+\alpha)\times$Vin ($\alpha$ is a positive real number) of the main power supply 5.

FIG. 7a is explained. As explained above, when the switching element 7 is turned on, the electric power of the main power supply 5 is supplied to the primary winding wire 11. The electric current ID flows to the primary winding wire 11 and the switching element 7. When the power supply voltage of the main power supply 5 is Vin, the ON time of the switching element 7 is Ton. On the other hand, when the power supply voltage is $(1+\alpha)\times$Vin, the ON time of the switching element 7 is reduced to Ton−$\Delta$ton. When the switching element 7 is turned off, an electric current does not flow to the primary winding wire 11 and the switching element 7. When the power supply voltage of the main power supply 5 is Vin, the OFF time of the switching element 7 is Toff. On the other hand, when the power supply voltage is $(1+\alpha)\times$Vin, the OFF time of the switching element 7 increases to Toff+$\Delta$Ton.

Explanation of a Principle of FIG. 7a Using Formulas)

The principle of FIG. 7a is explained using formulas. The operation of the switching power supply circuit 1 is determined by a voltage value applied to the primary winding wire and a total power load of the circuits connected to the secondary winding wires 21, 22, and 23 and the auxiliary winding wire B1. When the total power load of the secondary winding wires 21, 22, and 23 and the auxiliary winding wire B1 at the steady time of the switching power supply circuit 1 is represented as Pall and the efficiency of the entire switching power supply circuit 1 is represented as $\eta$, electric power Pin necessary for the primary winding wire 11 at the steady time can be represented by Formula (2).

$$Pin=Pall/\eta \quad (2)$$

When a peak current of the electric current ID flowing to the primary winding wire 11 and the switching element 7 is represented as IDp, the ON time of the switching element 7 is represented as Ton, and the inductance of the primary winding wire 11 is represented as L11, IDp can be represented by Formula (3).

$$IDp=V1/L11\times Ton \quad (3)$$

When a peak current of the electric current ID flowing to the primary winding wire 11 and the switching element 7 is represented as IDp, an average current is represented as IDave, the ON time of the switching element 7 is represented as Ton, and the OFF time of the switching element 7 is represented as Toff, the average current IDave can be represented by Formula (4).

$$IDave=\tfrac{1}{2}\times IDp\times Ton/(Ton+Toff) \quad (4)$$

The electric power Pin can be represented by Formula (5) from the power supply voltage V1 of the main power supply 5 and the average current IDave.

$$Pin=IDave\times V1 \quad (5)$$

When a cycle of the operation of the switching element 7 is represented as Tall, the cycle Tall can be represented by Formula (6).

$$Tall=Ton+Toff \quad (6)$$

The switching frequency tsw, at which the switching power supply circuit 1 operates, and the cycle Tall have a relation of Formula (7).

$$fsw=1/Tall \quad (7)$$

The power Pin can be represented by Formula (8) from the peak current IDp, the switching frequency fsw, and the inductance L11 of the primary winding wire.

$$Pin=\tfrac{1}{2}\times L11\times IDp^2\times fsw \quad (8)$$

From Formula (8), the peak current IDp can be represented by Formula (9).

$$IDp=\sqrt{(2\times Pin/(fsw\times L11))} \quad (9)$$

From the operation conditions of the switching power supply circuit 1 shown in FIG. 7 and Formula (2), if the efficiency $\eta$ is fixed, the electric power Pin is fixed irrespective of the power supply voltage V1 of the main power supply 5. As explained above, Formula (9) represents the peak current IDp. Components fsw and L11 of Formula (9) are fixed values. Therefore, if the electric power Pin is fixed, the peak current IDp is also fixed.

As explained above, Formula (5) calculates the electric power Pin from the power supply voltage V1 and the average current IDave of the main power supply 5. When an average current at the time when the power supply voltage V1 of the main power supply 5 is Vin is represented as IDave1 and an average current at the time when the power supply voltage is $(1+\alpha)\times$Vin is represented as IDave2, the average currents IDave1 and IDave2 can be represented as described below.

$$IDave1=Pin/Vin \quad (10)$$

$$IDave2=Pin/((1+\alpha)\times Vin) \quad (11)$$

Formula (10) and Formula (11) indicate that, when the power supply voltage V1 of the power supply 5 is high, the average current IDave necessary for the primary winding wire 11 and the switching element 7 is small.

When a result of Formula (6) is used in Formula (4), Formula (4) can be represented as described below.

$$IDave = \frac{1}{2} \times IDp \times Ton/Tall \qquad (12)$$

When Formula (12) is transformed into a formula of the ON time Ton of the switching element 7, the formula can be represented by Formula (13).

$$Ton = 2 \times IDave \times Tall/IDp = 2 \times IDave/fsw/IDp \qquad (13)$$

When IDave1 and IDave2 respectively calculated by Formula (10) and Formula (11) are input to Formula (13) and ON times of the switching element 7 to be calculated are respectively represented as Ton1 and Ton2, the ON times Ton1 and Ton2 can be represented as described below.

$$Ton1 = 2 \times IDave1/fsw/IDp = 2 \times Pin/Vin/fsw/IDp \qquad (14)$$

$$Ton2 = 2 \times IDave2/fsw/IDp = 2 \times Pin/((1+\alpha) \times Vin)/fsw/IDp = 1/(1+\alpha) \times 2 \times Pin/Vin/fsw/IDp = 1/(1+\alpha) \times Ton1 \qquad (15)$$

When a difference between the ON time Ton1 and the ON time Ton2 is represented as ΔTon, the difference ΔTon can be represented as described below.

$$\Delta Ton = Ton1 - Ton2 = Ton1 - 1/(1+\alpha) \times Ton1 = (\alpha/(1+\alpha)) \times Ton1 \qquad (16)$$

When Ton1 of Formula (16) is replaced by Ton, the difference ΔTon can be represented as described below.

$$\Delta Ton = (\alpha/(1+\alpha)) \times Ton \qquad (17)$$

Further, when Ton1 of Formula (15) is replaced by Ton, the ON time Ton2 can be represented as described below.

$$Ton2 = (1/(1+\alpha)) \times Ton \qquad (18)$$

Formula (17) and Formula (18) indicate that the ON time of the switching element 7 decreases when the power supply voltage V1 of the main power supply 5 is increased. For example, Formula (17) and Formula (18) indicate that, when the power supply voltage V1 of the main power supply 5 is multiplied with (1+α), the ON time of the switching element 7 is multiplied with (1/(1+α)).

(Explanation of a Principle of FIG. 7b Using Formulas)

As in the case of FIG. 7a, the principle of FIG. 7b is explained using formulas. As explained above, when the switching element 7 is on, an electric current does not flow to the secondary winding wire 21 and the diode D21. When the switching element 7 is off, the electric current I21 flows to the secondary winding wire 21 and the diode D21. As in FIG. 7a, when the power supply voltage of the main power supply 5 is Vin, the time when the switching element 7 is turned off is Toff, and the electric current I21 flows for a period of Toff. On the other hand, when the power supply voltage of the main power supply 5 is (1+α)×Vin, time when the switching element 7 is turned off is Toff+ΔTon. However, a period in which the electric current I21 flows is only a period of Toff, and the electric current I21 is 0 during the period of ΔTon.

The electric current I21 flowing to the secondary winding wire 21 and the diode D21 is determined by a circuit load connected to the secondary winding wire 21, that is, electric power of the control circuit 2. The power supply voltage of the control circuit 2 is V2, and when the electric current flowing to the control circuit 2 is represented as I2, a power load P2 in the control circuit 2 can be represented by Formula (19).

$$P2 = V2 \times I2 \qquad (19)$$

When a peak current of the electric current I21 flowing through the secondary winding wire 21 and the diode D21 is represented as I21p, the electric power P21 of the secondary winding wire 21 can be represented by Formula (20).

$$P21 = \frac{1}{2} \times L21 \times I21p^2 \times fsw \qquad (20)$$

Because the electric power P21 and the electric power P2 are the same, there is a relation described below.

$$P21 = P2 \qquad (21)$$

From the operation conditions shown in FIGS. 7, P2 and P21 are fixed. Therefore, from Formula (20), the peak current I21p is fixed. Therefore, there is a relation described below between the electric current I2 and the peak current I2p1 I21p.

$$I2 = \frac{1}{2} \times I21p \times Toff/Tall \qquad (22)$$

Formula (22) is transformed as indicated by Formula (23).

$$Toff = 2 \times I2 \times Tall/I21p \qquad (23)$$

Toff of Formula (23) indicates the time in which the electric current I21 flows. Formula (23) indicates that, because the electric current I2, the switching cycle Tall, and the peak current I21p are fixed, Toff is also fixed.

From the above explanation, as explained above, when the power supply voltage of the main power supply 5 is increased, the OFF time of the switching element 7 increases. However, as understood from Formula (23), even if the OFF time of the switching element 7 increases, a period in which the electric current I21 flowing to the secondary winding wire 21 flows does not change.

From the above explanation, the switching power supply circuit 1 performs operation explained below.

(1) At the start time, the switching power supply circuit 1 operates the IC for power supply control 8 via the resistor R4 and operates the switching element 7. However, at the start time, because the voltage V2 of the capacitor C21 does not reach the commanded voltage, the switching power supply circuit 1 repeats the overcurrent protection operation from the overcurrent state until the charged voltage V2 of the capacitor C21 reaches the commanded voltage.

(2) At the steady time, when the switching element 7 is on, an electric current flows to the primary winding wire 11 and the switching element 7. The voltage across terminals V11 of the primary winding wire 11 is the same as the power supply voltage Vin. In the voltage across terminals V21 of the secondary winding wire 21, a value obtained by integrating the voltage across terminals V11 of the primary winding wire 11 with the winding ratio N21/N11 is generated in the minus direction.

(3) At the steady time, when the switching element 7 is off, an electric current does not flow to the primary winding wire and the switching element 7. In the voltage across terminals V11 of the primary winding wire 11, a value obtained by integrating the voltage across terminals V21 of the secondary winding wire 21 with the winding ratio N11/N21 is generated in the minus direction. On the other hand, a voltage is generated in the plus direction in the secondary winding wire 21, and an electric current flows to the secondary winding wire 21 and the diode D21.

(4) At the steady time, when the electric power Pin necessary for the primary winding wire 11, the inductance L11 of the primary winding wire 11, and the switching frequency fsw of the switching element 7 are the same, the current peak value IDp of the electric current ID flowing to the primary winding wire 11 and the switching element 7 is fixed.

(5) At the steady time, when the power supply voltage V1 of the main power supply 5 increases, the ON time Ton of the switching element 7 decreases at an inverse of the increase of the power supply voltage V1. Conversely, when the power supply voltage V1 decreases, the ON time Ton increases at an inverse of the decrease of the power supply voltage V1.

(6) At the steady time, when the electric power P21 necessary for the secondary winding wire 21, the inductance L21 of the secondary winding wire 21, and the switching frequency fsw are the same, the current peak value I21p of the electric current I21 flowing to the secondary winding wire 21 and the diode D21 is fixed.

(7) At the steady time, even if the ON time Ton of the switching element 7 decreases by ΔTon according to an increase in the power supply voltage V1 of the main power supply 5, the time in which the electric current I21 flows to the secondary winding wire 21 and the diode D21 does not change from Toff, and an electric current does not flow during ΔTon.

(Problems Concerning Setting of the Overcurrent Protection Level)

Setting of the overcurrent protection level current with which the overcurrent protection operation of the IC for power supply control 8 works is explained. As shown in FIG. 4, at the start time, the switching power supply circuit 1 charges, while repeating the overcurrent protection operation and the release, voltages in the capacitors C21, C22, C23, and C24, respectively connected to the secondary winding wires 21, 22, and 23 and the auxiliary winding wire B1. When the voltage of the capacitor C21 monitored by the IC for power supply control 8 is sufficiently charged, the operation of the switching power supply circuit 1 changes to the steady state.

Figure 8A:
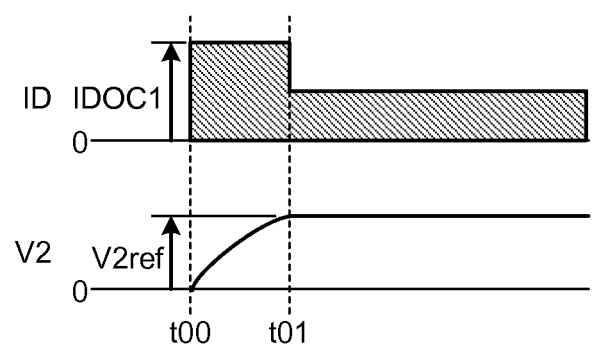
FIG. 8a is a diagram showing operation waveforms of an electric current ID and a voltage V2 at the time when setting of an overcurrent protection level current value IDOC is IDOC1.
Figure 8B:
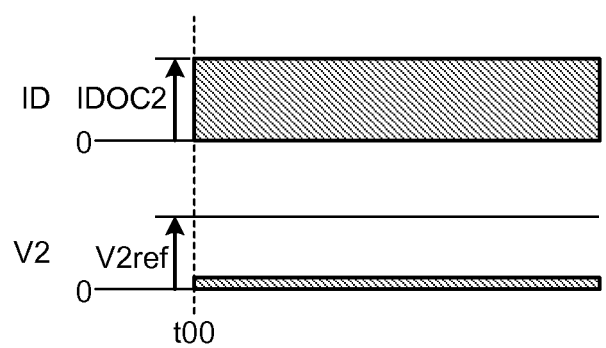
FIG. 8b is a diagram showing operation waveforms of the electric current ID and the voltage V2 at the time when the setting of the overcurrent protection level current value IDOC is IDOC2 (<IDOC1).

In FIG. 8, diagrams for explaining the operation of the switching power supply circuit 1 according to the setting of the overcurrent protection level are shown. FIG. 8a shows operation waveforms of the electric current ID and the voltage V2 at the time when the setting of the overcurrent protection level current value IDOC is IDOC1. FIG. 8B shows operation waveforms of the electric current ID and the voltage V2 at the time when the setting of the overcurrent protection level current value IDOC is IDOC2.

FIG. 8a is explained. Time t00 indicates the time when electric power is supplied to the main power supply 5. Time t01 indicates the time when the charged voltage V2 has reached the commanded voltage V2ref and the switching power supply circuit 1 changes to the steady state. Time t00 to t01 is a period in which the charged voltage V2 is charged while the overcurrent protection operation and the release of the IC for power supply control 8 are repeated, that is, a period indicating the operation at the start time. In FIG. 8a, sufficient power energy is accumulated in the primary winding wire 11 at the start time according to the overcurrent protection level current value IDOC1. Therefore, at time t01, the charged voltage V2 can be charged up to the commanded voltage V2ref.

FIG. 8b is explained. As in FIG. 8a, time t00 indicates the time when electric power is supplied to the main power supply 5. In FIG. 8b, with the overcurrent protection level current value IDOC2, a state continues in which power energy accumulated in the primary winding wire 11 at the start time is insufficient and the voltage V2 cannot be charged up to the commanded voltage V2ref.

It is seen from FIG. 8a and FIG. 8b that the overcurrent protection level current value IDOC with which the commanded voltage V2ref can be charged in the capacitor C21 connected to the secondary winding wire 21 via the diode D21 has to be set.

On the other hand, when the overcurrent protection level current value IDOC is increased, although abnormality occurs in the circuit connected to the secondary winding wire 21 at the steady time, and an excessively large electric current continues to flow to the secondary winding wire 21 side, so that the operation of the switching element 7 needs to be stopped, it is likely that the electric current ID flowing to the primary winding wire 11 and the switching element 7 does not reach the overcurrent protection level current value IDOC and the switching element 7 continues the operation.

In this case, an excessively large electric current continues to flow to the diode D21 connected to the secondary winding wire 21. Therefore, for prevention of thermal destruction of the diode, the heat capacity of the diode has to be increased. Concerning the switching element 7 as well, operation with the overcurrent protection level current needs to be taken into account. For a reduction of heat generation with the overcurrent protection level current, the heat capacity has to be increased as in the diode. Further, concerning the transformer 6 as well, because an excessively large electric current flows to the primary winding wire 11, to prevent magnetic saturation, the core needs to be increased in size or the number of winding wires needs to be increased. As a result, the components of the switching power supply circuit 1 are increased in size, leading to an increase in a substrate size and an increase in costs of the entire apparatus.

Therefore, in the first embodiment, the control circuit 2 includes means for controlling start/stop of the operations of the main circuit 3 and the peripheral apparatus circuit 4 and controls the operation of the switching power supply circuit 1 according to steps explained below.

(First Step)

A first step is operation during a period from power supply to the main power supply 5 until the voltage V2 reaches the commanded voltage V2ref, that is, operation during the start period. In this period, electric power is supplied to the control circuit 2 and the IC for power supply control 8. At this point, the main circuit 3 and the peripheral apparatus circuit 4 do not start operations. That is, there is no power consumption in the main circuit 3 and the peripheral apparatus circuit 4.

(Second Step)

A second step is operation during a period in which the voltage V2 reaches the commanded voltage V2ref and the control circuit 2 and the IC for power supply control 8 are operating, that is, operation during the steady period. In this period, the main circuit 3 and the peripheral apparatus circuit 4 do not start operations before a delay time Δt1 set in advance elapses.

(Third Step)

A third step is operation during a period in which the main circuit 3 and the peripheral apparatus circuit 4 start operations and all the circuits perform operations. In this period, after the elapse of the delay time Δt1, the output signals sout and fout are output from the control circuit 2 respectively to the main circuit 3 and the peripheral apparatus circuit 4.

(Effects by First to Third Steps)

Figure 9:
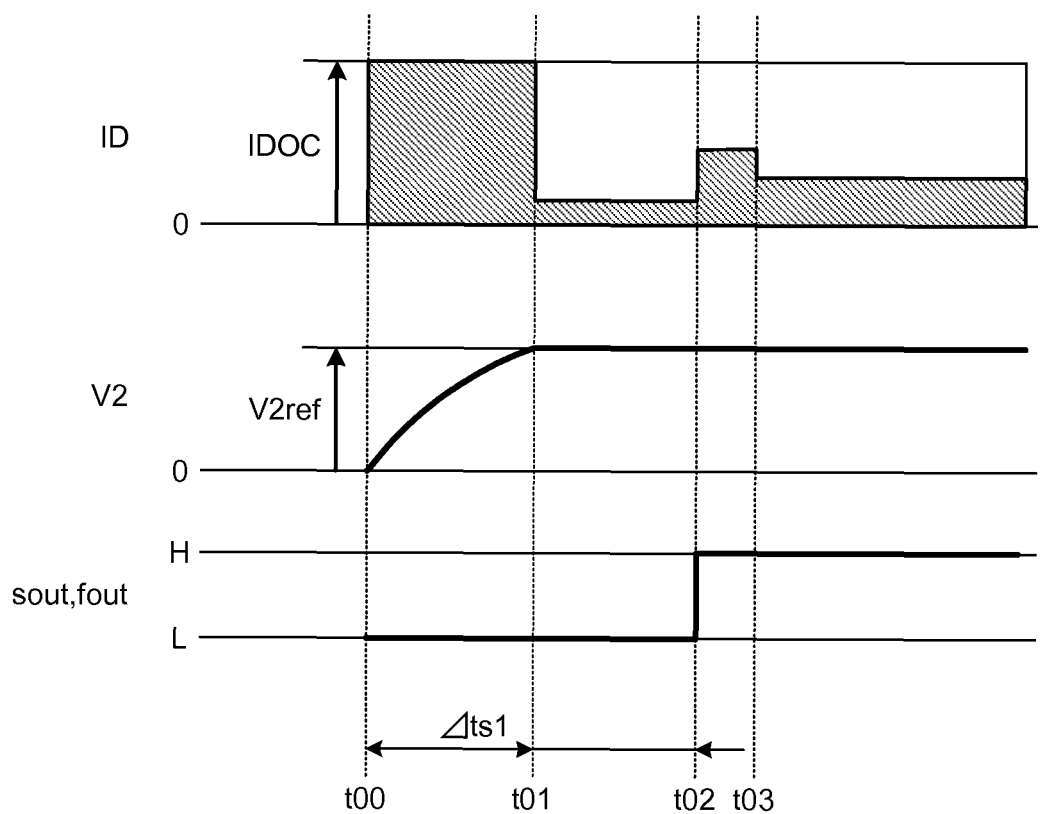
FIG. 9 is a diagram for explaining effects by the switching power supply circuit in the first embodiment.

FIG. 9 is a diagram for explaining effects by the switching power supply circuit 1 in the first embodiment. In FIG. 9, operation waveforms of the electric current ID, the voltage V2, the output signal sout from the control circuit 2 to the main circuit 3, and the output signal fout from the control circuit 2 to the peripheral apparatus circuit 4 are shown.

Time t00 is the time when electric power is supplied to the power supply voltage V1 of the main power supply 5. Time t00 to t01 is the first step and is the start time of the switching power supply circuit 1, that is, a period in which the capacitors C21, C22, C23, and C24 connected to the secondary winding wires 21, 22, and 23 and the auxiliary winding wire B1 via the diodes D21, D22, D23, and D24 are charged. In this period, the control circuit 2 and the IC for power supply control 8 are driven. Time t01 is the time when the voltage V2 has reached the commanded voltage V2ref. Time t01 to t02 is the second step and is a period in which the control circuit 2 and the IC for power supply control 8 are operating in the steady state. Time t02 is the third step and is the time when the output signals sout and fout are output from the control circuit 2 to the main circuit 3 and the peripheral apparatus circuit 4. After time t03, all the circuits are operating in the steady state. More detailed operations of the first to third step are explained below.

(First Step: Time t00 to t01)

As explained above, at the first step, the charging of the capacitors C21, C22, C23, and C24 connected to the secondary winding wires 21, 22, and 23 and the auxiliary winding wire B1, and the power supply to the control circuit 2 and the IC for power supply control 8 are performed. At time t00, electric power is supplied to the main power supply 5 and the switching power supply circuit 1 starts operation. At the start time, the overcurrent protection operation and the release operation of the IC for power supply control 8 are repeated. Therefore, the electric current ID flows up to the overcurrent protection level current IDOC and the voltage V2 is charged. At time t01, the voltage V2 reaches the commanded voltage V2ref. As explained above, at the first step, power supply to the control circuit 2 and the IC for power supply control 8 is performed. Besides, operation for charging the capacitors C21, C22, C23, and C24 connected to the secondary winding wires 21, 22, and 23 and the auxiliary winding wire B1 up to respective commanded voltages is also performed. When the overcurrent protection level current value IDOC is represented as IDOC, the commanded voltage to the capacitor C22 is represented as V3ref, the commanded voltage to the capacitor C23 is represented as V4ref, the commanded voltage to the capacitor C24 is represented as V5ref, a period of time t00 to time t01 is represented as $\Delta ts1$, and an electric current consumed by the IC for power supply control 8 is represented as I5, the first step can be represented by the following formula.

$$\tfrac{1}{2} \times L11 \times IDOC^2 \times fsw \times \Delta ts1 = (\tfrac{1}{2} \times C21 \times V2ref^2 + \tfrac{1}{2} \times C22 \times V3ref^2 + \tfrac{1}{2} \times C23 \times V4ref^2 + \tfrac{1}{2} \times C24 \times V5ref^2 + V2ref \times I2 \times \Delta ts1 + V5ref \times I5 \times \Delta ts1)/\eta \qquad (24)$$

(Second Step: Time t01 to t02)

As explained above, at the second step, the operations of the main circuit 3 and the peripheral apparatus circuit 4 are not started before the delay time $\Delta t1$ set in advance elapses. The switching power supply circuit 1 is in the steady state and the control circuit 2 and the IC for power supply control 8 are operating. In this period, the charging of the capacitors C21, C22, C23, and C24 to the command voltages is completed. An excessively large electric current does not flow as the electric current ID. The operations of the main circuit 3 and the peripheral apparatus circuit 4 are not started before the delay time $\Delta t1$ ($\Delta t1=t02-t01$) set in advance elapses. Note that, when a current peak value of an electric current flowing to the primary winding wire 11 and the switching element 7 in this period is represented as ID2p, power consumption of the primary winding wire 11 can be represented by a formula described below.

$$\tfrac{1}{2} \times L11 \times ID2p^2 \times fsw = (V2 \times I2 + V5 \times I5)/\eta \qquad (25)$$

(Third Step: Time t02 to t03)

As explained above, at the third step, the operations of the main circuit 3 and the peripheral apparatus circuit 4 are started according to the output signals sout and fout from the control circuit 2. At time t02 when the delay time $\Delta t1$ has elapsed, the output signals sout and fout are output from the control circuit 2 respectively to the main circuit 3 and the peripheral apparatus circuit 4. In a period of t02 to t03, the electric current ID increases. This is because the main circuit 3 and the peripheral apparatus circuit 4 start operations and a power load on the secondary winding wires 22 and 23 increases. At time t03, the switching power supply circuit 1 is in the steady state in a state in which all the circuits connected to the switching power supply circuit 1 are operating. A current peak value of an electric current flowing to the primary winding wire 11 and the switching element 7 after time t03 is represented as ID3p, an electric current consumed by the main circuit 3 is represented as I3, and an electric current consumed by the peripheral apparatus circuit 4 is represented as I4, power consumption of the primary winding wire 11 can be represented by a formula described below.

$$\tfrac{1}{2} \times L11 \times ID3p^2 \times fsw = (V2 \times I2 + V3 \times I3 + V4 \times V4I4 + V5 \times I5)/\eta \qquad (26)$$

As explained above, in the switching power supply circuit 1 and the control method therefor in the first embodiment, the switching power supply circuit 1 includes, in the control circuit 2, the means for controlling the operations of the main circuit 3, the peripheral apparatus circuit 4, and the like. At the start time, the switching power supply circuit 1 establishes sequence control for performing the charging in the capacitors C21, C22, C23, and C24 connected to the secondary winding wires 21, 22, and 23 and the auxiliary winding wire B1 via the diodes D21, D22, D23, and D24, and the power supply to the control circuit 2 and the IC for power supply control 8 and, after changing to the steady state, operating the main circuit 3, the peripheral apparatus circuit 4, and the like. Consequently, it is possible to reduce a power load at the start time in the switching power supply circuit 1 and charge the capacitors C21, C22, C23, and C24 connected to the secondary winding wires 21, 22, and 23 and the auxiliary winding wire B1 to the commanded voltages, that is, change the operation of the switching power supply circuit 1 to the steady state without increasing the overcurrent protection level current value IDOC, that is, without switching the overcurrent protection level current value.

With the switching power supply circuit 1 and the control method therefor in the first embodiment, even when abnormality occurs in the switching power supply circuit 1, for example, when abnormality occurs in the circuits connected to the secondary winding wires 21, 22, and 23 in the steady state, because the overcurrent protection level current value IDOC is not increased, it is made possible to quickly stop the operation of the switching element 7. Therefore, it is possible to reduce the heat capacities of the diodes D21, D22, D23, and D24 connected to the secondary winding wires and the auxiliary winding wire B1 and the switching element 7. It is also made possible to prevent magnetic saturation of the transformer 6. As a result, it is made possible to reduce the components of the switching power supply circuit 1 in size. It is made possible to attain a reduction in the size and a reduction in the costs of the switching power supply circuit 1.

With the switching power supply circuit 1 and the control method therefor in the first embodiment, it is made possible to perform, with the IC for power supply control 8, the ON/OFF control of the switching element 7 and the overcurrent protection operation, and control, with the control circuit 2, start/stop of the operations in the circuits respectively connected to the secondary winding wires 21, 22, and 23 to perform increase and decrease control of power consumption in the secondary winding wires 21, 22, and 23. Therefore, it is unnecessary to use the IC for power supply control 8 that has a high function and performs complicated operation. It is possible to use the inexpensive IC for power supply control 8.

Unlike Patent Literature 1 explained above, it is unnecessary to monitor the voltage of the capacitor connected to the auxiliary winding wire. In the case of a configuration including a constant-voltage direct-current power supply such as a DC 24 V power supply or a DC 15 V power supply, the auxiliary winding wire can be eliminated from the transformer. Therefore, it is made possible to attain a reduction in the size of the transformer.

Note that, in the first embodiment, as shown in FIG. 9, as an example, the output signals sout and fout are simultaneously output. However, it is also possible to output sout first and thereafter output fout to perform further power load distribution. It is also possible to control the operation start of not only the main circuit 3 and the peripheral apparatus circuit 4 connected to the other secondary winding wires 21, 22, and 23 but also the another circuit mounted on the control circuit 2. For example, it is also possible to configure a sequence control system that operates only the arithmetic processing unit 210 and the storage unit 220 at the start time and, after changing to the steady state, starts the operation of the another circuit mounted on the control circuit 2. In the sequence control system, hardware including a comparator and a timer circuit can be configured in the control circuit 2 or software, a logic circuit, and the like can be configured in the arithmetic processing unit 210.

Second Embodiment

Figure 10:
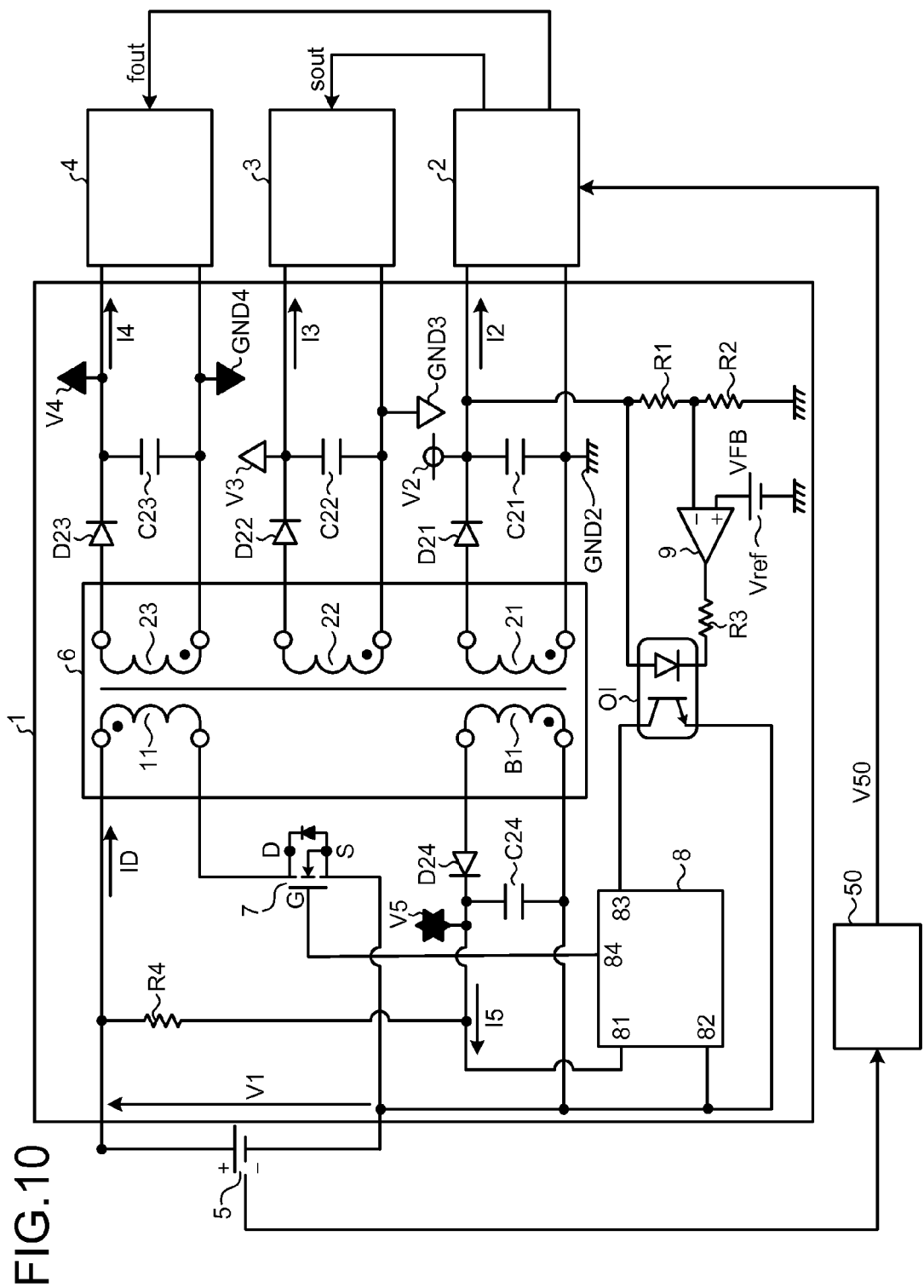
FIG. 10 is a block diagram showing a main part configuration concerning an electronic apparatus mounted with a switching power supply circuit and another circuit according to a second embodiment.

FIG. 10 is a block diagram showing a main part configuration concerning an electronic apparatus mounted with the switching power supply circuit 1 and another circuit according to a second embodiment. As in the first embodiment, an example is shown in which the switching power supply circuit 1 and the another circuit are mounted on an inverter apparatus. However, the second embodiment is different from the first embodiment in that a power-supply-voltage detecting unit 50 that monitors a power supply voltage of the main power supply 5 is added. The power-supply-voltage detecting unit 50 has a function of detecting a power supply voltage V1 of the main power supply 5 and outputting an output signal V50, which is a detection result, to the control circuit 2. Note that components same as or equivalent to the components shown in FIG. 1 are denoted by the same reference numerals and signs and explanation of redundant contents is omitted as appropriate.

Figure 11:
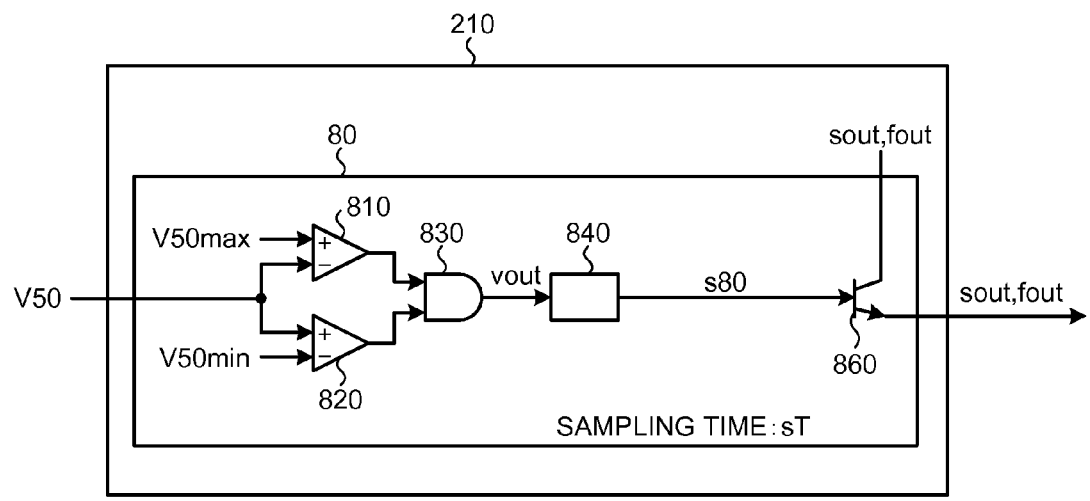
FIG. 11 is a diagram showing an example of a power-supply-voltage determining unit configured by a discrete time system of a sampling time sT in an arithmetic processing unit.

FIG. 11 is a block diagram showing an internal configuration example of a power-supply-voltage determining unit 80. The power-supply-voltage determining unit 80 performs diagnosis and determination of the power supply voltage 1 of the main power supply 5 on the basis of the output signal V50 of the power-supply-voltage detecting unit 50 and outputs the output signals sout and fout respectively to the main circuit 3, the peripheral apparatus circuit 4, and the like, or outputs an alarm signal without outputting the output signals sout and fout. That is, the power-supply-voltage determining unit 80 has a function of performing start/stop control of the main circuit 3 and the peripheral apparatus circuit 4 on the basis of a determination and diagnosis result of the power-supply-voltage determining unit 80.

FIG. 11 is an example in which the power-supply-voltage determining unit 80 is configured by a discrete time system of the sampling time sT in the arithmetic processing unit 210. The power-supply-voltage determining unit 80 includes comparators 810 and 820, an AND circuit 830, a delay circuit 840, and an NPN transistor 860. Note that, in FIG. 11, the power-supply-voltage determining unit 80 is configured in the arithmetic processing unit 210. However, it goes without saying that the power-supply-voltage determining unit 80 can be configured separately from the arithmetic processing unit 210 (i.e., outside of the arithmetic processing unit 210).

The output signal V50 of the power-supply-voltage detecting unit 50 is input to a minus terminal of the comparator 810 and a plus terminal of the comparator 820. A voltage upper limit threshold V50max is input to a plus terminal of the comparator 810. A voltage lower limit threshold V50min is input to a minus terminal of the comparator 820. Output signals of the comparator 810 and the comparator 820 are input to the AND circuit 830. An output signal vout of the AND circuit 830 is input to the delay circuit 840. An output signal s80 of the delay circuit 840 is input to a base terminal of the NPN transistor 860. The output signal sout from the control circuit 2 to the main circuit 3 and the output signal fout from the control circuit 2 to the peripheral apparatus circuit 4 are input to a collector terminal of the NPN transistor 860. An emitter terminal of the NPN transistor 860 is configured to output the output signal sout and the output signal fout respectively to the main circuit 3 and the peripheral apparatus circuit 4.

The operation of the power-supply-voltage determining unit 80 is explained. First, the power-supply-voltage determining unit 80 confirms with the comparators 810 and 820 and the AND circuit 830 that a value of the output signal V50 of the power-supply-voltage detecting unit 50 is V50min≤V50≤V50max. If V50min≤V50≤V50max, the AND circuit 830 outputs "H".

When the output vout of the AND circuit 830 is "H", the delay circuit 840 outputs "H" to the base terminal of the NPN transistor 860 after the elapse of a delay time d×sT set in advance and turns on the NPN transistor 860. When the NPN transistor 860 is turned on, the delay circuit 840 outputs the output signal sout to the main circuit 3 and outputs the output signal fout to the peripheral apparatus circuit 4. At this point, the main circuit 3 starts operation and the peripheral apparatus circuit 4 also starts operation.

That is, the power-supply-voltage determining unit 80 is configured to output the output signals sout and fout from the control circuit 2 respectively to the main circuit 3 and the peripheral apparatus circuit 4 after the delay time d×sT elapses when the output signal V50 of the power-supply-voltage detecting unit 50 satisfies the condition V50min≤V50≤V50max. Note that the power-supply-voltage detecting unit 50 is not limited to this configuration and can be configured to, for example, set d to 1 (d=1) and turn on the NPN transistor 860 after one sampling time sT elapses when the condition V50min≤V50≤V50max is satisfied. A configuration for determining the output signal V50 only with a lower limit threshold can be adopted. Here, the configuration in which the power-supply-voltage determining unit 80 is configured by a discrete time system in the arithmetic processing unit 210 is illustrated. However, a configuration by hardware such as a circuit in the control circuit 2 is also possible.

In the second embodiment, as in the first embodiment, the control circuit 2 includes the means for controlling start/stop of the operations of the main circuit 3 and the peripheral apparatus circuit 4 and controls the operation of the switching power supply circuit 1 according to three steps explained below.

(First Step)

A first step is operation during a period from power supply to the main power supply 5 until the voltage V2 reaches the commanded voltage V2ref, that is, the start period. In this period, electric power is supplied to the control circuit 2 and the IC for power supply control 8. At this point, the main circuit 3 and the peripheral apparatus circuit 4 do not start operations. That is, there is no power consumption in the main circuit 3 and the peripheral apparatus circuit 4.

(Second Step)

A second step is operation during a period in which the voltage V2 reaches the commanded voltage V2ref and the control circuit 2 and the IC for power supply control 8 are operating, that is, the steady period. In this period, the power-supply-voltage determining unit 80 provided in the control circuit 2 performs diagnosis and determination of the power supply voltage V1 of the main power supply 5 on the basis of the output signal V50 from the power-supply-voltage detecting unit 50.

(Third Step)

At a third step, processing corresponding to a diagnosis and determination result of the power-supply-voltage determining unit 80 is executed. Specifically, if the diagnosis and determination result of the power-supply-voltage determining unit 80 satisfies a diagnosis and determination standard, the output signals sout and fout are output from the control circuit 2 respectively to the main circuit 3 and the peripheral apparatus circuit 4. The main circuit 3 and the peripheral apparatus circuit 4 start operations. On the other hand, if the diagnosis and determination result of the power-supply-voltage determining unit 80 does not satisfy the diagnosis and determination standard, the output signals sout and fout from the control circuit 2 are not output to the main circuit 3 and the peripheral apparatus circuit 4 that do not satisfy the diagnosis and determination standard. Instead, an alarm signal is output to communicate that there is some abnormality in a power supply voltage of the main power supply 5.

Figure 12:
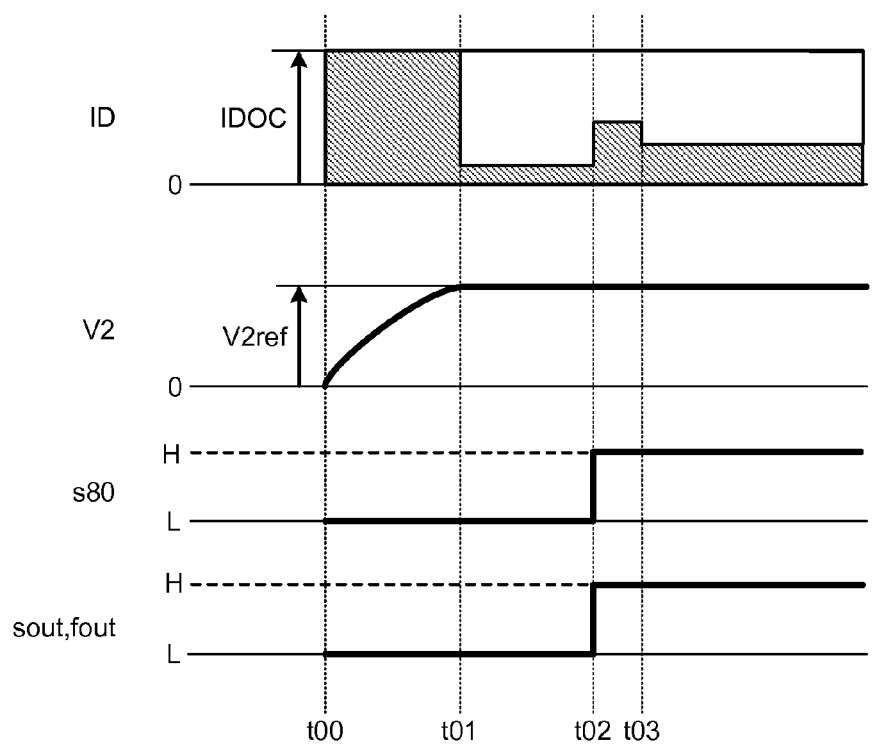
FIG. 12 is a diagram for explaining operations and effects by the switching power supply circuit in the second embodiment.

FIG. 12 is a diagram for explaining operations and effects by the switching power supply circuit 1 in the second embodiment. Operations of the electric current ID, the voltage V2, the output signal s80 of the delay circuit 840 in the power-supply-voltage determining unit 80, the output signal sout from the control circuit 2 to the main circuit 3, and the output signal fout from the control circuit 2 to the peripheral apparatus circuit 4 are shown.

In FIG. 12, time t00 is the time when electric power is supplied to the power supply voltage of the main power supply 5. Time t00 to t01 is the first step and is the start time of the switching power supply circuit 1, that is, a period in which the capacitors C21, C22, C23, and C24 respectively connected to the secondary winding wires 21, 22, and 23 and the auxiliary winding wire B1 via the diodes D21, D22, D23, and D24 are charged. In this period, the control circuit 2 and the IC for power supply control 8 are driven. Time t01 is the time at which the voltage V2 has reached the commanded voltage V2ref. Time t01 to t02 is the second step and is a period in which the control circuit 2 and the IC for power supply control 8 are operating in the steady state and a period in which the output signal V50 of the power-supply-voltage detecting unit 50 is determined in the power-supply-voltage determining unit 80. Time t02 is the third step and is the time when the output signals sout and fout are output from the control circuit 2 to the main circuit 3 and the peripheral apparatus circuit 4. After time t03, all the circuits are operating in the steady state.

(First Step: Time t00 to t01)

At the first step, the charging of the capacitors C21, C22, C23, and C24 respectively connected to the secondary winding wires 21, 22, and 23 and the auxiliary winding wire B1 via the diodes D21, D22, D23, and D24 and the power supply to the control circuit 2 and the IC for power supply control 8 are performed. At time t00, electric power is supplied to the main power supply 5 and the switching power supply circuit 1 starts operation. As explained above, at the start time, the overcurrent protection operation and the release operation of the IC for power supply control 8 are repeated. Therefore, the electric current ID flows up to the overcurrent protection level current IDOC and the voltage V2 is charged. At time t01, the voltage V2 reaches the commanded voltage V2ref. As explained above, at the first step, power supply to the control circuit 2 and the IC for power supply control 8 is performed. Besides, operation for charging the capacitors C21, C22, C23, and C24 connected to the secondary winding wires 21, 22, and 23 and the auxiliary winding wire B1 to respective commanded voltages is also performed.

(Second Step: Time t01 to t02)

At the second step, the control circuit 2 checks the power supply voltage V1 of the main power supply 5 and determines possibility of operation of the another circuit. The switching power supply circuit 1 is in the steady state. The control circuit 2 and the IC for power supply control 8 are operating. In this period, the charging of the command voltages in the capacitors C21, C22, C23, and C24 is completed. The determination processing for the output signal V50 of the power-supply-voltage detecting unit 50 is performed by the power-supply-voltage determining unit 80. Therefore, the excessively large electric current ID does not flow. If abnormality does not occur in the output signal V50 of the power-supply-voltage detecting unit 50 (i.e., the power supply voltage V1 of the main power supply 5), at time t02, the operations of the main circuit 3 and the peripheral apparatus circuit 4 are started. However, when abnormality occurs in the power supply voltage V1, an alarm signal is output to notify the main circuit 3 and the peripheral apparatus circuit 4 that the abnormality has occurred in the power supply voltage V1 of the main power supply 5.

(Third Step: Time t02 to t03)

At the third step, the operations of the main circuit 3 and the peripheral apparatus circuit 4 are started according to the output signals sout and fout from the control circuit 2. At time t02, the output signals sout and fout are output from the control circuit 2 respectively to the main circuit 3 and the peripheral apparatus circuit 4 according to the output signal s80 from the power-supply-voltage determining unit 80. In a period of t02 to t03, the electric current ID increases. This is because the main circuit 3 and the peripheral apparatus circuit 4 start operations and a power load on the secondary winding wires 22 and 23 increases. At time t03, the switching power supply circuit 1 is in the steady state in a state in which all the circuits connected to the switching power supply circuit 1 are operating.

As it is understood from the above explanation, in the switching power supply circuit 1 and the control method therefor in the second embodiment, effects same as the effects in the first embodiment can be obtained. Specifically, the effects are as explained below.

First, in the switching power supply circuit 1 and the control method therefor in the second embodiment, the switching power supply circuit 1 includes, in the control circuit 2, the means for controlling the operations of the main circuit 3 and the peripheral apparatus circuit 4. At the start time, the switching power supply circuit 1 establishes sequence control for performing the charging in the capacitors C21, C22, C23, and C24 connected to the secondary winding wires 21, 22, and 23 and the auxiliary winding wire B1 via the diodes D21, D22, D23, and D24, and the power supply to the control circuit 2 and the IC for power supply control 8 and, after changing to the steady state, operating the main circuit 3, the peripheral apparatus circuit 4, and the like on the basis of the output signal V50 of the power-supply-voltage detecting unit 50, that is, the power supply voltage V1 of the main power supply 5. Consequently, it is possible to reduce a power load at the start time in the switching power supply circuit 1 and charge the capacitors C21, C22, C23, and C24 connected to the secondary winding wires 21, 22, and 23 and the auxiliary winding wire B1 up to the commanded voltages, that is, change the operation of the switching power supply circuit 1 to the steady state without increasing the overcurrent protection level current value IDOC.

With the switching power supply circuit 1 and the control method therefor in the second embodiment, even when abnormality occurs in the switching power supply circuit 1, for example, when abnormality occurs in the circuits connected to the secondary winding wires 21, 22, and 23 in the steady state, because the overcurrent protection level current value IDOC is not increased, it is possible to quickly stop the operation of the switching element 7. Therefore, it is possible to reduce the heat capacities of the diodes D21, D22, D23, and D24 connected to the secondary winding wires 21, 22, and 23 and the auxiliary winding wire B1 and the switching element 7. It is also possible to prevent magnetic saturation of the transformer 6. As a result, it is possible to reduce the components of the switching power supply circuit 1 in size. It is possible to attain a reduction in the size and a reduction in the costs of the switching power supply circuit 1.

With the switching power supply circuit 1 and the control method therefor in the second embodiment, the control based on the power supply voltage V1 of the main power supply 5, which is the power source of the switching power supply circuit 1, is performed. Therefore, after the control circuit 2 starts a stable operation, when the power supply voltage V1 is outside specifications of the electronic apparatus, it is possible to notify power supply abnormality of the main power supply 5 with an alarm signal or the like before operating the main circuit 3, the peripheral apparatus circuit 4, and the like. Therefore, it is possible to prevent an abnormal operation of the main circuit 3 based on the power supply abnormality beforehand.

Further, with the switching power supply circuit 1 and the control method therefor in the second embodiment, as in the first embodiment, it is possible to perform, with the IC for power supply control 8, the ON/OFF control of the switching element 7 and the overcurrent protection operation and control, with the control circuit 2, start/stop of the operations in the circuits respectively connected to the secondary winding wires 21, 22, and 23 to perform increase and decrease control of power consumption in the secondary winding wires 21, 22, and 23. Therefore, it is unnecessary to use the IC for power supply control 8 that has a high function and performs complicated operation, and it is possible to use the inexpensive IC for power supply control 8.

Note that the configuration of the power-supply-voltage determining unit 80 can be changed such that the operation after time t03 of the third step, that is, the operation performed after the switching power supply circuit 1 changes to the steady state is performed as explained blow.

For example, the configuration is changed such that, even when voltage abnormality of the main power supply 5 has occurred, only the start/stop of the operation of the peripheral apparatus circuit not directly related to an actual operation is performed and the main circuit 3, which performs the actual operation, continues the operation. More specifically, when V50 falls below the voltage lower limit threshold V50min because of a power failure or the like of the power supply voltage V1 of the main power supply 5, the operation of the main circuit 3, which performs the actual operation, is continued and only the operation of the peripheral apparatus circuit 4 not directly related to the actual operation is stopped. If this mechanism is established, it is possible to improve power failure tolerance. For example, in an inverter apparatus that drives a motor, even when abnormality due to power supply abnormality such as a power failure occurs, it is possible to increase an operable time of the motor.

At least one of the voltage upper limit threshold V50max and the voltage lower limit threshold V50min can be changed. For example, if the voltage lower limit threshold V50min is changed, even when abnormality due to abnormality of a power drop occurs, it is possible to extend the operations of the main circuit 3 and the peripheral apparatus circuit 4.

Note that, after the main circuit 3 and the peripheral apparatus circuit 4 are operated, for example, when V50 falls below the voltage lower limit threshold V50min after at least one of the voltage upper limit threshold V50max and the voltage lower limit threshold V50min is changed, it is preferable to stop at least one circuit of the main circuit 3 and the peripheral apparatus circuit 4. If such control is performed, even when abnormality due to abnormality of a power drop occurs, there is an effect that it is possible to extend an operation time from the viewpoint of the entire circuit.

Third Embodiment

In a third embodiment, a configuration in which the power-supply-voltage detecting unit 50 is provided on a secondary side is explained. In the first and second embodiments, as explained above, the power-supply-voltage detecting unit 50 has the function of detecting the power supply voltage V1 of the main power supply 5 connected to the primary winding wire 11 of the transformer 6 and sending the detection result V50 to the control circuit 2. The power supply voltage V1 of the main power supply 5 connected to the primary winding wire 11 is input to the power-supply-voltage detecting unit 50. The detection value V50 based on the power supply voltage V1 is output to the control circuit 2.

In general, to detect the power supply voltage V1 connected to the primary winding wire 11 and output the detection value V50 to the control circuit 2 driven by insulated another power supply, it is necessary to use a dedicated insulating mechanism such as a photocoupler or an isolation amplifier. This is because, when a signal pattern based on the power supply connected to the primary winding wire 11 and a signal pattern based on the power supply that drives the control circuit 2 are connected, insulation by the transformer 6 disappears.

Naturally, it is also possible to configure the power-supply-voltage detecting unit 50 with the dedicated insulating mechanism. However, when the dedicated insulating mechanism is used, it is necessary to secure an insulation distance between the signal patterns based on the different power supplies, and a substrate size increases. Therefore, the size of the inverter apparatus also increases.

In the switching power supply circuit 1, when the switching element 7 is performing, for example, the switching operation shown in FIG. 6, the power supply voltage V1 of the main power supply 5 is generated in the voltage across terminals V11 of the primary winding wire 11 of the transformer 6. At this point, in the voltage across terminals V21 of the secondary winding wire 21, a voltage of a winding ratio N21/N11×V1 is generated in the minus direction. Therefore, in the third embodiment, the power-supply-voltage detecting unit 50 is configured to detect the power supply voltage V1 of the main power supply 5 on the basis of the voltage across terminals V21 generated in the secondary winding wire 21 when the switching element 7 is switched on.

Figure 13:
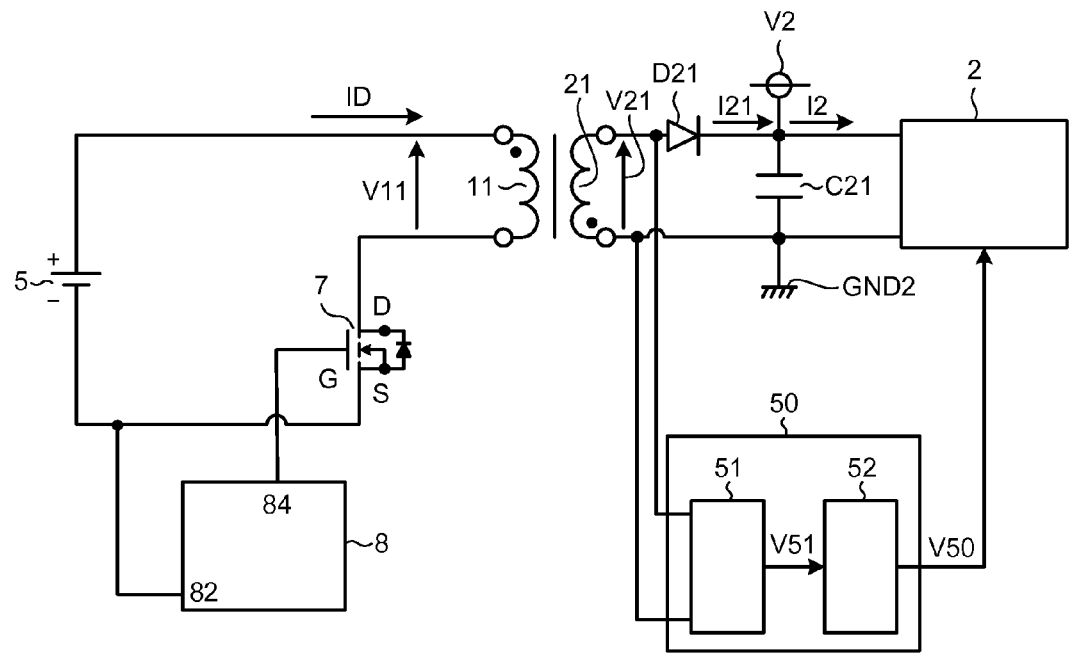
FIG. 13 is a block diagram showing a configuration example of a power-supply-voltage detecting unit according to a third embodiment.

FIG. 13 is a block diagram showing a configuration example of the power-supply-voltage detecting unit 50 according to the third embodiment. The power-supply-voltage detecting unit 50 includes a voltage extracting unit 51 and an inversion amplification unit 52. The voltage extracting unit 51 monitors the voltage across terminals V21 of the secondary winding wire 21 of the transformer 6, detects the voltage across terminals V21 only at the time when the switching element 7 is switched on, and outputs the voltage across terminals V21 to the inversion amplification unit 52. The voltage across terminals V21 is a voltage across terminals of the secondary winding wire 21, that is, a voltage before being rectified by the diode D21. The inversion amplification unit 52 inversely amplifies an output value (a signal) V51 of the voltage extracting unit 51 and outputs an inversely-amplified output value V50 to the control circuit 2.

Figure 14:
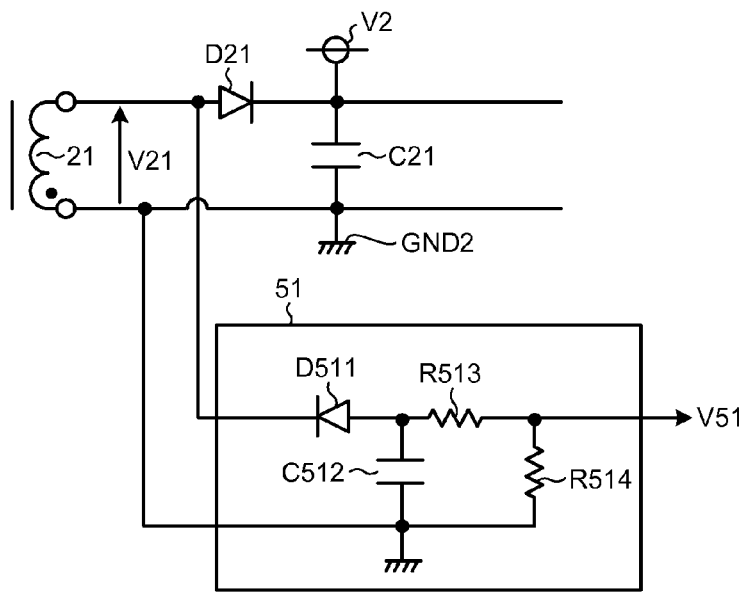
FIG. 14 is a block diagram showing an internal configuration example of a voltage extracting unit.

FIG. 14 is a block diagram showing an internal configuration example of the voltage extracting unit 51. The voltage extracting unit 51 includes a diode D511, a resistor R513, a resistor R514, and a capacitor C512. In the voltage extracting unit 51, a winding end side of the secondary winding wire 21 and the cathode of the diode D511 are connected. The anode of the diode D511 is connected to one end of the capacitor C512 and one end of the resistor R513. The other end of the resistor R513 is connected to one end of the resistor R514. The other end of the resistor R514 is connected to a winding start side of the secondary winding wire 21. With these components, only the voltage across terminals V21 of the secondary winding wire 21 at the time when the switching element 7 is switched on is extracted.

Figure 15:
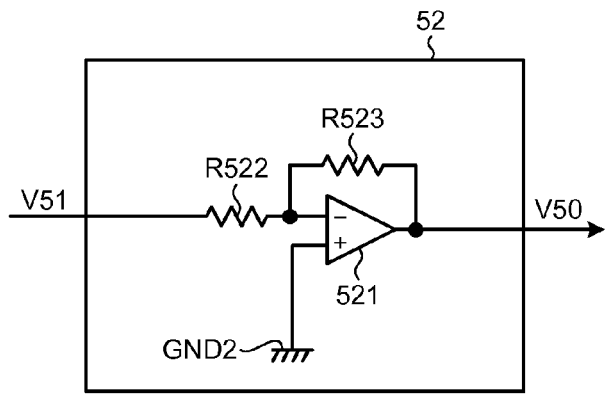
FIG. 15 is a block diagram showing an internal configuration example of an inversion amplification unit.

FIG. 15 is a block diagram showing an internal configuration example of the inversion amplification unit 52. The inversion amplification unit 52 includes an operational amplifier 521, a resistor R522, and a resistor R523. In the inversion amplification unit 52, the output voltage V51 of the voltage extracting unit 51 is input to a minus terminal of the operational amplifier 521 via the resistor R522. A plus terminal of the operational amplifier 521 is connected to GND2, which is the reference potential of the power supply voltage V2. An output terminal of the operational amplifier 521 is an output of the inversion amplification unit 52 and, at the same time, electrically connected to the minus terminal of the operational amplifier 521 via the resistor R523. With these components, the inversion amplification unit 52 realizes a function of inversely amplifying an output of the voltage extracting unit 51. The power supply voltage V1 of the main power supply 5 can be calculated by the inversion amplification unit 52.

Figure 16:
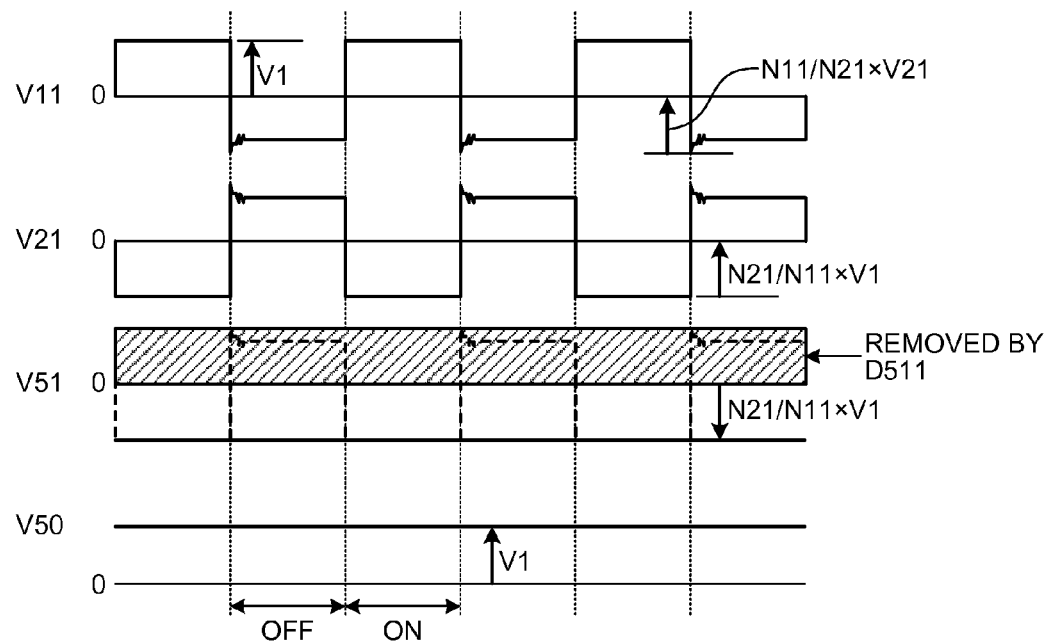
FIG. 16 is a diagram for explaining the operation of the power-supply-voltage detecting unit.

FIG. 16 is a diagram for explaining the operation of the power-supply-voltage detecting unit 50. FIG. 16 shows operation waveforms of the voltage across terminals V11 of the primary winding wire 11, the voltage across terminals V21 of the secondary winding wire 21, the output V51 of the voltage extracting unit 51, and the output V50 of the inversion amplification unit 52. As explained above, when the switching element 7 is on, the power supply voltage V1 of the main power supply 5 is applied to the primary winding wire 11. Therefore, the voltage across terminals V11 of the primary winding wire 11 is V1. At this point, in the voltage across terminals V21 of the secondary winding wire 21, a voltage of N21/N11×V1 is generated in the minus direction. When the switching element 7 is off, a voltage in the plus direction is generated between the terminals of the secondary winding wire 21. A voltage of N11/N21×V21 is generated in the minus direction between the terminals of the primary winding wire 11.

The voltage across terminals V21 of the secondary winding wire 21, that is, a voltage before being rectified by the diode D21 is input to the voltage extracting unit 51. The voltage extracting unit 51 extracts, in the diode D511, only a voltage generated in the minus direction in the voltage across terminals V21 of the secondary winding wire 21. That is, the voltage extracting unit 51 extracts only a voltage at the time when the switching element 7 is on and inputs the voltage to the capacitor C512. Further, the voltage-extracting unit 51 generates the voltage V51 in the resistors R513 and R514. The resistors R513 and R514 realize a function of dividing a voltage charged in the capacitor C512 and a function of preventing electric discharge. In this way, a direct-current voltage in the minus direction is generated by the voltage extracting unit 51.

The voltage V51 generated by the voltage extracting unit 51 is input to the inversion amplification unit 52. Because the inversion amplification unit 52 configures the inversion amplification circuit as explained above, the inversion amplification unit 52 outputs a voltage obtained by inversely amplifying the voltage V51. The voltage V51 is inversely amplified at an amplification ratio set by the resistors R522 and R523. The inversion amplification unit 52 outputs V50 having a direct-current voltage value in the plus direction. Note that it goes without saying that a voltage value equivalent to the power supply voltage V1 of the main power supply 5 can be output as V50 according to resistance values of the resistors R522 and R523.

According to a combination of resistance values of the R513, R514, R522, and R523, it is also possible to calculate a voltage specialized for a voltage value near the operation voltage lower limit value V50min of the switching power supply circuit 1. Consequently, when power supply interruption occurs because of a power failure or the like of the power supply voltage V1 of the main power supply 5, it is possible to more accurately detect the power supply interruption.

As explained above, in the switching power supply circuit 1 in the third embodiment, the power-supply-voltage detecting unit 50 is provided that detects the power supply voltage V1 of the main power supply 5 on the basis of a monitoring result of the voltage across terminals V21 of the secondary winding wire 21 for supplying electric power to the control circuit 2. Therefore, it is unnecessary to use a dedicated insulating mechanism such as an isolation amplifier or a photocoupler. It is possible to attain improvement of reliability and a reduction in costs through a reduction in the number of components.

With the switching power supply circuit 1 in the third embodiment, because GND2 of the power supply voltage V2 generated by the secondary winding wire 21 same as the control circuit 2 is set as the reference, it is possible to reduce a request for an insulation distance of signal patterns. It is possible to realize a reduction in a substrate size.

Fourth Embodiment

Figure 17:
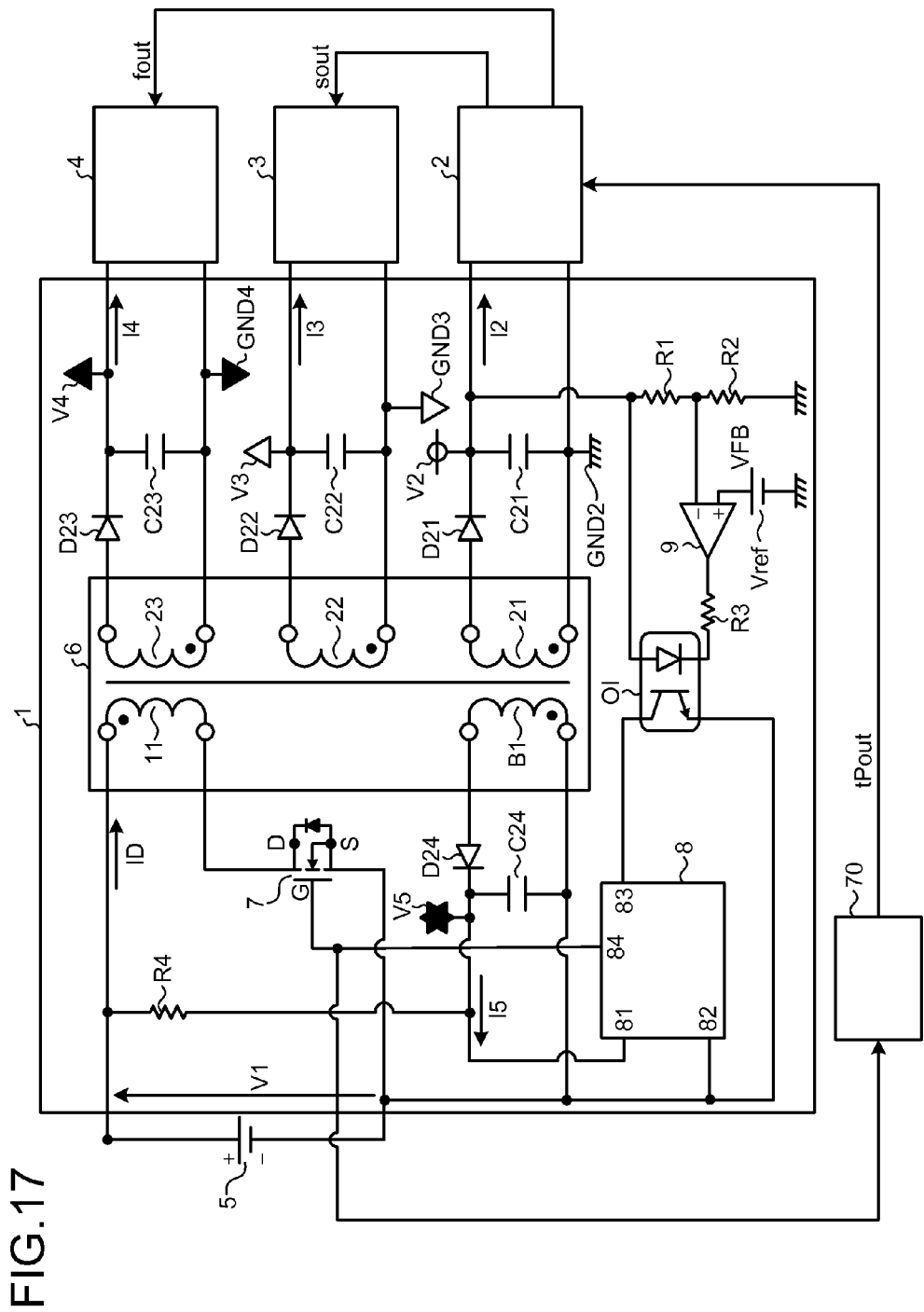
FIG. 17 is a block diagram showing a main part configuration concerning an electronic apparatus mounted with a switching power supply circuit and another circuit according to a fourth embodiment.

FIG. 17 is a block diagram showing a main part configuration concerning an electronic apparatus mounted with the switching power supply circuit 1 and another circuit according to a fourth embodiment. As in the first and second embodiments, an example is shown in which the switching power supply circuit 1 and the another circuit are mounted on an inverter apparatus. In the second embodiment, an output signal of the power-supply-voltage detecting unit 50 is input to the control circuit 2. On the other hand, in the fourth embodiment, a switching-operation detecting unit 70 is provided instead of the power-supply-voltage detecting unit 50. An output signal tPout of the switching-operation detecting unit 70 is input to the control circuit 2. Note that components same as or equivalent to the components shown in FIG. 1 are denoted by the same reference numerals and signs and explanation of redundant contents is omitted as appropriate.

The switching-operation detecting unit 70 monitors the voltage across terminals V21 of the secondary winding wire 21, that is, a voltage before being rectified and outputs a signal based on the monitored voltage to the control circuit 2 as tPout. Note that the signal tPout is a signal for detecting the operation or an operation state of the switching element 7. The switching-operation detecting unit 70 is adaptable to the signal tPout by calculating at least one of a switching-on time Ton and a switching-off time Toff of the switching element 7, the time in which the electric current I21 flows to the secondary winding wire 21 and the diode D21, and the switching frequency fsw (equivalent to the switching cycle Tall). Note that the configuration of the switching-operation detecting unit 70 is explained below.

Figure 18:
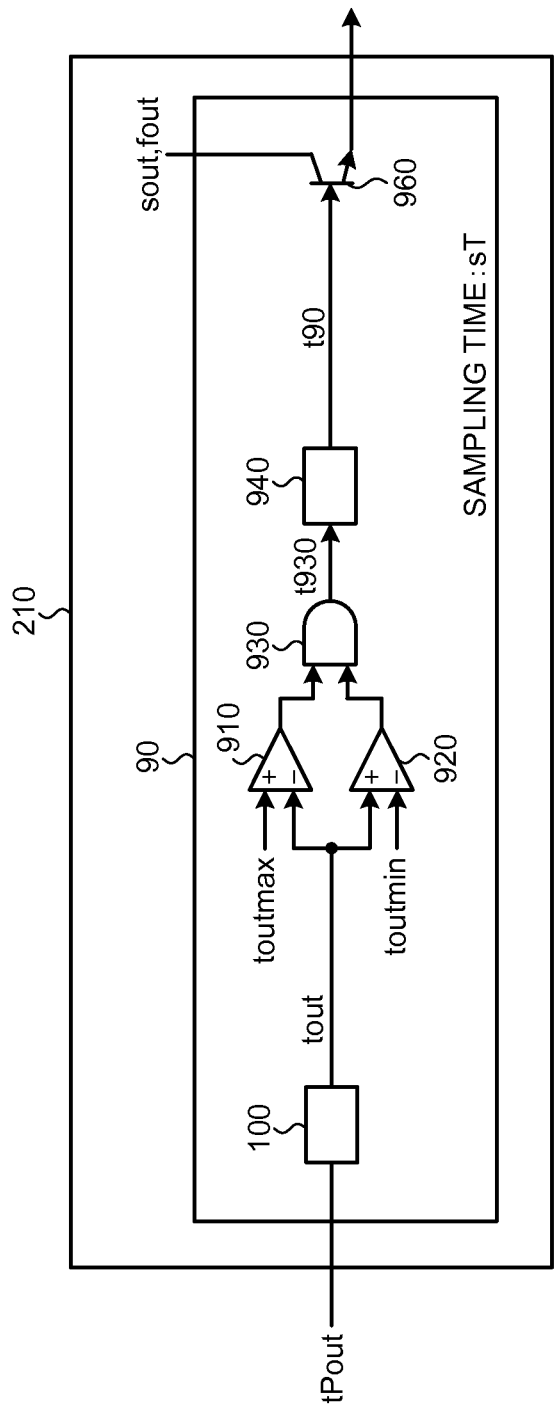
FIG. 18 is a block diagram showing an internal configuration example of a switching-operation determining unit provided in a control circuit.

FIG. 18 is a block diagram showing an internal configuration example of a switching-operation determining unit 90 provided in the arithmetic processing unit 210 of the control circuit 2. The switching-operation determining unit 90 has a function of outputting the output signals sout and fout on the basis of the signal tPout detected by the switching-operation detecting unit 70.

FIG. 18 is an example in which the switching-operation determining unit 90 is configured by a discrete time system of the sampling time sT in the arithmetic processing unit 210. The switching-operation determining unit 90 includes a time-width measuring unit 100, comparators 910 and 920, an AND circuit 930, a delay circuit 940, and an NPN transistor 960. Note that, in FIG. 18, the switching-operation determining unit 90 is configured in the arithmetic processing unit 210. However, it goes without saying that the switching-operation determining unit 90 can be configured separately from the arithmetic processing unit 210 (i.e., outside of the arithmetic processing unit 210).

The signal tPout output from the switching-operation detecting unit 70 is input to the time-width measuring unit 100. A signal tout generated by the time-width measuring unit 100 using the signal tPout is input to a minus terminal of the comparator 910 and a plus terminal of the comparator 920. A time upper limit threshold toutmax is input to a plus terminal of the comparator 910. A time lower limit threshold toutmin is input to the minus terminal of the comparator 920. Output signals of the comparator 910 and the comparator 920 are input to the AND circuit 930. An output signal t930 of the AND circuit 930 is input to the delay circuit 940. An output signal t90 of the delay circuit 940 is input to a base terminal of the NPN transistor 960. The output signal sout from the control circuit 2 to the main circuit 3 and the output signal fout from the control circuit 2 to the peripheral apparatus circuit 4 are input to a collector terminal of the NPN transistor 960. An emitter terminal of the NPN transistor 960 is configured to output the output signal sout and the output signal fout respectively to the main circuit 3 and the peripheral apparatus circuit 4.

An operation principle of the switching-operation determining unit 90 is explained. The time-width measuring unit 100 generates, using the signal tPout output from the switching-operation detecting unit 70, the signal tout representing an ON time of the switching element 7 and outputs the signal tout to the comparators 910 and 920. Note that the signal tout is not limited to the ON time Ton of the switching element 7. As a time signal related to the ON time Ton, for example, the OFF time Toff of the switching element 7, the time in which the electric current I21 flows to the secondary winding wire 21 and the diode D21, the switching cycle Tall, the switching frequency fsw, and the like can be calculated.

The signal tout from the time-width measuring unit 100 is input to the comparators 910 and 920 and the AND circuit 930. The comparators 910 and 920 and the AND circuit 930 determine whether the signal tout is toutmin≤tout≤toutmax. When toutmin≤tout≤toutmax, the AND circuit 930 outputs "H" as the output signal t930.

When the output signal t930 of the AND circuit 930 is "H", after the elapse of the delay time d×sT set in advance, the delay circuit 940 outputs "H" to the base terminal of the NPN transistor 960 and turns on the NPN transistor 960. When the NPN transistor 960 is turned on, the NPN transistor 960 outputs the output signal sout to the main circuit 3 and outputs the output signal fout to the peripheral apparatus circuit 4. At this point, the main circuit 3 starts operation and the peripheral apparatus circuit 4 also starts operation.

That is, the switching-operation determining unit 90 is configured to output the output signals sout and fout from the control circuit 2 respectively to the main circuit 3 and the peripheral apparatus circuit 4 after the elapse of the delay time d×sT when the signal tout generated by the time-width measuring unit 100 satisfies the condition toutmin≤tout≤toutmax. Note that the switching-operation determining unit 90 is not limited to this configuration and can be configured to, for example, set d to 1 (d=1) and turn on the NPN transistor 960 after the elapse of one sampling time sT when the condition toutmin≤tout≤toutmax is satisfied. In the above illustration, the switching-operation determining unit 90 is configured by the discrete time system in the arithmetic processing unit 210. However, the switching-operation determining unit 90 can also be configured by hardware such as a circuit in the control circuit 2.

Figure 19:
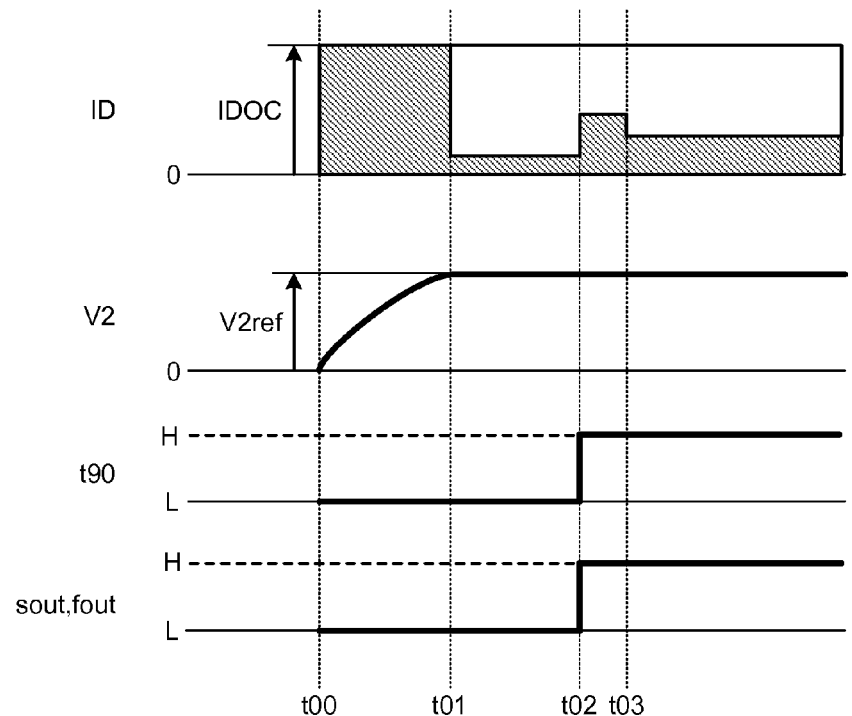
FIG. 19 is a diagram for explaining operations and effects by the switching power supply circuit in the fourth embodiment.

FIG. 19 is a diagram for explaining operations and effects by the switching power supply circuit 1 in the fourth embodiment. FIG. 19 shows operations of the electric current ID, the voltage V2, the output signal t90 of the delay circuit 940 in the switching-operation determining unit 90, the output signal sout from the control circuit 2 to the main circuit 3, and the output signal fout from the control circuit 2 to the peripheral apparatus circuit 4.

In FIG. 19, time t00 is the time when electric power is supplied to the power supply voltage of the main power supply 5. Time t00 to t01 is the first step and is the start time of the switching power supply circuit 1, that is, a period in which the capacitors C21, C22, C23, and C24 respectively connected to the secondary winding wires 21, 22, and 23 and the auxiliary winding wire B1 via the diodes D21, D22, D23, and D24 are charged. In this period, the control circuit 2 and the IC for power supply control 8 are driven. Time t01 is the time at which the voltage V2 has reached the commanded voltage V2ref. Time t01 to t02 is the second step and is a period in which the control circuit 2 and the IC for power supply control 8 are operating in the steady state and a period in which the output signal tPout of the switching-operation detecting unit 70 is determined in the switching-operation determining unit 90. Time t02 is the third step and is the time when the output signals sout and fout are output from the control circuit 2 to the main circuit 3 and the peripheral apparatus circuit 4. After time t03, all the circuits are operating in the steady state.

(First Step: Time t00 to t01)

At the first step, the charging of the capacitors C21, C22, C23, and C24 respectively connected to the secondary winding wires 21, 22, and 23 and the auxiliary winding wire B1 via the diodes D21, D22, D23, and D24 and the power supply to the control circuit 2 and the IC for power supply control 8 are performed. At time t00, electric power is supplied to the main power supply 5 and the switching power supply circuit 1 starts operation. As explained above, at the start time, the overcurrent protection operation and the release operation of the IC for power supply control 8 are repeated. Therefore, the electric current ID flows up to the overcurrent protection level current IDOC and the voltage V2 is charged. At time t01, the voltage V2 reaches the commanded voltage V2ref. As explained above, at the first step, power supply to the control circuit 2 and the IC for power supply control 8 is performed. Besides, operation for charging the capacitors C21, C22, C23, and C24 connected to the secondary winding wires 21, 22, and 23 and the auxiliary winding wire B1 to respective commanded voltages is also performed. Note that power energy necessary for the primary winding wire 11 in this period is Formula (23) explained in the first embodiment. Therefore, explanation of the power energy is omitted.

(First Step: Time t01 to t02)

At the second step, the control circuit 2 checks the power supply voltage V1 of the main power supply 5 and determines possibility of operation of the another circuit. The switching power supply circuit 1 is in the steady state. The control circuit 2 and the IC for power supply control 8 are operating. In this period, the charging of the command voltages in the capacitors C21, C22, C23, and C24 is completed. The determination processing for the output signal tPout of the switching-operation detecting unit 70 is performed by the switching-operation determining unit 90. Therefore, the excessively large electric current ID does not flow. If abnormality has not occurred in the operation of the switching element 7 (i.e., the output signal tout of the time-width measuring unit 100), at time t02, the operations of the main circuit 3 and the peripheral apparatus circuit 4 are started. However, if abnormality has occurred in the switching element 7, an alarm signal is output to notify the main circuit 3 and the peripheral apparatus circuit 4 that the abnormality has occurred in the power supply voltage V1 of the main power supply 5. Note that electric power necessary for the primary winding wire 11 in this period is Formula (24) explained in the first embodiment. Therefore, explanation of the electric power is omitted.

(Third Step: Time t02 to t03)

At the third step, the operations of the main circuit 3 and the peripheral apparatus circuit 4 are started according to the output signals sout and fout from the control circuit 2. At time t02, the output signals sout and fout are output from the control circuit 2 respectively to the main circuit 3 and the peripheral apparatus circuit 4 according to the output signal t90 from the switching-operation determining unit 90. In a period of time t02 to t03, the electric current ID increases. This is because the main circuit 3 and the peripheral apparatus circuit 4 start operations and a power load on the secondary winding wires 22 and 23 increases. At time t03, the switching power supply circuit 1 is in the steady state in a state in which all the circuits connected to the switching power supply circuit 1 are operating. Note that electric power necessary for the primary winding wire 11 after time t03 is Formula (25) explained in the first embodiment. Therefore, explanation of the electric power is omitted.

As it is understood from the above explanation, in the switching power supply circuit 1 and the control method therefor in the fourth embodiment, effects same as the effects in the first embodiment can be obtained. Specifically, the effects are as explained below.

First, in the switching power supply circuit 1 and the control method therefor in the fourth embodiment, the switching power supply circuit 1 includes, in the control circuit 2, the means for controlling the operations of the main circuit 3 and the peripheral apparatus circuit 4. At the start time, the switching power supply circuit 1 establishes sequence control for performing the charging in the capacitors C21, C22, C23, and C24 connected to the secondary winding wires 21, 22, and 23 and the auxiliary winding wire B1 via the diodes D21, D22, D23, and D24 and the power supply to the control circuit 2 and the IC for power supply control 8 and, after changing to the steady state, operating the main circuit 3 and the peripheral apparatus circuit 4 on the basis of the output signal tPout of the switching-operation detecting unit 70, that is, the operation of the switching element 7. Consequently, it is possible to reduce a power load at the start time in the switching power supply circuit 1 and charge the capacitors C21, C22, C23, and C24 connected to the secondary winding wires 21, 22, and 23 and the auxiliary winding wire B1 to the commanded voltages, that is, change the operation of the switching power supply circuit 1 to the steady state without increasing the overcurrent protection level current value IDOC.

With the switching power supply circuit 1 and the control method therefor in the fourth embodiment, even when abnormality occurs in the switching power supply circuit 1, for example, when abnormality occurs in the circuits connected to the secondary winding wires 21, 22, and 23 in the steady state, because the overcurrent protection level current value IDOC has not been increased, it is possible to quickly stop the operation of the switching element 7. Therefore, it is possible to reduce the heat capacities of the diodes D21, D22, and D23 connected to the secondary winding wires 21, 22, and 23 and the switching element 7. It is also possible to prevent magnetic saturation of the transformer 6. As a result, it is possible to reduce the components of the switching power supply circuit 1 in size, and thus it is possible to attain a reduction in the size and a reduction in the costs of the switching power supply circuit 1.

Further, with the switching power supply circuit 1 and the control method therefor in the fourth embodiment, as in the first to third embodiment, it is possible to perform, with the IC for power supply control 8, ON/OFF of the switching element 7 and the overcurrent protection operation and control, with the control circuit, start/stop of the operations in the circuits respectively connected to the secondary winding wires 21, 22, and 23 to perform increase and decrease control of power consumption in the secondary winding wires 21, 22, and 23. Therefore, it is unnecessary to use the IC for power supply control 8 that has a high function and performs complicated operation, and thus, it is possible to use the inexpensive IC for power supply control 8.

Note that, in the fourth embodiment, as shown in FIG. 19, as an example, the output signals sout and fout are simultaneously output. However, as in the first embodiment, it is also possible to output sout first and thereafter output fout to perform further power load distribution. It is also possible to control the operation start of not only the main circuit 3 and the peripheral apparatus circuit 4 connected to the other secondary winding wires 21, 22, and 23 but also the another circuit mounted on the control circuit 2. For example, it is also possible to configure a sequence control system that operates only the arithmetic processing unit 210 and the storage unit 220 at the start time and, after changing to the steady state, starts the operation of the another circuit mounted on the control circuit 2. In the sequence control system, hardware including a comparator and a timer circuit and the like can be configured in the control circuit 2 or software, a logic circuit, and the like can be configured in the arithmetic processing unit 210.

The configuration of the switching-operation detecting unit 70 is explained. As explained above, the switching-operation detecting unit 70 has the function of generating a signal related to the ON time Ton of the switching element 7.

To detect the operation of the switching element 7, it is conceivable to adopt a method of detecting a voltage between the drain terminal and the source terminal of the switching element 7 and a method of detecting a switching-on signal, a switching-off signal, and the like output from the IC for power supply control 8 to the gate terminal of the switching element 7. However, as in the case of the power-supply-voltage detecting unit 50, a dedicated insulating mechanism such as an isolation amplifier or a photocoupler is necessary. Naturally, it is also possible to configure the switching-operation detecting unit 70 including the dedicated insulating mechanism. However, in this case, there are problems same as the problems of the power-supply-voltage detecting unit 50 explained in the first embodiment, leading to an increase in a substrate size and an increase in the size of the inverter apparatus.

In the switching power supply circuit 1, for example, when the switching power supply circuit 1 is performing the switching operation shown in FIG. 6, the power supply voltage V1 of the main power supply 5 is generated in the voltage across terminals V11 of the primary winding wire 11 of the transformer 6. At this point, in the voltage across terminals V21 of the secondary winding wire 21, a voltage of a winding ratio N21/N11×V1 is generated in the minus direction. When the switching element 7 is switched off, a voltage is generated in the plus direction in the voltage across terminals V21 of the secondary winding wire 21. Therefore, in the fourth embodiment, the switching power supply circuit 1 is configured to detect at least one of the ON time Ton and the OFF time Toff of the switching element 7, the time in which an electric current flows to the secondary winding wire 21 and the diode D21, and the switching frequency fsw.

Figure 20:
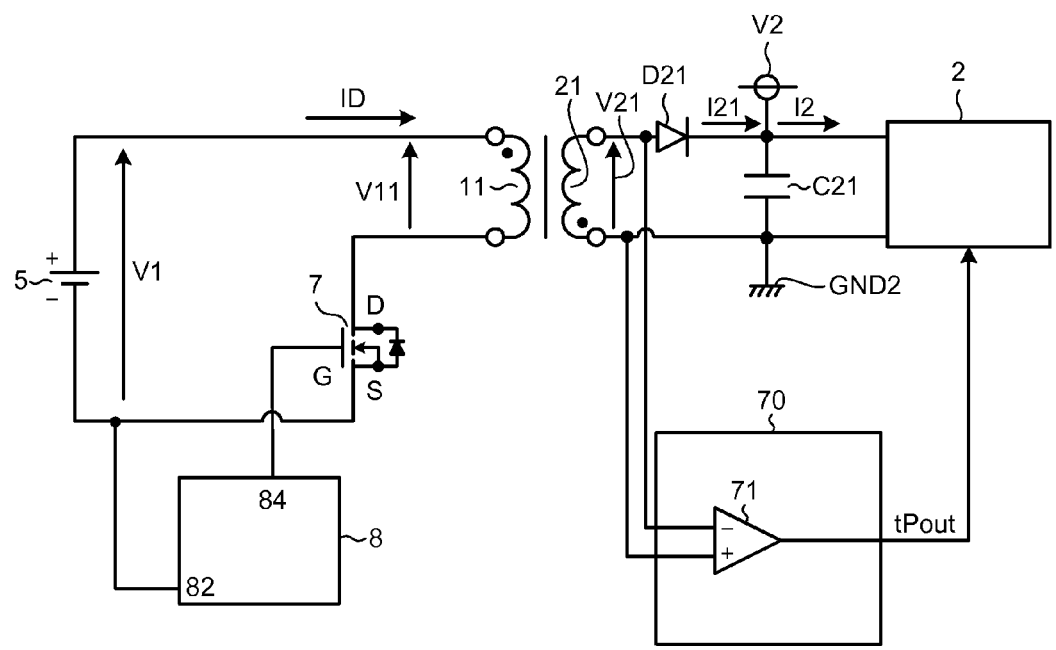
FIG. 20 is a diagram showing a configuration example of a switching-operation detecting unit according to the fourth embodiment.

FIG. 20 is a diagram showing a configuration example of the switching-operation detecting unit 70. The switching-operation detecting unit 70 is configured by a comparator 71. The winding start side of the secondary winding wire 21 and a plus terminal of the comparator 71 are connected. The winding end side of the secondary winding wire 21 and a minus terminal of the comparator 71 are connected. An output of the comparator 71 is treated as the output signal tPout of the switching-operation detecting unit 70. The winding start side of the secondary winding wire 21 is connected to GND2. GND2 is connected to the plus terminal of the comparator 71. With these components, when the voltage across terminals V21 of the secondary winding wire 21 is generated in the plus direction, the output tPout of the comparator 71, that is, the output signal tPout of the switching-operation detecting unit 70 outputs "H". When the voltage across terminals V21 of the secondary winding wire 21 is generated in the minus direction, tPout outputs "L". Note that, in this configuration, even when the voltage across terminals V21 is 0, tPout outputs "L".

Figure 21:
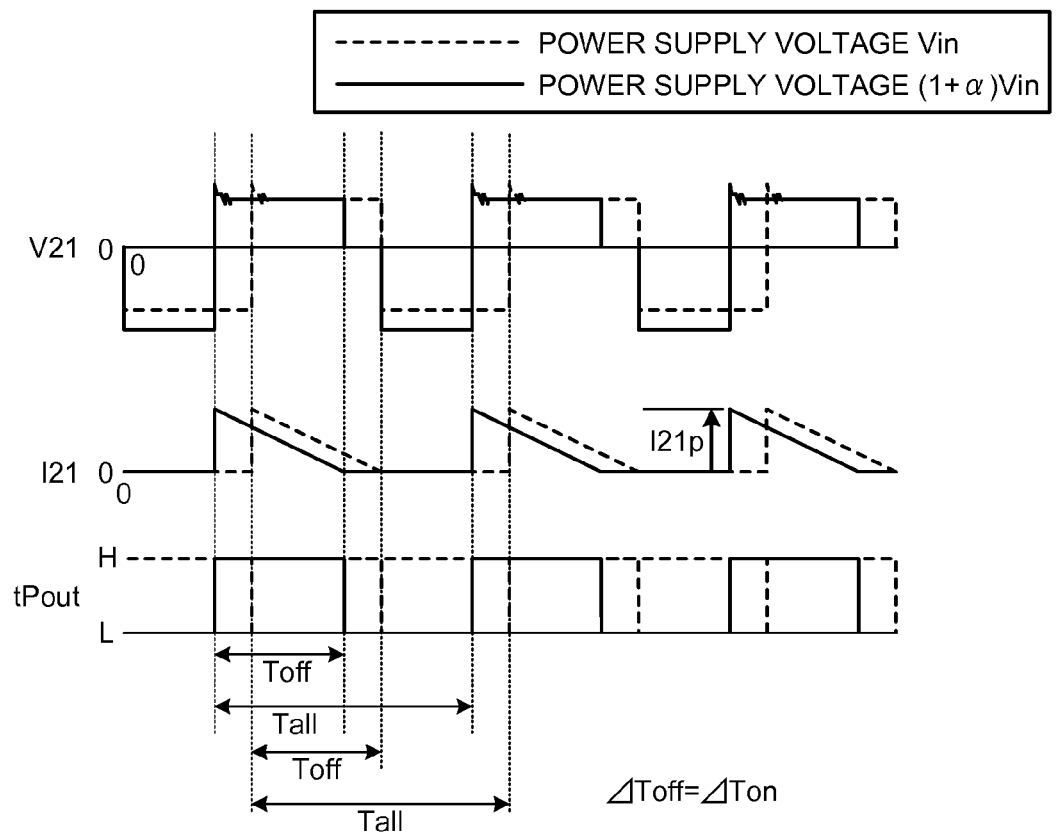
FIG. 21 is a diagram for explaining the operation of the switching-operation detecting unit according to the fourth embodiment.

The operation of the switching-operation detecting unit 70 is explained. FIG. 21 is a diagram for explaining the operation of the switching-operation detecting unit 70. FIG. 21 shows operation performed when the switching power supply is operating in the steady state, loads connected to the secondary winding wires and efficiency η are fixed, and the power supply voltage V1 of the main power supply 5 changes. FIG. 21 shows operation waveforms of the voltage across terminals V21 of the secondary winding wire 21, the electric current I21 flowing to the secondary winding wire 21 and the diode D21, and the output tPout of the switching-operation detecting unit 70. Note that a solid broken line indicates operation performed when the power supply voltage of the main power supply 5 is Vin and a broken solid line indicates operation performed when the power supply voltage is (1+α)×Vin (α is a positive real number).

As shown in FIG. 21, even if the power supply voltage V1 of the main power supply 5 is changed, the period Toff in which an output value of tPout is L→H→L does not change. This is because, as explained above concerning the operation of the switching power supply circuit 1, in the steady state of the switching power supply circuit 1, when the loads connected to the secondary winding wires 21, 22, and 23 and the efficiency η are fixed, even if the power supply voltage V1 of the main power supply 5 changes, time of the electric current I21 flowing to the secondary winding wire 21 and the diode D21 does not change. That is, Toff is equivalent to the time in which the electric current I21 flows to the secondary winding wire 21 and the diode D21. A period in which the output value of tPout is L→H→L or H→L→H→L is equivalent to the switching cycle Tall of the switching element 7. However, in the case of a configuration example shown in FIG. 21, tPout only outputs "H" and "L" and does not indicate a specific time element. Therefore, the time-element time-width measuring unit 100 provided in the switching-operation determining unit 90 of the control circuit 2 measures a time element in which an ON time of the switching element 7 can be estimated.

Figure 22:
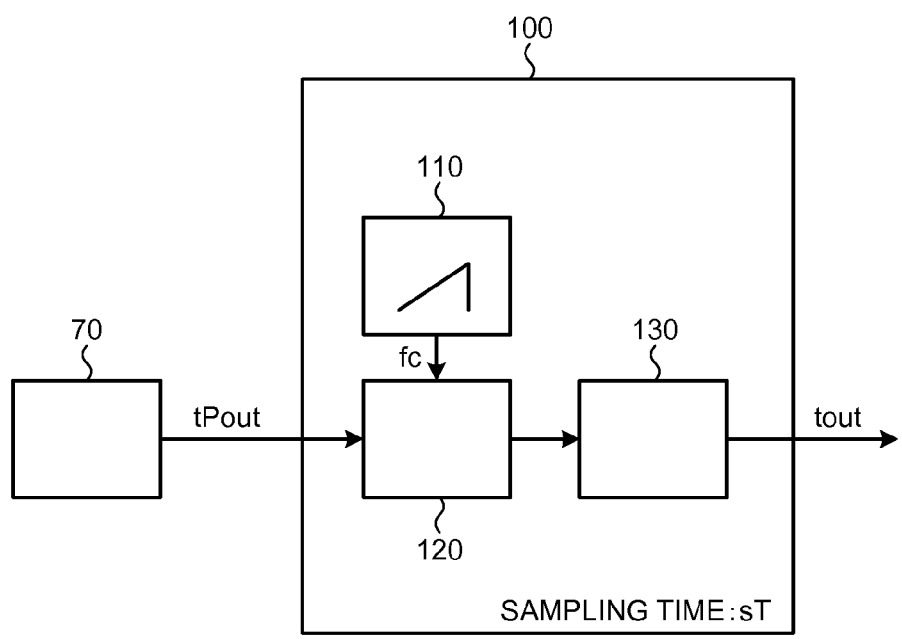
FIG. 22 is a diagram showing a configuration example of a time-width measuring unit that measures time width.

The operation of the time-width measuring unit 100 is explained. As explained above, tPout is input to the control circuit 2. The period in which tPout is L→H→L and the period in which tPout is L→H→L→H or H→L→H→L is measured. FIG. 22 shows a configuration example of the time-width measuring unit 100 that performs measurement of time width.

The time-width measuring unit 100 includes a free-run counter 110, a capture unit 120, and a time-width calculating unit 130 as a discrete time system of the sampling time sT. The free-run counter 110 is a counter that counts 1 per one sampling. The free-run counter 110 inputs an output fc to the capture unit 120. The output fc of the free-run counter 110 and tPout are input to the capture unit 120. The capture unit 120 stores a counter value at the time when tPout changes L→H and H→L and outputs a storage result to the time-width calculating unit 130. The time-width calculating unit 130 calculates, on the basis of the output of the capture unit 120, the time Toff or the switching cycle Tall at which the electric current I21 flows to the secondary winding wire 21 and the diode D21. An output of the time-width calculating unit 130 is input to the comparators 910 and 920 in the switching-operation determining unit 90 to determine the operation of the switching element 7.

Figure 23:
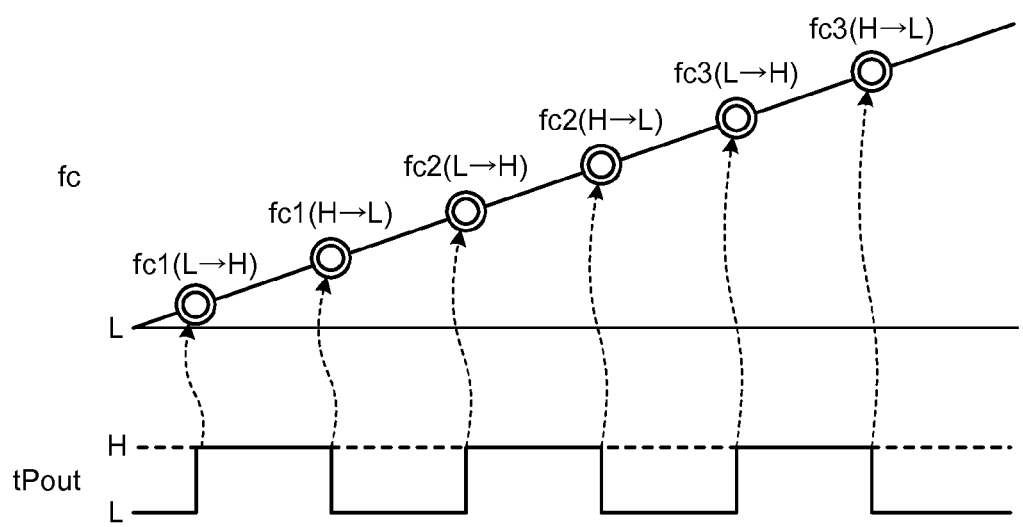
FIG. 23 is a diagram for explaining the operation of a capture unit.

FIG. 23 is a diagram for explaining the operation of the capture unit 120. FIG. 23 shows operation waveforms of the output fc of the free-run counter 110 and tPout. A counter value at the time when tPout changes L→H first is represented as fc1(L→H), a counter value at the time when tPout changes H→L first is represented as fc1(H→L), a counter value at the time when tPout changes L→H second is represented as fc2(L→H), and a counter value at the time when tPout changes H→L second is represented as fc2(H→L). As explained above, the counter values at the time when tPout changes L→H and H→L are stored and input to the time-width calculating unit 130 by the capture unit 120.

The operation of the time-width calculating unit 130 is explained. The operation is explained using fc1(L→H), fc1(H→L), fc2(L→H), and fc2(H→L), which are the outputs of the capture unit 120. From FIG. 23, if the time width from fc1(L→H) to fc1(H→L) is measured, Toff can be calculated. As explained above, the free-run counter 110 counts 1 at one sampling time sT. Therefore, Toff can be calculated as described below.

$$Toff = (fc1(H \to L) - fc1(L \to H)) \times sT \quad (27)$$

From FIG. 23, if the time width from fc1(L→H) to fc2(L→H) is measured, the switching cycle Tall can be calculated. Therefore, Tall can be calculated as described below.

$$Tall = (fc2(L \to H) - fc1(L \to H)) \times sT \quad (28)$$

Alternatively, when a time width from fc1(H→l) to fc2(H→l) is measured, Tall can also be calculated. Therefore, Tall can also be calculated as described below.

$$Tall = (fc2(H \to L) - fc1(H \to L)) \times sT \quad (29)$$

According to the above explanation, by monitoring the voltage across terminals V21 of the secondary winding wire 21 (i.e., a voltage before being rectified), it is possible to calculate time elements representing time in which the switching element 7 is on such as the time Toff or the switching frequency Tall of the electric current flowing to the secondary winding wire 21 and the diode D21. As explained above, the output of the time-width calculating unit 130, that is, the output of the time-width measuring unit 100 is input to the comparators 910 and 920 in the switching-operation determining unit 90. However, whichever of Toff and Tall can be input or both of Toff and Tall can be input.

In the configuration of the switching-operation detecting unit 70 shown in FIG. 20, a time element representing the time in which the switching element 7 is on cannot be detected. However, the time element can be detected by changing the internal configuration of the switching-operation detecting unit 70. For example, a configuration in which an inversion circuit for inverting the voltage across terminals V21 is used and various configurations are possible. Note that, when the time element representing the time in which the switching element 7 is on can be detected by the switching-operation detecting unit 70, the time-width measuring unit 100 in the switching-operation determining unit 90 can be omitted, and the output of the switching-operation detecting unit 70 can be input to the comparators 910 and 920.

As explained above, in the switching power supply circuit 1 in the fourth embodiment, the switching-operation detecting unit 70 and the time-width measuring unit 100 that detect the operation of the switching element 7 on the basis of the monitoring result of the voltage across terminals V21 of the secondary winding wire 21 are configured. Therefore, it is unnecessary to use a dedicated insulating mechanism such as an isolation amplifier or a photocoupler. It is possible to attain improvement of reliability and a reduction in costs through a reduction in the number of components.

With the switching power supply circuit 1 in the fourth embodiment, because GND2 of the power supply voltage V2 generated by the secondary winding wire 21 same as the control circuit 2 is set as the reference, it is unnecessary to secure an insulation distance of signal patterns, and thus, it is possible to realize a reduction in a substrate size.

Fifth Embodiment

Figure 24:
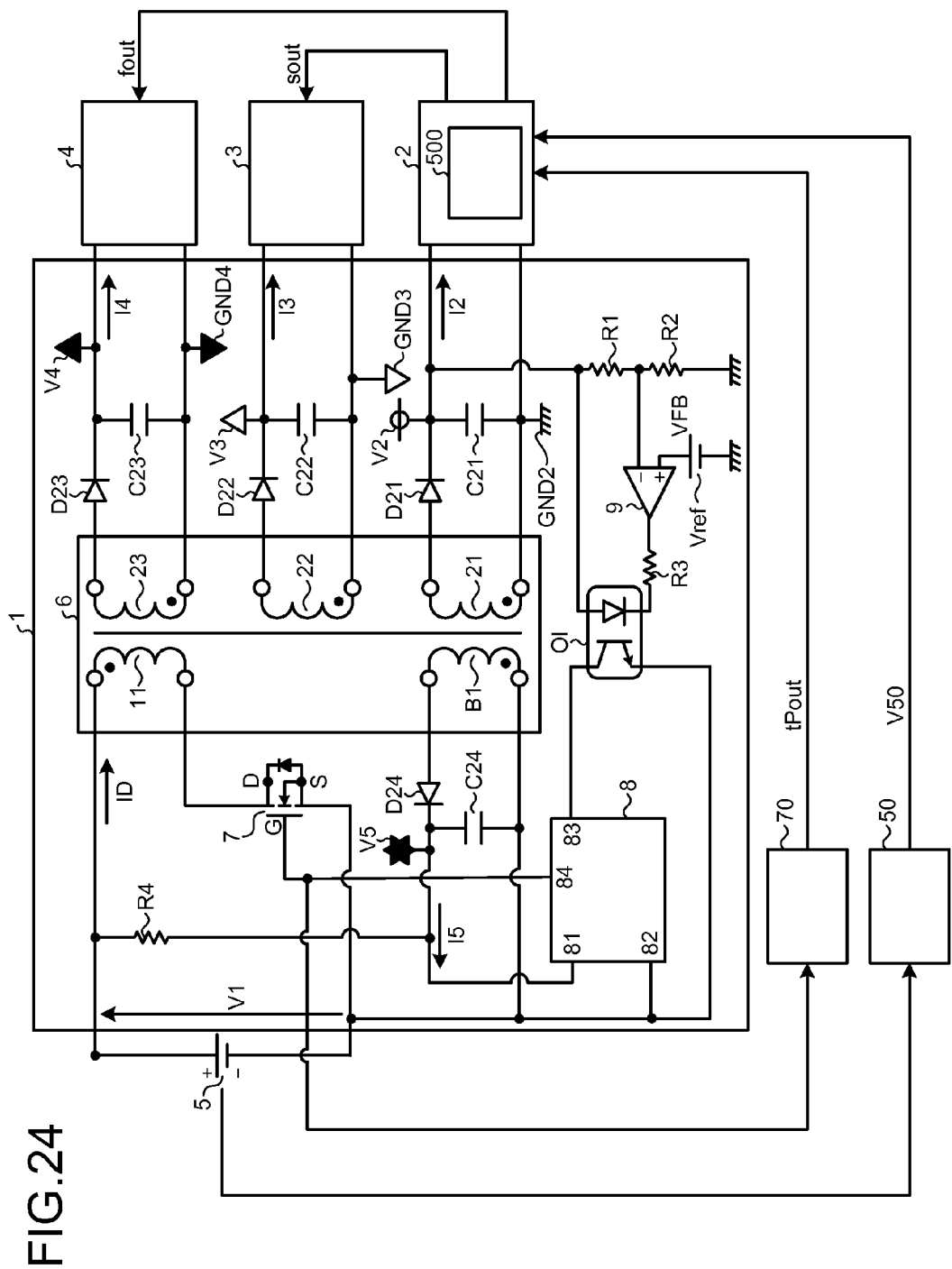
FIG. 24 is a block diagram showing a main part configuration concerning an electronic apparatus mounted with a switching power supply circuit and another circuit according to a fifth embodiment.

FIG. 24 is a block diagram showing a main part configuration concerning an electronic apparatus mounted with the switching power supply circuit 1 and another circuit according to a fifth embodiment. As in the first to fourth embodiments, an example is shown in which the switching power supply circuit 1 and the another circuit are mounted on an inverter apparatus. In the second embodiment, the configuration is disclosed in which the output signal V50 of the power-supply-voltage detecting unit 50 is input to the control circuit 2. In the fourth embodiment, the configuration is disclosed in which the output signal tPout of the switching-operation detecting unit 70 is input to the control circuit 2. However, in the fifth embodiment, a configuration is disclosed in which both of the output signal V50 of the power-supply-voltage detecting unit 50 and the output signal tPout of the switching-operation detecting unit 70 are input. Note that components same as or equivalent to the components shown in FIG. 1 or FIG. 10 are denoted by the same reference numerals and signs and explanation of redundant contents is omitted as appropriate.

In the fifth embodiment, the control circuit 2 includes a circuit diagnosis unit 500 that calculates and diagnoses the operation of the switching power supply circuit 1 on the basis of the output signal V50 and tPout. The control circuit 2 performs operation start and stop of the main circuit 3 and the peripheral apparatus circuit 4 on the basis of an output of the circuit diagnosis unit 500.

The circuit diagnosis unit 500 performs a diagnosis of the operation of the switching power supply circuit 1 on the basis of the power supply voltage V1 of the main power supply 5 calculated from the output signal V50, an operation state of the switching element 7 calculated from tPout, a peak current value of an electric current flowing to the primary winding wire 11 and the switching element 7, power consumption of the circuits connected to the secondary winding wires 21, 22, and 23 via the diodes D21, D22, and D23 grasped by the control circuit 2, magnetic flux density of the transformer 6, and the like.

As it is seen from Formula (2) to Formula (22) described above, the operation of the switching power supply circuit 1 can be diagnosed using values of the power supply voltage V1 of the main power supply 5, the operation state of the switching element 7, the power consumption of the circuits connected to the secondary winding wires 21, 22, and 23, the inductances of the winding wires of the transformer 6, the efficiency η, and the like.

Diagnosis items of the operation of the switching power supply circuit 1 are described below.
(1) The power supply voltage V1 of the main power supply 5
(2) The operation of the switching element 7 (the ON time Ton and the OFF time Toff of the switching element 7, the switching frequency fsw, and the electric current flowing to the secondary winding wire 21 and the diode D21)
(3) The current peak value IDp of the electric current ID flowing to the primary winding wire 11 and the switching element 7
(4) Consistency check of the power consumption Pall of the circuits connected to the secondary winding wires, the power supply voltage V1 of the main power supply, and the operation of the switching element 7
(5) Magnetic flux density ΔB of the transformer 6

Among the diagnosis items, concerning (1) and (2), a diagnosis can be performed by a configuration same as the configuration in the second to fourth embodiments.

The current peak value IDp in the diagnosis item (3) can be calculated using Formula (30).

$$IDp = V1/L11 \times Ton \quad (30)$$

The peak current value IDp can be used for various diagnoses such as comparison with the overcurrent protection level current value IDOC set in the IC for power supply control 8 and calculation of a copper loss of the primary winding wire 11 and a heat value involved in the copper loss.

The diagnosis item (3) is further explained. Concerning the power consumption Pall of the circuits connected to the secondary winding wires 21, 22, and 23, the power supply voltage V1 of the main power supply 5, and the operation of the switching element 7, the diagnosis item (3) can be represented as described below from Formula (2) and Formula (8) when the ON time Ton of the switching element 7 is used.

$$Pall/\eta = \tfrac{1}{2} \times L11 \times IDp^2 \times fsw = \tfrac{1}{2} \times L11 \times (V1/L11 \times Ton)^2 \times fsw \quad (31)$$

In Formula (31), it is confirmed that the power consumption Pall of the circuits connected to the secondary winding wires via the diodes grasped by the control circuit 2 and IDp are consistent. Note that L11 and fsw are known values and Pall and η are values that can be grasped in a designing stage.

The diagnosis item (4) is explained. When the sectional area of the core of the transformer 6 is represented as Ae, the magnetic flux density ΔB can be represented by the following formula.

$$\Delta B = V1 \times Ton/N11/Ae \quad (32)$$

As the magnetic flux density ΔB, the magnetic flux density of the transformer 6 is calculated. When ΔB increases, the transformer 6 is magnetically saturated. Therefore, by diagnosing ΔB, a margin for the magnetic saturation is checked.

An operation state of the switching power supply circuit 1 is monitored using Formulas (30) to (32).

In the fifth embodiment, as in the first to fourth embodiments, the operation of the switching power supply circuit 1 is controlled according to three steps. Note that, at the second step and the third step, the operation state of the switching power supply circuit 1 is diagnosed.

(First Step: Time t00 to t01)

At the first step, the charging of the capacitors C21, C22, C23, and C24 respectively connected to the secondary winding wires 21, 22, and 23 and the auxiliary winding wire B1 via the diodes D21, D22, D23, and D24, and the power supply to the control circuit 2 and the IC for power supply control 8 are performed. At time t00, electric power is supplied to the main power supply 5 and the switching power supply circuit 1 starts operation. As explained above, at the start time, the overcurrent protection operation and the release operation of the IC for power supply control 8 are repeated. Therefore, the electric current ID flows up to the overcurrent protection level current IDOC and the voltage V2 is charged. At time t01, the voltage V2 reaches the commanded voltage V2ref. As explained above, at the first step, power supply to the control circuit 2 and the IC for power supply control 8 is performed. Besides, operation for charging the capacitors C21, C22, C23, and C24 connected to the secondary winding wires 21, 22, and 23 and the auxiliary winding wire B1 to respective commanded voltages is also performed. Note that power energy necessary for the primary winding wire 11 in this period is Formula (24) explained in the first embodiment. Therefore, explanation of the power energy is omitted.

(First Step: Time t01 to t02)

At the second step, the control circuit 2 diagnoses an operation state of the switching power supply circuit 1. The switching power supply circuit 1 is in the steady state. The control circuit 2 and the IC for power supply control 8 are operating. In this period, the charging of the command voltages in the capacitors C21, C22, C23, and C24 is completed. Diagnosis processing for the output signal V50 of the power-supply-voltage detecting unit 50 and the output signal tPout of the switching-operation detecting unit 70 is performed. Therefore, the excessively large electric current ID does not flow.

The power supply voltage V1 of the main power supply 5 of the diagnosis condition (1) and the operation state of the switching element 7 of the diagnosis condition (2) can be realized by operation same as the operation in the second embodiment or the fourth embodiment. Therefore, the explanation thereabout is omitted.

The diagnosis condition (3) is explained. When the power supply voltage of the main power supply 5 is represented as Vin and the ON time of the switching element 7 is represented as Ton2s on the basis of the output signal V50 of the power-supply-voltage detecting unit 50 and the output tPout of the switching-operation detecting unit 70, it is possible to calculate, from the inductance L11 of the primary winding wire 11 and Formula (30), a current peak value ID2sp of the electric current ID flowing to the primary winding wire 11 and the switching element 7.

$$ID2sp = V1/L11 \times Ton2s \quad (33)$$

The diagnosis condition (4) is explained. When the inductance of the primary winding wire 11 is represented as L11, the efficiency is represented as η, and the switching frequency is represented as fsw, the diagnosis condition (4) can be represented as described below using Formula (3031).

$$(V2 \times I2 + V5 \times I5) \times \eta/\eta = \tfrac{1}{2} \times L11 \times ID2sp^2 \times fsw \quad (34)$$

It is confirmed that a result calculated by Formula (33) and Formula (34) is consistent with the power consumption of the circuits connected to the secondary winding wires grasped by the control circuit 2.

The diagnosis condition (5) is explained. When magnetic flux density in the period of the second step is represented as $\Delta B2s$, $\Delta B2s$ can be calculated as described below using the power supply voltage Vin of the main power supply 5 and Ton2s, the effective sectional area Ae of the core of the transformer 6, the number of wound wires N11 of the primary winding wire 11, and Formula (3132).

$$\Delta B2s = Vin \times Ton2s/N11/Ae \qquad (35)$$

It is confirmed that calculation results of Formulas (33) to (35) are proper. If the calculation results are proper, the output signals sout and fout from the control circuit 2 are output to operate the main circuit 3 and the peripheral apparatus circuit 4. If the calculation results are not proper, the output signals sout and fout are not output. An alarm signal is output to inform that the operation of the switching power supply circuit 1 is not proper.

(Third Step: Time t02 to t03)

At the third step, the operations of the main circuit 3 and the peripheral apparatus circuit 4 are started according to the output signals sout and fout from the control circuit 2. At time t02, the output signals sout and fout are output from the control circuit 2 respectively to the main circuit 3 and the peripheral apparatus circuit 4 according to the output signal t90 from the switching-operation determining unit 90. In a period of time t02 to t03, the electric current ID increases. This is because the main circuit 3 and the peripheral apparatus circuit 4 start operations and a power load on the secondary winding wires 22 and 23 increases. At time t03, the switching power supply circuit 1 is in the steady state in a state in which all the circuits connected to the switching power supply circuit 1 are operating. Note that, after time t03, the operation state of the switching power supply circuit 1 is periodically diagnosed.

The power supply voltage V1 of the main power supply 5 in the diagnosis condition (1) and the operation state of the switching element 7 in the diagnosis condition (2) can be realized by operation same as the operations in the second embodiment and the fourth embodiment. Therefore, explanation of the power supply voltage V1 of the main power supply 5 and the operation state of the switching element 7 is omitted. The calculated power supply voltage of the main power supply 5 is represented as V1 and the ON time of the switching element 7 is represented as Ton3s.

The diagnosis condition (3) is explained. When a current peak value of an electric current flowing to the primary winding wire 11 and the switching element 7 is represented as ID3sp, ID3sp can be represented as described below.

$$ID3sp = V1/L11 \times Ton3s \qquad (36)$$

The diagnosis condition (4) is explained. When the inductance of the primary winding wire 11 is represented as L11, the efficiency is represented as $\eta$, and the switching frequency is represented as fsw, the diagnosis condition (4) can be represented as described below using Formula (3031).

$$(V2 \times I2 + V3 \times I3 + V4 \times I4 + V5 \times I5) \times \eta/\eta = \tfrac{1}{2} \times L11 \times ID3sp^2 \times fsw \qquad (37)$$

It is confirmed that results calculated by Formula (35) and Formula (36) are consistent with power consumption of the circuits connected to the secondary winding wires grasped by the control circuit 2.

The diagnosis condition (5) is explained. When magnetic flux density in the period of the third step is represented as $\Delta B3s$, the magnetic flux density $\Delta B3s$ can be calculated from the power supply voltage Vin of the main power supply 5 and Ton3s, the effective sectional area Ae of the core of the transformer 6, and the number of wound wires N11 of the primary winding wire 11 using Formula (3132) as described below.

$$\Delta B3s = Vin \times Ton3s/N11/Ae \qquad (38)$$

Results of the diagnosis conditions can be periodically stored in the storage unit 220 mounted on the control circuit 2 as the operation states of the switching power supply circuit 1. The results can also be stored in a nonvolatile memory such as an EEPROM and compared with an operation state of the switching power supply circuit 1 at the time when the power supply is turned on next time.

In the period after t03 of the third step, when fluctuation occurs in the operation state of the switching power supply circuit 1, rather than immediately stopping the operations of the main circuit 3 and the peripheral apparatus circuit 4, in a state in which operation is possible, the operations of the main circuit 3 and the peripheral apparatus circuit 4 are continued, and, when the operations deviate from reference thresholds of the diagnosis conditions set in advance, the operation of the peripheral apparatus circuit 4 is stopped first, and a diagnosis of the operation of the switching power supply circuit 1 is performed by the circuit diagnosis unit 500. If there is no problem in a diagnosis result, the operation is continued and, at the same time, abnormality of the peripheral apparatus circuit 4 is informed by an alarm signal.

As in the second embodiment, the power-supply-voltage detecting unit 50 can be configured on the basis of the voltage across terminals V21 of the secondary winding wire 21. Similarly, as in the fourth embodiment, the switching-operation detecting unit 70 can also be configured on the basis of the voltage across terminals V21 of the secondary winding wire 21.

As it is understood from the above explanation, in the switching power supply circuit 1 and the control method therefor in the fifth embodiment, it is possible to obtain effects same as the effects in the first to fourth embodiments. Specifically, the effects are as explained below.

First, in the switching power supply circuit 1 and the control method therefor in the fifth embodiment, the switching power supply circuit 1 includes, in the control circuit 2, the means for controlling the operations of the main circuit 3 and the peripheral apparatus circuit 4. The switching power supply circuit 1 configures sequence control for performing the charging in the capacitors C21, C22, C23, and C24 connected to the secondary winding wires 21, 22, and 23 and the auxiliary winding wire B1 via the diodes D21, D22, D23, and D24, and the power supply to the control circuit 2 and the IC for power supply control 8 and, after changing to the steady state, operating the main circuit 3 and the peripheral apparatus circuit 4 on the basis of an output of the circuit diagnosis unit 500, that is, on the basis of a diagnosis result of an operation state of the switching power supply circuit 1. Consequently, it is possible to reduce a power load at the start time in the switching power supply circuit 1 and charge the capacitors C21, C22, C23, and C24 connected to the secondary winding wires 21, 22, and 23 and the auxiliary winding wire B1 to the commanded voltages, that is, change the operation of the switching power supply circuit 1 to the steady state without increasing the overcurrent protection level current.

With the switching power supply circuit 1 and the control method therefor in the fifth embodiment, even when abnormality has occurred in the switching power supply circuit 1, for example, when abnormality occurs in the circuits connected to the secondary winding wires 21, 22, and 23 in the steady state, because the overcurrent protection level current value IDOC has not been increased, it is possible to quickly stop the operation of the switching element 7. Therefore, it is possible to reduce the heat capacities of the diodes D21, D22, D23, and D24 connected to the secondary winding wires 21, 22, and 23 and the auxiliary winding wire B1 and the switching element 7. It is also possible to prevent magnetic saturation of the transformer 6. As a result, it is possible to reduce the components of the switching power supply circuit 1 in size, and thus it is possible to attain a reduction in the size and a reduction in the costs of the switching power supply circuit 1.

Further, with the switching power supply circuit 1 and the control method therefor in the fifth embodiment, as in the first to third embodiments, it is possible to perform, with the IC for power supply control 8, ON/OFF of the switching element 7 and the overcurrent protection operation and control, with the control circuit 2, start/stop of the operations in the circuits respectively connected to the secondary winding wires 21, 22, and 23 to perform increase and decrease control of power consumption in the secondary winding wires 21, 22, and 23. Therefore, it is unnecessary to use the IC for power supply control 8 that has a high function and performs complicated operation, and thus it is possible to use the inexpensive IC for power supply control 8.

In the switching power supply circuit 1 and the control method therefor in the fifth embodiment, the diagnosis based on the power supply voltage V1 of the main power supply 5, which is the power source of the switching power supply circuit 1, and the operation state of the switching element 7 is performed. Therefore, it is possible to monitor an operation state of the switching power supply circuit 1. It is possible to quickly perform a diagnosis during an abnormal operation.

Note that, in the switching power supply circuit 1 and the control method therefor in the fifth embodiment, a part of the diagnosis items can be omitted according to specifications of the electronic apparatus mounted with the switching power supply circuit 1. Specifically, a part of the diagnosis items are omitted as explained below.

In an electronic apparatus in which electric power supplied from secondary winding wires is fixed, that is, power consumption of the secondary winding wire is fixed, the time in which an electric current flows to the secondary winding wires and diodes are fixed. If the power supply voltage V1 of the main power supply 5 can be monitored, it is possible to calculate time elements related to the operation of the switching element 7 such as the ON time and the OFF time of the switching element 7, and thus, it is possible to diagnose an operation state of the switching power supply circuit 1.

In an electronic apparatus in which the power supply voltage V1 of the main power supply 5 is fixed, if an operation state of the switching element 7 can be grasped, it is possible to diagnosis an operation state of the switching power supply circuit 1.

That is, according to specifications of the electronic apparatus, even if only one of the power-supply-voltage detecting unit 50 and the switching-operation detecting unit 70 is used, it is possible to perform the same operation diagnosis of the switching power supply circuit 1.

Incidentally, the first step is a period in which a desired voltage is charged in the capacitors connected to the secondary winding wires via the diodes and power supply is performed to operate the control circuit 2 and the IC for power supply control 8. The operation at the first step can be changed as explained below.

Figure 25:
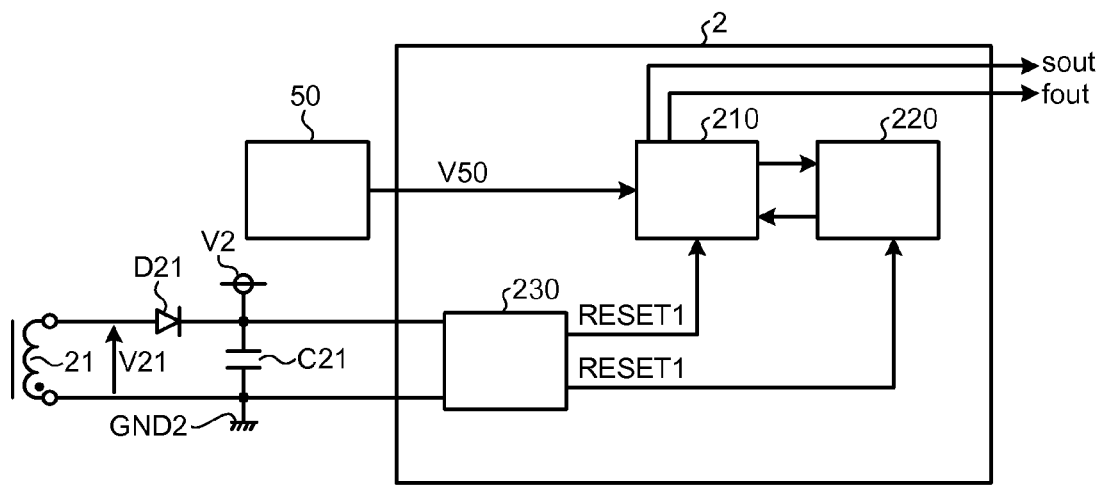
FIG. 25 is a block diagram showing a configuration example of a control circuit according to the fifth embodiment.

FIG. 25 is a block diagram showing a configuration example of the control circuit 2 according to the fifth embodiment. When compared with FIG. 2, an IC for control circuit start 230 is added. Both ends of the capacitor C21 connected to the secondary winding wire 21 of the transformer 6 via the diode D21 are input to the IC for control circuit start 230. The IC for control circuit start 230 monitors the voltage V2 charged in the capacitor C21 and outputs a start signal RESET1 to the arithmetic processing unit 210 and the storage unit 220 after time Δtc when V2 reaches the commanded voltage V2ref, whereby the arithmetic processing unit 210 and the storage unit 220 operate.

Figure 26:
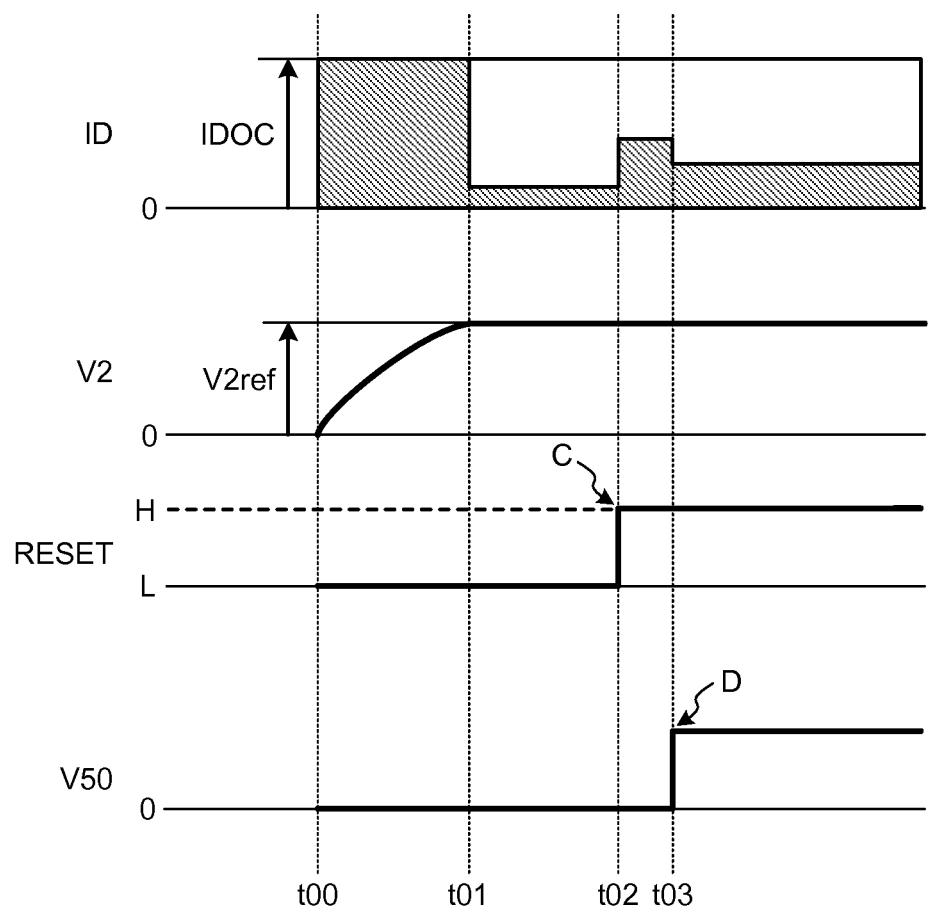
FIG. 26 is a diagram for explaining operation of a changed first step.

Specific operation is explained. FIG. 26 is a diagram for explaining the operation of the changed first step. FIG. 26 shows operation waveforms concerning the electric current ID, the voltage V2, the start signal RESET, and the output V50 of the power-supply-voltage detecting unit 50. Note that, instead of the output signal V50 of the power-supply-voltage detecting unit 50, the output signal tPout of the switching-operation detecting unit 70 or both of V50 and tPout can be input to the arithmetic processing unit 210.

Time t00 indicates the time when power supply to the main power supply 5 is started and the switching power supply circuit 1 starts operation. At time t00 to t01, the charging of the capacitors C21, C22, C23, and C24 connected to the secondary winding wires 21, 22, and 23 and the auxiliary winding wire B1 and the power supply to the control circuit 2 and the IC for power supply control 8 are performed. In addition, the voltage of the voltage V2 is monitored by the IC for control circuit start 230.

At time t01, commanded voltages are charged in the capacitors C21, C22, C23, and C24. The voltage V2 reaches the commanded voltage V2ref. At time t02, the start signal RESET is output from the IC for control circuit start 230 to the arithmetic processing unit 210 and the storage unit 220. The arithmetic processing unit 210 and the storage unit 220 start operations. Note that, when the start signal RESET outputs "H", as indicated by a C part shown in the figure, a predetermined delay time is given.

Time t02 to t03 is a period until the arithmetic processing unit 210 and the storage unit 220 get into stable operations. As indicated by a D part shown in the figure, at time t03, the arithmetic processing unit 210 and the storage unit 220 change to a stable operation state and can monitor the output V50 of the power-supply-voltage detecting unit 50.

According to the above explanation, the changed step 1 operates as explained below.

Step 1: The charging of the capacitors C21, C22, C23, and C24 connected to the secondary winding wires 21, 22, and 23 and the auxiliary winding wire B1, the power supply to the IC for power supply control 8, and the monitoring of the voltage V2 in the IC for control circuit start 230

Step 2: The start signal RESET is output from the IC for control circuit start 230 to the arithmetic processing unit 210 and the storage unit 220, and the arithmetic processing unit 210 and the storage unit 220 start operations Step 3: After the stable operations of the arithmetic processing unit 210 and the storage unit 220, determination of the output signal V50 of the power-supply-voltage detecting unit 50 is carried out As explained above, the arithmetic processing unit 210 is configured by a microcomputer, a CPU, an ASIC, or the like. The storage unit 220 is configured by a flash ROM or an EEPROM. In general, the arithmetic processing unit 210 and the storage unit 220 are started after the power supply voltage supplied thereto reaches a desired voltage. For example, the arithmetic processing unit 210 needs to perform, in the stable operation state, the supply of the power supply voltage V1 of the main power supply, the operation of the switching element 7, and the operation diagnosis of the switching power supply circuit 1. At the changed first step, in the arithmetic processing unit 210, the operation sequences explained in the first to fifth embodiments can be realized.

Sixth Embodiment

Figure 27:
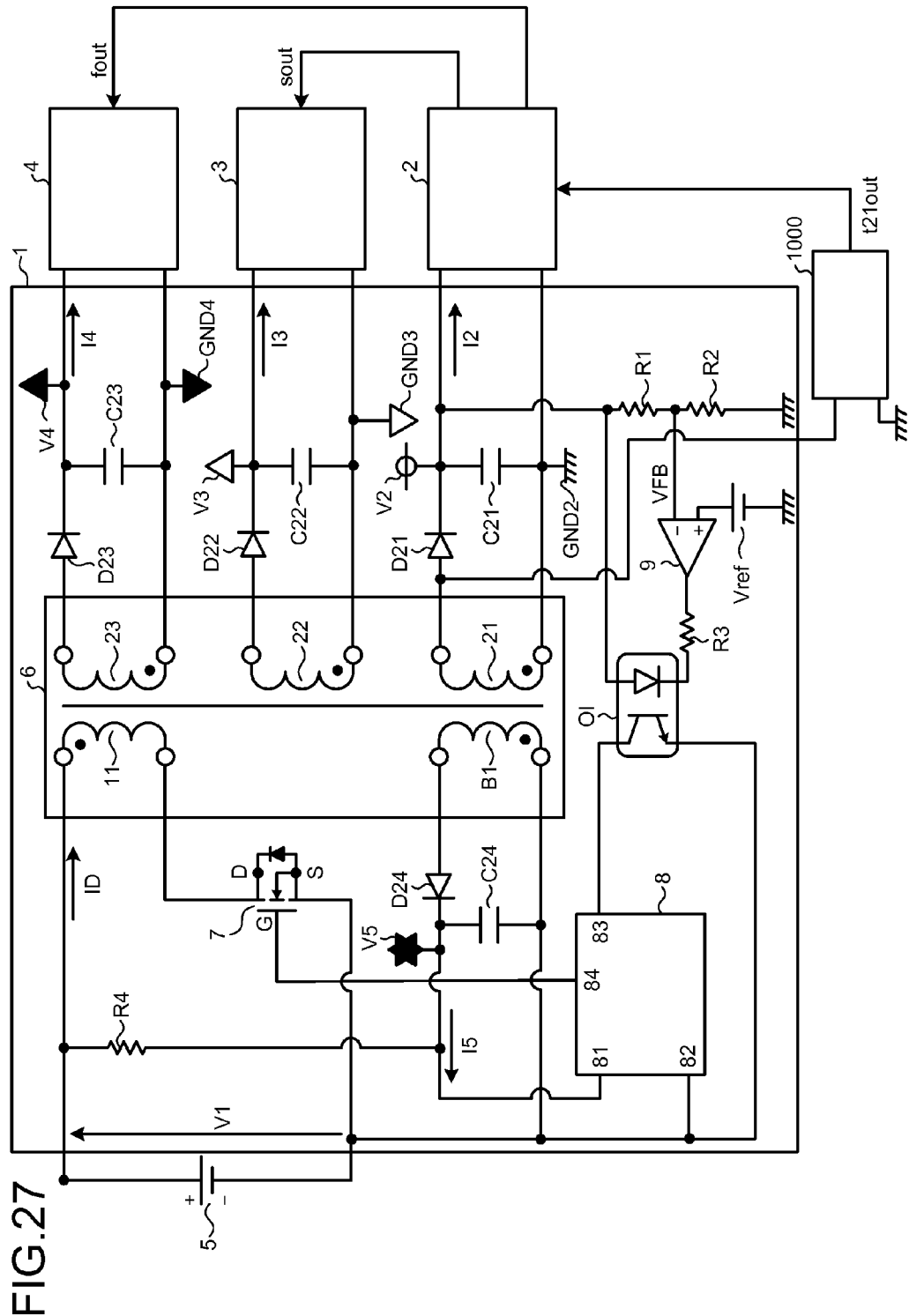
FIG. 27 is a block diagram showing a main part configuration concerning an electronic apparatus mounted with a switching power supply circuit and another circuit according to a sixth embodiment.

FIG. 27 is a block diagram showing a main part configuration concerning an electronic apparatus mounted with the switching power supply circuit 1 and another circuit according to a sixth embodiment. As in the first, second, and fourth embodiments, an example is shown in which the switching power supply circuit 1 and the another circuit are mounted on an inverter apparatus. In the sixth embodiment, a secondary-winding-wire-conduction-time detecting unit 1000 is provided that detects time in which an electric current flows to the secondary winding wire 21 and the diode D21 connected to the capacitor C21 connected to the control circuit 2. The secondary-winding-wire-conduction-time detecting unit 1000 has a function of detecting time t21out in which an electric current flows to the secondary winding wire 21 and the diode D21 and outputting an output signal t21out, which is a detection result, to the control circuit 2. Note that components same as or equivalent to the components explained above in the embodiments are denoted by the same reference numerals and signs and explanation of redundant contents is omitted as appropriate.

In the embodiments explained above, as the control method for the switching power supply circuit 1, the operations are performed in the three steps to attain dispersion of a power load. However, for example, if some abnormality has occurred in the control circuit 2 between the first step and the second step, and an excessively large current exceeding the heat capacity of the diode D21 flows, it is likely that heat generation of the diode D21 increases and heat damage occurs.

As explained above, the IC for power supply control 8 has the function of performing the ON/OFF control of the switching element 7 and performing the overcurrent protection operation for stopping the switching operation when an excessively large electric current flows. When the overcurrent protection level current value for performing the overcurrent protection operation is represented as IDOC, maximum power Pinmax suppliable by the primary winding wire 11 can be indicated by Formula (39).

$$P\text{inmax}=\frac{1}{2}\times L11\times IDOC^2\times fsw \quad (39)$$

After the first step is completed, the main circuit 3 and the peripheral apparatus circuit 4 are not operating. Only the control circuit 2 and the IC for power supply control 8 are operating. When electric power consumed by the control circuit 2 is represented as P21 and electric power consumed by the IC for power supply control 8 is represented as P51, a total load P2all on the secondary winding wires can be indicated by Formula (40).

$$P2\text{all}=P21+P51=P21+V5\times I5 \quad (40)$$

When efficiency is represented as η, electric power Pin suppliable by the primary winding wire can be indicated by Formula (41).

$$P\text{in}=\eta\times P2\text{all}/\eta \quad (41)$$

When an excessively large electric current flowing when abnormality occurs in the control circuit 2 is represented as I2max and a power load in this case is represented as P21max, P21max can be indicated by Formula (42).

$$P21\text{max}=V2\times I2\text{max} \quad (42)$$

A total load on the secondary winding wires at the time when there is some abnormality in the control circuit 2 as explained above is represented as P2allmax, the total load P2allmax can be indicated by Formula (43).

$$P2\text{allmax}=P21\text{max}+P51=V2\times I2\text{max}+P51 \quad (43)$$

When there is some abnormality in the control circuit 2 and a current value consumed by the control circuit is I2max after the first step is completed as explained above and, therefore, the electric current ID flowing to the primary winding wire 11 and the switching element 7 has reached the overcurrent protection level current IDOC, the electric power Pin suppliable by the primary winding wire 11 is equivalent to Pinmax shown in Formula (41). When Pinmax shown in Formula (39) is substituted for Pin of Formula (41) and P2allmax of Formula (43) is substituted for P2all of Formula (41), a formula can be represented as described below.

$$\frac{1}{2}\times L11\times IDOC\times fsw=\eta\times(V2\times I2\text{max}+P51)/\eta \quad (44)$$

At this point, the electric current I2max flowing to the control circuit 2 can be calculated as described below from Formula (44).

$$I2\text{max}=\frac{1}{2}\times L11\times IDOC\times fsw\times\eta/(\eta\times V2)V2-P51/V2 \quad (45)$$

Formula (45) indicates a current value consumed by the control circuit 2 when there is some abnormality in the control circuit 2 and an electric current flows to the primary winding wire 11 and the switching element 7 up to the overcurrent protection level current value IDOC of the IC for power supply control 8.

As explained above, in the switching element 7, when an excessively large current flows, an electric current does not flow more because of the overcurrent protection level current value IDOC set in the IC for power supply control 8. Therefore, the heat capacity of the switching element 7 only has to be secured on the basis of the overcurrent protection level current value IDOC. However, even when an electric current exceeding the heat capacity of diodes connected to the secondary winding wires flows, the diodes continue operation up to the electric power Pinmax suppliable by the primary winding wire 11 based on the overcurrent protection level current value IDOC. Therefore, it is necessary to increase the heat capacity by, for example, selecting diodes having a large heat capacity and increasing the size of a heat sink.

In the embodiments explained above, after the first step ends, when some abnormality occurs in the control circuit 2, most of the electric power Pinmax of the primary winding wire 11 based on the overcurrent protection level current value IDOC set by the IC for power supply control 8 changes to power consumption of the control circuit 2. The consumed current I2max of the control circuit 2 increases. As a result, an electric current flowing to the diode D21 becomes excessively large.

In the sixth embodiment, as shown in FIG. 27, the secondary-winding-wire-conduction-time detecting unit 1000 is provided. The secondary-winding-wire-conduction-time detecting unit 1000 is suitable for solving the problems explained above.

Figure 28:
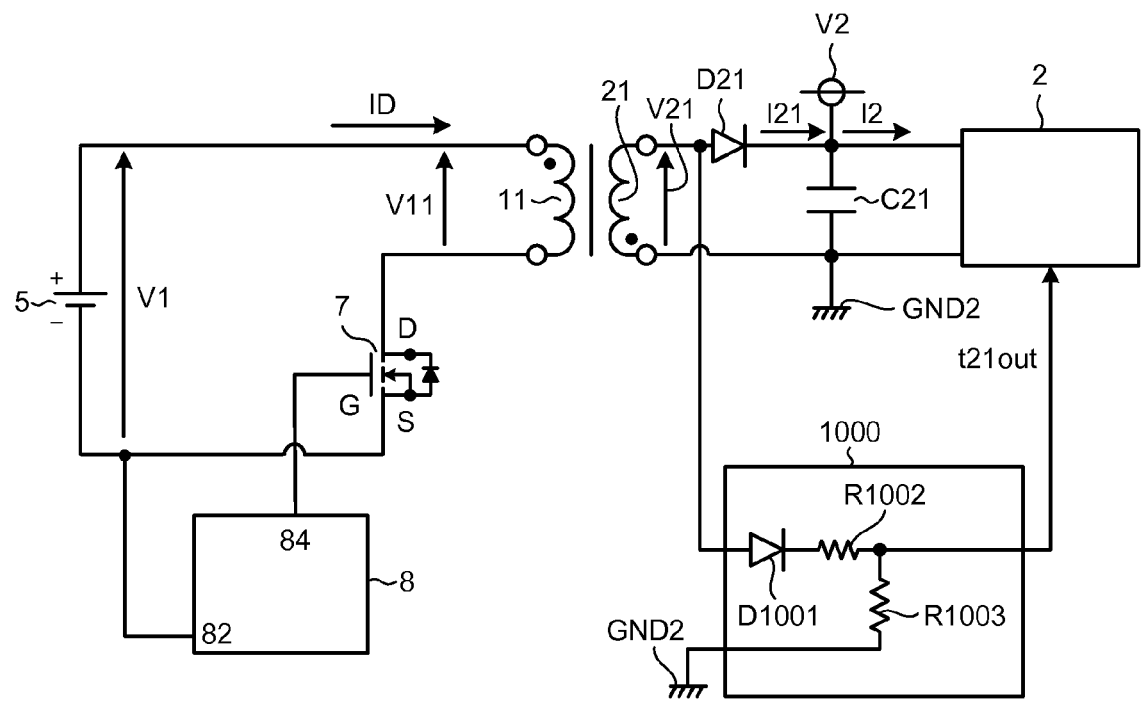
FIG. 28 is a block diagram showing the internal configuration of a secondary-winding-wire-conduction-time detecting unit.

FIG. 28 is a block diagram showing the internal configuration of the secondary-winding-wire-conduction-time detecting unit 1000. The winding end terminal of the secondary winding wire 21 and an anode terminal of a diode D1001 are connected, a cathode terminal of the diode D1001 and one end of a resistor R1002 are connected, and the other end of the resistor R1002 is connected to GND2, which is the reference of the secondary winding wire 21, via a resistor R1003. The potential at the other end of the resistor R1002 is represented as t21out and input to the control circuit 2.

Figure 29A:
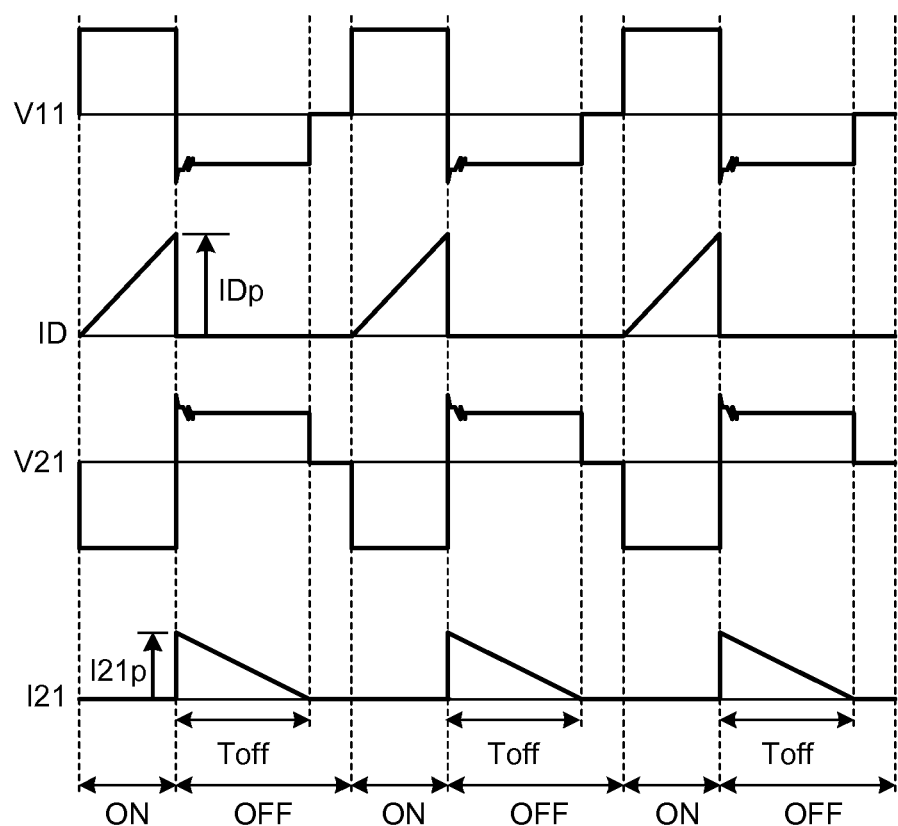
FIG. 29a is a diagram showing an operation waveform of a main part in a control circuit at the time when a consumed current of the control circuit is small.
Figure 29B:
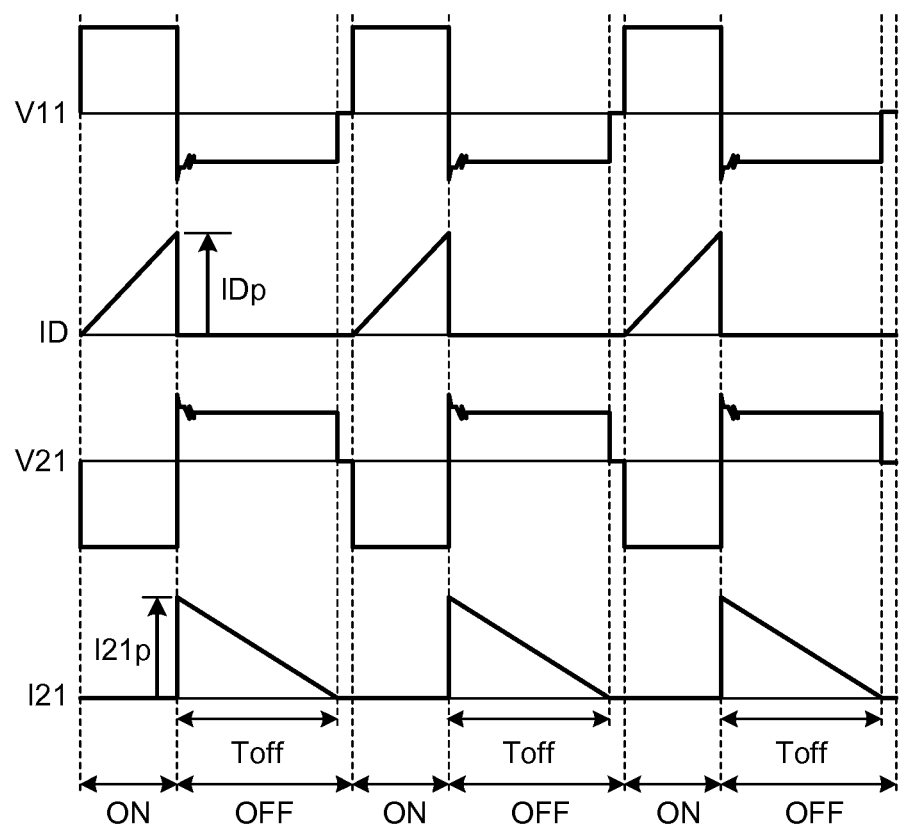
FIG. 29b is a diagram showing an operation waveform of the main part in the control circuit at the time when the consumed current of the control circuit is medium.
Figure 29C:
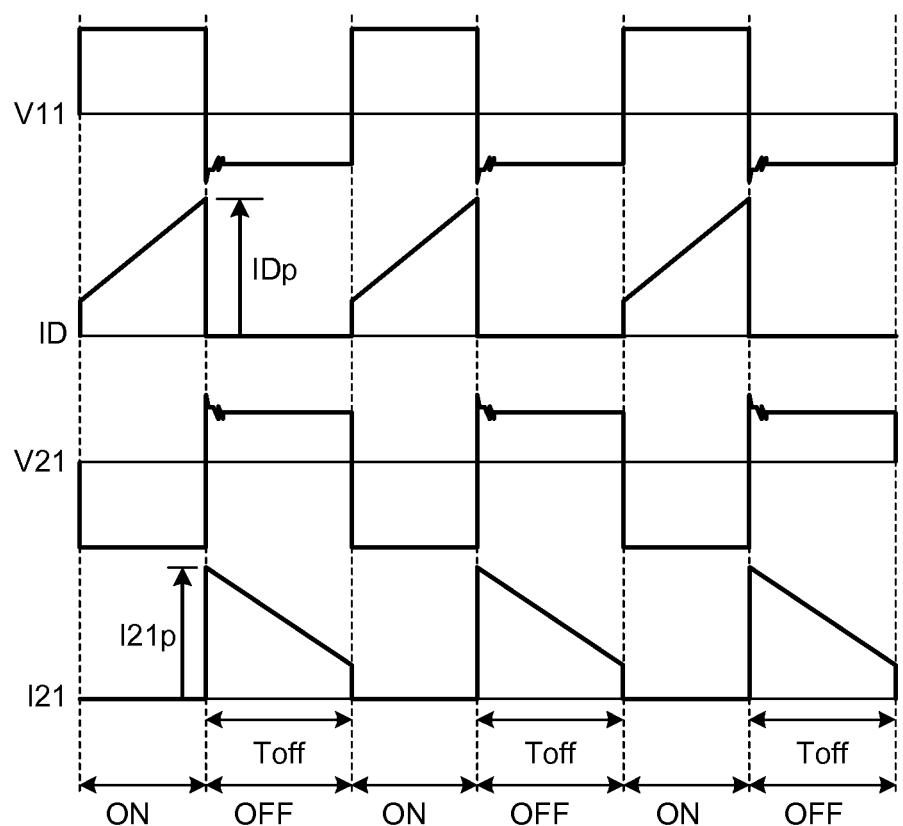
FIG. 29c is a diagram showing an operation waveform of the main part in the control circuit at the time when the consumed current of the control circuit is large.

A relation between the electric current I21 flowing to the secondary winding wire 21 and the diode D21 and the operation of the electric current I2 consumed by the control circuit 2 is explained with reference to FIG. 29a to FIG. 29c. FIG. 29a to FIG. 29c are diagrams for explaining the operation on the secondary side of the switching power supply circuit 1 with respect to the electric current I2 consumed by the control circuit 2, that is, a change in the behavior of the secondary winding wire 21 and the diode D21. Specifically, FIG. 29a to FIG. 29c show operation waveforms of the voltage across terminals V11 of the primary winding wire 11, the electric current ID flowing to the primary winding wire 11 and the switching element 7, the voltage across terminals V21 of the secondary winding wire 21, and the electric current I21 flowing to the secondary winding wire 21 and the diode D21. Note that operation conditions of the switching power supply circuit 1 are as explained below.

(Operation Conditions of the Switching Power Supply Circuit 1)

The switching frequency fsw is fixed

The operation state of the switching power supply circuit 1 is a state after the end of the first step, that is, a state in which the control circuit 2 and the IC for power supply control 8 are operating and the main circuit 3 and the peripheral apparatus circuit 4 are not operating The power supply voltage of the main power supply 5 is fixed Only the electric current I2 consumed by the control circuit 2 changes As shown in FIG. 29a to FIG. 29c, the electric current I2 consumed by the control circuit 2 increases in the order of FIG. 29a, FIG. 29b, and FIG. 29c. It is seen that, as the electric current I2 consumed by the control circuit 2 increases, the peak current IDp of the electric current ID flowing to the primary winding wire 11 and the switching element 7 and the peak current I21p of the electric current I21 flowing to the secondary winding wire 21 and the diode D21 increase. It is seen that, as the electric current I2 consumed by the control circuit 2 increases, the ON time of the switching element 7 and the time in which the electric current I2 flows to the secondary winding wire 21 and the diode D21 (hereinafter referred to as secondary winding wire conduction time) increase.

The increase in the peak current IDp of the electric current ID flowing to the primary winding wire 11 and the switching element 7 and the increase in the ON time of the switching element 7 according to the increase in the electric current I2 consumed by the control circuit 2 are explained. The increase in the electric current I2 consumed by the control circuit 2 connected to the secondary winding wire 21 via the diode D21 and the capacitor C21 means that the power consumption P2 of the control circuit 2 increases. In accordance with the increase in the power consumption P2, a load on the secondary winding wire 21 increases. Therefore, it is necessary to increase the electric power Pin that the primary winding wire 11 has to supply. This is because the electric power Pin of the primary winding wire 11 is as indicated by Formula (8) above and, to increase Pin, it is necessary to increase the peak current IDp of the electric current ID flowing to the primary winding wire 11 and the switching element 7. The ON time of the switching element 7 is long. This is because, to increase the peak current IDp as indicated by Formula (30) above, it is necessary to increase the ON time of the switching element 7.

The increase in the peak current I21p of the electric current I21 flowing to the secondary winding wire 21 and the diode D21 and the increase in the secondary winding wire conduction time according to the increase in the electric current I12 consumed by the control circuit 2 are explained. The increase in the electric current I2 consumed by the control circuit 2 connected to the secondary winding wire 21 via the diode D21 and the capacitor C21 means that the electric power P21 necessary for the secondary winding wire 21 has to be increased. This is because, as explained above, because the power consumption P2 of the control circuit 2 and the electric power P21 necessary for the secondary winding wire 21 are the same, to increase P21 as indicated by Formula (21) above, it is necessary to increase the peak current I21p.

The increase in the secondary winding wire conduction time is explained with reference to Formulas (19), (20), (21), and (22). If the electric current I2 consumed by the control circuit 2 increases by 1.2 times, when the current peak value flowing to the secondary winding wire 21 and the diode D21 is represented as $I21p_{1.2}$, the electric power needed by the secondary winding wire 21 is represented as $P21_{1.2}$, and the electric power consumed by the control circuit 2 is represented as $P2_{1.2}$, $I21p_{1.2}$ can be indicated by Formula (46).

$$P2_{1.2} = P21_{1.2}$$

$$V2 \times 1.2 \times I2 = \tfrac{1}{2} \times L21 \times I21p_{1.2}^2 \times fsw$$

$$I21p_{1.2} = \sqrt{(2 \times V2 \times 1.2 \times I2/(L21 \times fsw))} \tag{46}$$

When the electric current I2 consumed by the control circuit 2 does not increase, the current peak value I21p flowing to the secondary winding wire 21 and the diode D21 can be indicated by Formula (47).

$$P2 = P21$$

$$V2 \times I2 = \tfrac{1}{2} \times L21 \times I21p^2 \times fsw$$

$$I21p = \sqrt{(2 \times V2 \times I2/(L21 \times fsw))} \tag{47}$$

From Formula (46) and Formula (47), $I21p_{1.2}$ can be indicated by Formula (48).

$$I21p_{1.2} = \sqrt{(1.2)} \times I21p \tag{48}$$

When the secondary winding wire conduction time at the time when the electric current I2 consumed by the control circuit 2 is 1.2 times is represented as $Toff_{1.2}$, the secondary winding wire conduction time $Toff_{1.2}$ can be indicated by Formula (49) from Formula (22) and Formula (48).

$$Toff_{1.2} = 2 \times 1.2 \times I2 \times Tall/I21p_{1.2}$$

$$Toff_{1.2} = 2 \times 1.2 \times I2 \times Tall/\sqrt{(1.2)} \times I21p$$

$$Toff_{1.2} = 1.2/\sqrt{(1.2)} \times Toff \tag{49}$$

$1.2/\sqrt{(1.2)}$ in Formula (49) is larger than 1. This indicates that, when the electric current I2 consumed by the control circuit 2 increases to 1.2 times, the secondary winding wire conduction time Toff$_{1,2}$ increases.

To summarize the above, after the first step ends, when the electric current I2 consumed by the control circuit 2 increases, the ON time of the switching element 7 increases and the period in which the electric current I21 flows to the secondary winding wire 21 and the diode D21, that is, the secondary winding wire conduction time increases. When the secondary winding wire conduction time increases, a loss of the diode D21 increases, and thus, heat generation increases.

In FIG. 29a and FIG. 29b, there is a period in which the switching element 7 is off and an electric current does not flow to the secondary winding wire 21 and the diode D21 (hereinafter referred to as discontinuous mode operation). On the other hand, in FIG. 29c, while the switching element 7 is off, an electric current continues to flow to the secondary winding wire 21 and the diode D21, and there is no period in which current values of both of ID and I21 are zero (hereinafter referred to as continuous mode operation). In particular, in the case of the continuous mode operation, because not only the heat generation of the diode D21 increases but also the loss of the switching element 7 increases, the heat generation of the switching element 7 also increases. Therefore, not only measures against the heat generation of the diode D21 but also measures against the heat generation of the switching element 7 are necessary.

Therefore, in this embodiment, the time in which an electric current flows to the secondary winding wire 21 and the diode D21, that is, the secondary winding wire conduction time is detected to monitor the electric current I2 consumed by the control circuit 2. When the secondary winding wire conduction time increases, it is determined that some abnormality has occurred in the control circuit 2 and the electric current I2 becomes excessively large. After the determination ends, an alarm signal is output from the control circuit 2 and power supply to the main circuit 3 and the peripheral apparatus circuit 4 is started to prevent an excessively large current from flowing to the control circuit 2 and prevent the operation of the switching power supply circuit 1 from changing to the continuous mode operation.

According to this embodiment, it is possible to prevent an excessively large electric current from flowing to the diode D21. Therefore, it is unnecessary to increase the heat capacity of the diode D21, and thus, it is possible to suppress a cost increase. When abnormality is detected, electric power is supplied to each of the circuits, to which the switching power supply circuit 1 supplies electric power, in a well-balanced manner. Therefore, it is possible to prevent an excessively large electric current from being fed to the secondary winding wire 21 and the diode D21 for supplying electric power to the control circuit 2. This leads to prevention of the continuous mode operation. Consequently, there is an effect that it is made unnecessary to increase the heat capacity of the switching element 7 and it is made possible to suppress a cost increase.

The operation of the secondary-winding-wire-conduction-time detecting unit 1000 shown in FIG. 27 and FIG. 28 is explained.

After the first step ends, that is, in a state in which only the control circuit 2 and the IC for power supply control 8 are operating and the main circuit 3 and the peripheral apparatus circuit 4 are not operating, the switching element 7 monitors the voltage across terminals V21 of the secondary winding wire 21 at the OFF time and detects the secondary winding wire conduction time.

As it is seen from FIGS. 29a to 29c, when the switching element 7 is off, the voltage across terminals V21 of the secondary winding wire 21 generates a + voltage and, in the period in which the electric current I21 flows to the secondary winding wire 21 and the diode D21, the voltage across terminals V21 generates a + voltage.

Figure 30:
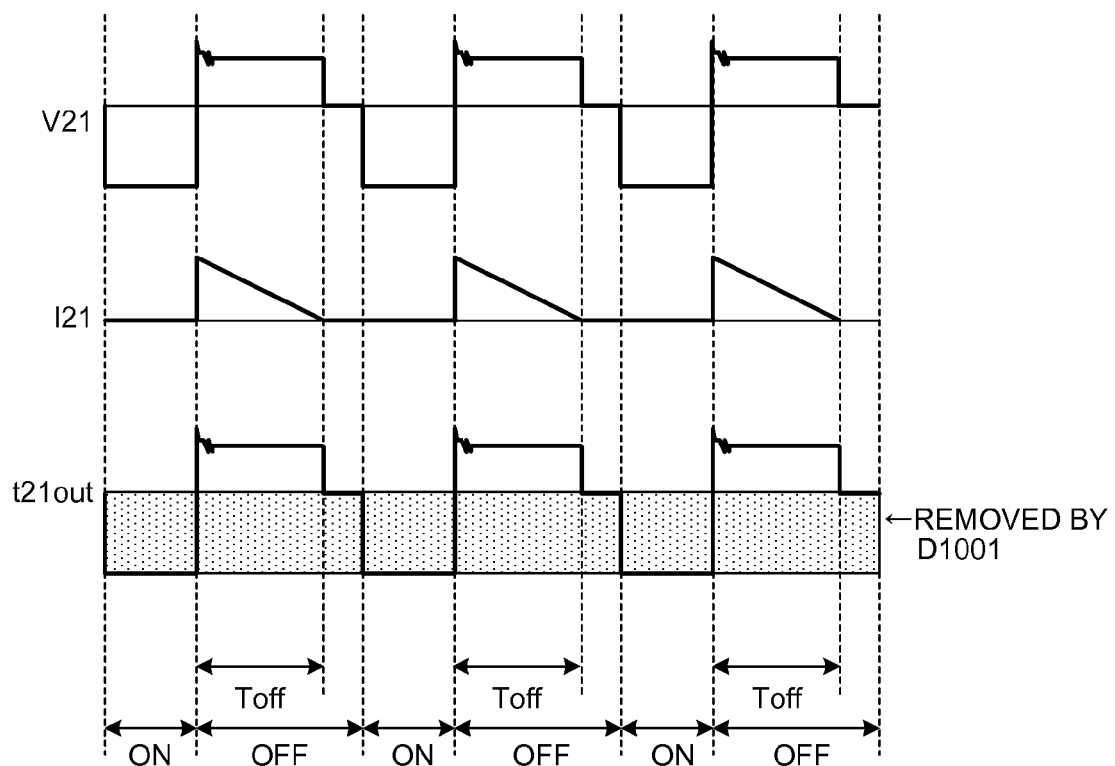
FIG. 30 is a diagram showing the behavior of an input signal and an output signal of a secondary-winding-wire-conduction-time detecting unit.

FIG. 30 is a diagram showing the behavior of an input signal and an output signal of the secondary-winding-wire-conduction-time detecting unit 1000. FIG. 30 shows the voltage across terminals V21 of the secondary winding wire 21, the electric current I21 flowing to the secondary winding wire 21 and the diode D21, and the output signal t21out of the secondary-winding-wire-conduction-time detecting unit 1000.

When the switching element 7 is on, a minus voltage is generated in the voltage across terminals V21 of the secondary winding wire 21. At this point, the electric current I21 of the secondary winding wire 21 and the diode D21 is zero. Because an electric current is prevented from flowing by the diode D1001, a voltage is not generated in t21out. When the switching element 7 is on off, a + voltage is generated in the voltage across terminals V21 of the secondary winding wire 21. Because the diode D1001 conducts, a voltage divided by the resistor R1002 and the resistor R1003 is generated in t21out. Only a + voltage is extracted as t21out by the diode D1001. An electric current flowing to the secondary-winding-wire-conduction-time detecting unit 1000 is limited and a divided voltage t21out is generated by the resistor R1002 and the resistor R1003.

The generated output signal t21out of the secondary-winding-wire-conduction-time detecting unit 1000 is like a pulse signal having plus potential as shown in FIG. 30. By inputting the output signal t21out to the control circuit 2 and analyzing the control signal t21out, it is possible to detect the time in which the electric current I21 flows to the secondary winding wire 21 and the diode D21. Consequently, it is made possible to determine the electric current I2 flowing to the control circuit 2.

Concerning an analysis method for t21out, for example, as in the fourth embodiment shown in FIG. 22 and FIG. 23, it is conceivable to adopt a method of detecting pulse width of t21out and calculating, on the basis of the pulse width, the peak current I21p of the electric current I21 flowing to the secondary winding wire 21 and the diode D21 and the electric current I2 flowing to the control circuit 2. It is also conceivable to provide a threshold of the pulse width and, when the pulse width is equal to or larger than the threshold, operate the main circuit 3 and the peripheral apparatus circuit 4.

As explained above, when it is determined that abnormality has occurred in the electric current I2 consumed by the control circuit 2, the output signals sout and fout are output from the control circuit 2 to drive the main circuit 3 and the peripheral apparatus circuit 4.

When a current peak value of the electric current ID flowing to the primary winding wire 11 and the switching element 7 is IDOC, that is, the overcurrent protection level current value, the electric power Pinmax suppliable by the primary winding wire 11 is as explained above. When the main circuit 3 and the peripheral apparatus circuit 4 are driven, the electric power Pinmax can be indicated by Formula (50).

$$P\text{inmax}=\eta\times(V2\times I2\text{max}+V5\times I5+V3\times I3+V4\times I4)/\eta \quad (50)$$

From Formula (50), the electric current I2max flowing to the control circuit 2 can be indicated by Formula (51).

$$I2\max = P\text{inmax} \times \eta/(\eta \times V2)V2 - (V5 \times I5 + V3 \times I3 \times + V4 \times I4)/V2 \quad (51)$$

Compared with Formula (45), even in the electric power Pinmax suppliable by the primary winding wire 11 in the case of the overcurrent protection level current value IDOC, because the main circuit 3 and the peripheral apparatus circuit 4 consume electric power, it is possible to reduce the electric current I2max flowing to the control circuit 2.

By supplying electric power to the main circuit 3 and the peripheral apparatus circuit 4, it is possible to reduce the time in which the electric current I21 flows to the secondary winding wire 21 and the diode D21, and it is possible to prevent the continuous mode operation shown in FIG. 29c. Consequently, it is possible to reduce not only the heat generation of the diode D21 but also the heat generation of the switching element 7, and it is possible to reduce the heat capacities of the diode D21 and the switching element 7.

As explained above, with the switching power supply circuit 1 in the sixth embodiment, after the first step ends, it is made possible to detect that some abnormality has occurred in the control circuit 2 and the electric current I2 flowing to the control circuit 2 becomes excessively large. By starting the operation of the main circuit 3 and the peripheral apparatus circuit 4, which has stopped operating, on the basis of a detection result, and it is possible to reduce the electric current I2 consumed by the control circuit 2. It is possible to reduce heat generation concentrated on the diode D21. It is possible to prevent the switching power supply circuit 1 from changing to the continuous mode operation. It is possible to reduce the heat generation of the switching element 7.

Note that the configurations shown in the first to sixth embodiments are examples of the configuration of the present invention. It goes without saying that the configurations can be combined with other publicly-known technologies and can be changed to, for example, omit a part of the configurations without departing from the spirit of the present invention.

INDUSTRIAL APPLICABILITY

As explained above, the present invention is useful as the switching power supply circuit 1 in which a switching element, a diode, an insulated transformer, which are components of a switching power supply circuit, can be reduced in size and a reduction in costs can be attained and also useful as a control method for the switching power supply circuit 1.

REFERENCE SIGNS LIST

1 Switching power supply circuit
2 Control circuit
3 Main circuit
4 Peripheral apparatus circuit
5 Main power supply
6 Flyback-type insulated transformer (Transformer)
7 Switching element
8 IC for power supply control
9 Error amplifier
11 Primary winding wire
21, 22, 23 Secondary winding wires
50 Power-supply-voltage detecting unit
51 Voltage extracting unit
52 Inversion amplification unit
70 Switching-operation detecting unit
71, 810, 820, 910, 920 Comparators
80 Power-supply-voltage determining unit
81 Power supply terminal
82 GND terminal
83 Input terminal
84 Signal output terminal
90 Switching-operation determining unit
100 Time-width measuring unit
110 Free-run counter
120 Capture unit
130 Time-width calculating unit
210 Arithmetic processing unit
220 Storage unit
230 IC for control circuit start
521 Operational amplifier
830, 930 AND circuits
840, 940 Delay circuits
860, 960 NPN transistors
1000 Secondary-winding-wire-conduction-time detecting unit
B1 Auxiliary winding wire
R1, R2, R3, R4, R513, R514, R522, R523, R1002, R1003 Resistors
D21, D22, D23, D24, D511, D1001 Diodes
C21, C22, C23, C24, C512 Capacitors
OI Photocoupler

The invention claimed is:

1. A switching power supply circuit that generates, based on electric power of a main power supply, operation power for a control circuit that controls overall operation of an electronic apparatus, a main circuit that performs actual operation of the electronic apparatus, and another circuit unrelated to the actual operation of the electronic apparatus, the switching power supply circuit comprising:
an insulated transformer comprising a primary winding wire and a secondary winding wire;
a switcher that is connected to the primary winding wire of the insulated transformer in series, and configured to be turned ON/OFF to perform power supply from the main power supply to the primary winding wire;
a capacitor that is connected to the secondary winding wire of the insulated transformer via a diode;
an IC for power supply control that is configured to turn ON/OFF the switcher, based on a charged voltage of the capacitor; and
a secondary-winding-wire-conduction-time detector that is connected to an input terminal of the diode, and configured to:
  detect a time element for enabling a time at which an electric current flows to the secondary winding wire and the diode to be estimated, based on a voltage at the input terminal of the diode; and
  output a detection result to the control circuit that receives the operation power from the switching power supply circuit,
wherein a desired voltage that is set in advance is charged in the capacitor after the electric power is supplied from the main power supply, and
wherein, after the desired voltage is charged, the control circuit controls operations of the main circuit and the another circuit, based on the detection result that is output from the secondary-winding-wire-conduction-time detector.

2. The switching power supply circuit according to claim 1, wherein the control circuit is further configured to:
determine, based on the detection result that is output from the secondary-winding-wire-conduction-time detector, an electric current that is consumed by a circuit that uses electric power of the secondary winding wire;
output an alarm signal, based on a determined value of the electric current; and
operate the main circuit and the another circuit.

3. A switching power supply circuit generates, based on electric power of a main power supply, operation power for a control circuit that controls overall operation of an electronic apparatus, a main circuit that performs actual operation of the electronic apparatus, and another circuit unrelated to the actual operation of the electronic apparatus, the switching power supply circuit comprising:
an insulated transformer comprising a primary winding wire and a secondary winding wire;
a switcher that is connected to the primary winding wire of the insulated transformer in series, and configured to be turned ON/OFF to perform power supply from the main power supply to the primary winding wire;
a capacitor that is connected to the secondary winding wire of the insulated transformer via a diode;
an IC for power supply control that controls is configured to turn ON/OFF the switcher, based on a charged voltage of the capacitor; and
a switching-operation detector that is configured to:
detect a time element for enabling an ON time of the switcher to be estimated; and
output a detection result to the control circuit,
wherein a desired voltage that is set in advance is charged in the capacitor after the electric power is supplied from the main power supply,
wherein, after elapse of a delay time that is set in advance after the desired voltage is charged, the control circuit controls the main circuit and the another circuit to start operations, and controls the operations of the main circuit and the another circuit, based on the detection result that is output from the switching-operation detector, and
wherein the control circuit comprises a switching-operation determiner that determines, based on the detection result that is output from the switching-operation detector, start and stop of the operations for the main circuit and the another circuit.

4. The switching power supply circuit according to claim 3, wherein the switching-operation detector is further configured to detect the time element, based on a voltage across terminals of the secondary winding wire that performs power supply to the control circuit.

5. The switching power supply circuit according to claim 3, wherein the time element due to operation of the switcher that is detected by the switching-operation detector is any one or any combination of a switching-on time of the switcher, a switching-off time of the switcher, an operating frequency of the switcher, and a time of an electric current flowing to the secondary winding wire of the insulated transformer and the diode connected to the secondary winding wire.

6. The switching power supply circuit according to claim 3, wherein the switching-operation determiner comprises a time width meter that is configured to measure a time of the time element, based on of the detection result that is output from the switching-operation detector.

7. A switching power supply circuit that that generates, based on electric power of a main power supply, operation power for a control circuit that controls overall operation of an electronic apparatus, a main circuit that performs actual operation of the electronic apparatus, and another circuit unrelated to the actual operation of the electronic apparatus, the switching power supply circuit comprising:
an insulated transformer comprising a primary winding wire and a secondary winding wire;
a switcher that is connected to the primary winding wire of the insulated transformer in series, and configured to be turned ON/OFF to perform power supply from the main power supply to the primary winding wire;
a capacitor that is connected to the secondary winding wire of the insulated transformer via a diode;
an IC for power supply control that is configured to turn ON/OFF the switcher, based on a charged voltage of the capacitor,
a switching-operation detector that is configured to:
detects a time element for enabling an ON time of the switcher to be estimated; and
output a detection result to the control circuit,
wherein a desired voltage that is set in advance is charged in the capacitor after the electric power is supplied from the main power supply, and
wherein, after elapse of a delay time that is set in advance after the desired voltage is charged, the control circuit controls the main circuit and the another circuit to start operations, and controls the operations of the main circuit and the another circuit, based on the detection result that is output from the switching-operation detector; and
a power-supply-voltage detector that is configured to output a voltage across terminals of the secondary winding wire for performing power supply to the control circuit,
wherein the switching-operation detector is further configured to detect the time element, based on the voltage across the terminals of the secondary winding wire for performing the power supply to the control circuit.

8. The switching power supply circuit according to claim 7, wherein the control circuit comprises a circuit determiner that determines, based on the voltage across the terminals of the secondary winding wire and the detection result that is output from the switching-operation detector, start and stop of the operations for the main circuit and the another circuit.

9. The switching power supply circuit according to claim 8, wherein the control circuit comprises an arithmetic processor that controls the overall operation of the electronic apparatus,
wherein the circuit determiner is provided in the arithmetic processor, and
the circuit determiner controls the operations of the main circuit and the another circuit, based on any one or any combination of the voltage across the terminals of the secondary winding wire and the detection result that is output from the switching-operation detector.

10. A control method for a switching power supply circuit that generates, based on electric power of a main power supply, operation power for a control circuit that controls overall operation of an electronic apparatus, a main circuit that performs actual operation of the electronic apparatus, and another circuit unrelated to the actual operation of the electronic apparatus, the switching power supply circuit comprising:
an insulated transformer comprising a primary winding wire and a secondary winding wire;
a switcher that is connected to the primary winding wire of the insulated transformer in series, and configured to be turned ON/OFF to perform power supply from the main power supply to the primary winding wire;

a capacitor that is connected to the secondary winding wire of the insulated transformer via a diode;

an IC for power supply control that is configured to turn ON/OFF the switcher, based on a charged voltage of the capacitor, wherein the control method comprises:

charging a desired voltage that is set in advance in the capacitor, using the electric power of the main power supply;

directly detecting a power supply voltage of the main power supply; and outputting a detection result to the control circuit that receives the operation power from the switching power supply circuit, and wherein, after elapse of a delay time that is set in advance after the desired voltage is charged, the control circuit outputs a start signal to the main circuit and the another circuit to control the main circuit and the another circuit to start operations.

11. The control method for the switching power supply circuit according to claim 10, wherein the control circuit further, based on the detection result that is output, controls start or stop of the operations of the main circuit and the another circuit, or outputs an alarm signal without starting the operations.

12. The control method for the switching power supply circuit according to claim 11, wherein the control circuit further:

compares the power supply voltage of the main power supply and a voltage upper limit threshold that is set in advance;

compares the power supply voltage and a voltage lower limit threshold that is set in advance;

determines whether the power supply voltage satisfies a first condition that the power supply voltage is equal to or larger than the voltage lower limit threshold and equal to or smaller than the voltage upper limit threshold, or a second condition that the power supply voltage is equal to or larger than the voltage lower limit threshold, and in response to the power supply voltage being determined to satisfy the first condition or the second condition, outputs the start signal to the main circuit and the another circuit after the elapse of the delay time set in advance, to control the main circuit and the another circuit to start the operations.

13. The control method for the switching power supply circuit according to claim 12, wherein the control circuit further, in response to the power supply voltage being determined to not satisfy the first condition and the second condition, controls to not output the start signal to the main circuit and the another circuit, and controls to stop the operations of the main circuit and the another circuit.

14. The control method for the switching power supply circuit according to claim 12, wherein the control circuit further, after the main circuit and the another circuit are operated, change any one or any combination of the voltage upper limit threshold and the voltage lower limit threshold, based on the power supply voltage of the main power supply.

15. The control method for the switching power supply circuit according to claim 14, wherein the control circuit further, after the main circuit and the another circuit are operated, and any or any combination of the voltage upper limit threshold and the voltage lower limit threshold is changed, in response to the power supply voltage being determined to not satisfy the first condition and the second condition, controls to stop the operations of either one or both of the main circuit and the another circuit.

16. The control method for the switching power supply circuit according to claim 10, wherein the control method further comprises detecting a time element for enabling an ON time of the switcher to be estimated, and the control circuit further, based on the time element that is detected, controls start or stop of the operations of the main circuit and the another circuit, or outputs an alarm signal without starting the operations.

17. The control method for the switching power supply circuit according to claim 16, wherein the control circuit further:

compares the time element and a time upper limit threshold that is set in advance;

compares the time element and a time lower limit threshold that is set in advance;

determines whether the time element satisfies a first condition that the time element is equal to or larger than the time lower limit threshold and equal to or smaller than the time upper limit threshold, or a second condition that the time element is equal to or larger than the time lower limit threshold, and in response to the time element being determined to satisfy the first condition or the second condition, outputs the start signal to the main circuit and the another circuit after the elapse of the delay time set in advance, to control the main circuit and the another circuit to start the operations.

18. The control method for the switching power supply circuit according to claim 17, wherein the control circuit further, in response to the time element being determined to not satisfy the first condition and the second condition, controls to not output the start signal to the main circuit and the another circuit, and controls to top the operations of the main circuit and the another circuit.

19. The control method for the switching power supply circuit according to claim 17, wherein the control circuit further, after the main circuit and the another circuit are operated, change any one or any combination of the time upper limit threshold and the time lower limit threshold, based on the time element.

20. The control method for the switching power supply circuit according to claim 19, wherein the control circuit further, after the main circuit and the another circuit are operated, any one or any combination of the time upper limit threshold and the time lower limit threshold is changed, in response to the time element being determined to not satisfy the first condition and the second condition, controls stop the operations of either one or both of the main circuit and the another circuit.

21. The control method for the switching power supply circuit according to claim 10, wherein the control method further comprises detecting a time element for enabling an ON time of the switcher to be estimated, and the control circuit further, based on either one or both of the power supply voltage and the time element, controls start or stop of the operations of the main circuit and the another circuit, or outputs an alarm signal without starting the operations.

22. A switching power supply circuit that that generates, based on electric power of a main power supply, operation power for a control circuit that controls overall operation of an electronic apparatus, a main circuit that performs actual operation of the electronic apparatus, and another circuit unrelated to the actual operation of the electronic apparatus, the switching power supply circuit comprising:
- an insulated transformer comprising a primary winding wire and a secondary winding wire;
- a switcher that is connected to the primary winding wire of the insulated transformer in series, and configured to be turned ON/OFF to perform power supply from the main power supply to the primary winding wire;
- a capacitor that is connected to the secondary winding wire of the insulated transformer via a diode;
- an IC for power supply control that is configured to turn ON/OFF the switcher, based on a charged voltage of the capacitor; and
- a power-supply-voltage detector that is configured to:
  - directly detect a power supply voltage of the main power supply; and
  - output a detection result to the control circuit that receives the operation power from the switching power supply circuit,
- wherein a desired voltage that is set in advance is charged in the capacitor after the electric power is supplied from the main power supply, and wherein, after elapse of a delay time that is set in advance after the desired voltage is charged, the control circuit controls the main circuit and the another circuit to start operations, and controls the operations of the main circuit and the another circuit, based on the detection result that it output from the power-supply-voltage detector.

23. The switching power supply circuit according to claim 22, wherein the control circuit comprises a power-supply-voltage determiner that determines, based on the detection result that is output from the power-supply-voltage detector, start and stop of the operations for the main circuit and the another circuit.

24. The switching power supply circuit according to claim 1, wherein the secondary-winding-wire-conduction-time detector is further configured to detect, as the time element, a time at which the switcher is on.

25. The switching power supply circuit according to claim 1, wherein the secondary-winding-wire-conduction-time detector is further configured to detect, as the time element, a time at which the switcher is off.

* * * * *